(12) United States Patent
Kaindl

(10) Patent No.: US 12,447,887 B2
(45) Date of Patent: Oct. 21, 2025

(54) MULTIFUNCTIONAL TAILGATE DOOR AND CARGO LOAD SYSTEM AND MULTIDIRECTIONAL BUMPER APPARATUS WITH ADAPTABLE TOW HITCH RECEIVER

(71) Applicant: Robert Kaindl, Redmond, WA (US)

(72) Inventor: Robert Kaindl, Redmond, WA (US)

( * ) Notice: Subject to any disclaimer, the term of this patent is extended or adjusted under 35 U.S.C. 154(b) by 443 days.

(21) Appl. No.: 17/983,155

(22) Filed: Nov. 8, 2022

(65) Prior Publication Data
US 2024/0149774 A1    May 9, 2024

(51) Int. Cl.
*B62D 33/03* (2006.01)
*B60P 1/43* (2006.01)
*B62D 33/027* (2006.01)

(52) U.S. Cl.
CPC .......... *B60P 1/435* (2013.01); *B62D 33/0273* (2013.01); *B62D 33/03* (2013.01)

(58) Field of Classification Search
CPC ....... B62D 33/0273; B62D 33/03; B60P 1/45; B60P 1/435
USPC .................................................. 296/51, 57.1
See application file for complete search history.

(56) References Cited

U.S. PATENT DOCUMENTS

| | | | | |
|---|---|---|---|---|
| 3,695,666 A | * | 10/1972 | Corson ................... | B60R 19/56 293/118 |
| 5,645,310 A | * | 7/1997 | McLaughlin ...... | B62D 33/0273 296/180.5 |
| 6,206,444 B1 | * | 3/2001 | Casey ..................... | B60R 11/00 296/180.1 |
| 6,267,429 B1 | * | 7/2001 | Kuzmich ................ | B60P 1/435 296/57.1 |
| 8,070,208 B2 | * | 12/2011 | Zielinsky ........... | B62D 33/0273 296/57.1 |
| 8,075,038 B2 | * | 12/2011 | Zielinsky ........... | B62D 33/0273 296/57.1 |
| 8,087,710 B2 | * | 1/2012 | Zielinsky .................. | B60P 1/26 296/57.1 |
| 9,248,871 B1 | * | 2/2016 | Waskie ................... | E05C 17/36 |
| 9,956,995 B1 | * | 5/2018 | Neighbors .......... | B62D 33/0273 |
| 10,081,303 B1 | * | 9/2018 | Ngo .......................... | B60R 3/00 |
| 10,239,567 B1 | * | 3/2019 | Parrish ................... | B62D 33/08 |
| 10,801,237 B2 | * | 10/2020 | Hemphill ................ | E05C 17/36 |
| 10,906,468 B1 | * | 2/2021 | Crim ................... | B62D 33/0273 |

(Continued)

*Primary Examiner* — Gregory A Blankenship
(74) *Attorney, Agent, or Firm* — James Haugen; Seattle Patent Group PLLC

(57) ABSTRACT

The present disclosure is directed to a multifunctional tailgate door and cargo load system that includes a multidirectional bumper apparatus with adaptable tow hitch receiver. The multifunctional tailgate door is adjacent to a cargo bed area having a rail system attached to the multifunctional tailgate door. The rail system having a linear actuator includes a rotary actuator hinge that enables the multifunctional tailgate door to function in a first direction and in a second direction. The multidirectional bumper apparatus is operable in a first direction and in a second direction, and may work in conjunction with the multifunctional tailgate door. The multifunctional tailgate door has at least one anchor that works in conjunction with the cargo load system. The cargo load system includes a plurality of ports in a rear cargo floor surface having a plurality of winches and at least one motor for securing a cargo load.

7 Claims, 51 Drawing Sheets

(56) References Cited

U.S. PATENT DOCUMENTS

| | | | |
|---|---|---|---|
| 11,066,111 B2* | 7/2021 | Stojkovic | B62D 33/0273 |
| 12,017,570 B2* | 6/2024 | Allicock | B60P 1/04 |
| 12,090,912 B2* | 9/2024 | Harmon | B62D 33/08 |
| 2003/0141733 A1* | 7/2003 | Burg | B60R 5/041 |
| | | | 296/26.09 |
| 2008/0277958 A1* | 11/2008 | King | B62D 33/0273 |
| | | | 296/50 |
| 2018/0229667 A1* | 8/2018 | Stojkovic | B62D 33/03 |
| 2019/0225137 A1* | 7/2019 | Williams | B60P 7/0838 |
| 2020/0148283 A1* | 5/2020 | Robinson | B62D 33/03 |
| 2021/0155296 A1* | 5/2021 | Povinelli | B60Q 1/307 |
| 2021/0300482 A1* | 9/2021 | Mooney | B62D 33/037 |
| 2021/0347416 A1* | 11/2021 | Schalyo | E05F 1/1075 |
| 2021/0402911 A1* | 12/2021 | Patrick | B60P 3/077 |
| 2022/0032854 A1* | 2/2022 | Burke | B60R 9/10 |
| 2022/0063736 A1* | 3/2022 | Williams | B62D 33/0273 |
| 2022/0314861 A1* | 10/2022 | Tyler | B62D 33/03 |
| 2023/0339550 A1* | 10/2023 | Reif | B62D 33/03 |
| 2024/0295286 A1* | 9/2024 | Smith | B60J 5/10 |
| 2024/0300591 A1* | 9/2024 | Boisvert | B60R 7/02 |

* cited by examiner

MULTIFUNCTIONAL TAILGATE DOOR AND CARGO LOAD SYSTEM AND MULTIDIRECTIONAL BUMPER APPARATUS WITH ADAPTABLE TOW HITCH RECEIVER

BACKGROUND

Technical Field

The present disclosure relates to a multifunctional tailgate door for use separately or cooperatively with a cargo bed load system and a multidirectional bumper apparatus with adaptable tow hitch receiver.

Description of the Related Art

Certain vehicles, such as trucks and/or sport utility vehicles (SUVs), are used to transport large cargo loads that otherwise may not fit into the standard cab of a vehicle. In transporting such large cargo loads, the cargo bed of a truck or SUV is utilized most often. In doing so, a tailgate door serves as a part of loading and unloading cargo into the cargo bed area. The positioning and function of a tailgate door can either enable or inhibit a user from safely loading or unloading cargo from the cargo bed area. For example, loading and offloading large appliances becomes increasingly challenging without assistance from a forklift or other mechanical loading system. This can be inconvenient for the typical consumer trying to offload such large cargo at their respective residence.

Traditionally, tailgate doors open at a 90 degree angle in one direction and in line with the bumper. Typically, the angle and height of the tailgate door does not adequately enable the user to safely load or offload large cargo in a safe and efficient manner. Ramps or cargo extenders may be used to assist in the loading of cargo but require additional purchases and may not be accessible while performing such tasks. Additionally, if such loads are capable of being maneuvered into the cargo bed area but require additional space, they often lack the ability to be securely tied down while concurrently being able to keep the tailgate door open.

BRIEF SUMMARY

The present disclosure improves upon the issue of efficiently and safely loading or offloading large cargo in a vehicle cargo bed area by providing a multifunctional tailgate door that operates in a first direction and in a second direction. As a result, by adjusting and lowering the angle in which the tailgate door lowers, increased maneuverability is achieved to load or offload cargo into the cargo bed area. The multifunctional tailgate door enables a user to extend and lower the tailgate door below the traditional 90 degree angle, and can also clear the bumper while simultaneously functioning as a ramp. This helps to minimize the strain and load of lifting or maneuvering heavy objects. Additionally, to improve stability of the cargo, a cargo bed area load system enables the user to tie down a load with an integrated winch and anchor system that works in conjunction with the multifunctional tailgate door.

In one example embodiment, the multifunctional tailgate door is configured with a first axis, a second axis, and a third axis. This enables a user to extend, raise, lower, and rotate the multifunctional tailgate door in a variety of configurations. This helps a user to load, unload, and secure a variety of cargo with minimal effort, or with limited additional resources and assistance in the operating cargo into or out of the cargo bed area. This example embodiment further includes a spline system that is operable in conjunction with the first, second, and third axis of the multifunctional tailgate door. Additionally, a bumper lowering/raising platform system is incorporated into the cargo bed area and may work together, along with the multifunctional tailgate door, as one orchestrates a series of coordinated movements, or may work independently of each other.

In one example embodiment, a vehicle includes a cargo bed area that has a rear cargo floor, a first rear corner sidewall, a second rear corner sidewall, a first rear cargo side, and a second rear cargo side. The vehicle further includes a multifunctional tailgate door that has a first sidewall and a second sidewall, and the multifunctional tailgate door is rotatable in a first direction and a second direction. A rail system is coupled to the first and second sidewalls of the multifunctional tailgate door, and the rail system can extend and retract the multifunctional tailgate door. A tailgate support apparatus is operable to allow the multifunctional tailgate door to move between at least three positions. At least one of the three positions oriented at an angle is less than 90 degrees with respect to the rear cargo floor.

In one example embodiment, a cargo load system is configured to secure cargo and includes a multifunctional tailgate door that is rotatably moveable between a first position and a second position, the multifunctional tailgate door in the second position receiving at least a portion of the cargo. The cargo load system includes a rear cargo floor sized and shaped to receive at least a portion of the cargo. The cargo load system further includes at least one winch including a winch cable wound around a drum, at least one anchor affixed to the rear cargo floor, with the at least one anchor sized and shaped to coupleably receive the winch cable to secure the cargo. At least one motor is operably coupled to the at least one winch, the at least one motor driving the drum to a desired tension in the winch cable.

In one example embodiment, a method includes opening a multifunctional tailgate door in a first direction, positioning the multifunctional tailgate door to at least a first position, extending the multifunctional tailgate door in a horizontal direction using a rail system, and detaching a tailgate support cable from a clamp to lower the multifunctional tailgate door in the first direction.

In one example embodiment, the multifunctional tailgate door has a first sidewall, and a second sidewall that is opposite to the first sidewall. The multifunctional tailgate door further includes a first surface with a rotatable flip out panel, and an extendable support panel that is underneath the first surface. The extendable support panel is moveable in a first direction and in a second direction.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify similar elements or acts. The sizes and relative positions of elements in the drawings are not necessarily drawn to scale. For example, some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles, winches, motors, and cables have not been shown or described in detail to avoid unnecessarily obscuring descriptions of the embodiments.

The present disclosure relates to a multifunctional tailgate door and connected cargo bed load system of a vehicle that can increase the functionality of loading or offloading cargo. Traditional tailgates generally function in one direction and are fixed at a particular height. As noted above, the accessibility and maneuverability of a multifunctional tailgate and associated cargo load system increases the ease in transporting cargo for various users. This provides numerous benefits and demonstrates a needed improvement within the automotive industry. Incorporating the ability to rotate a tailgate door in either direction or at a greater angle increases the convenience for any user.

Figure 1:
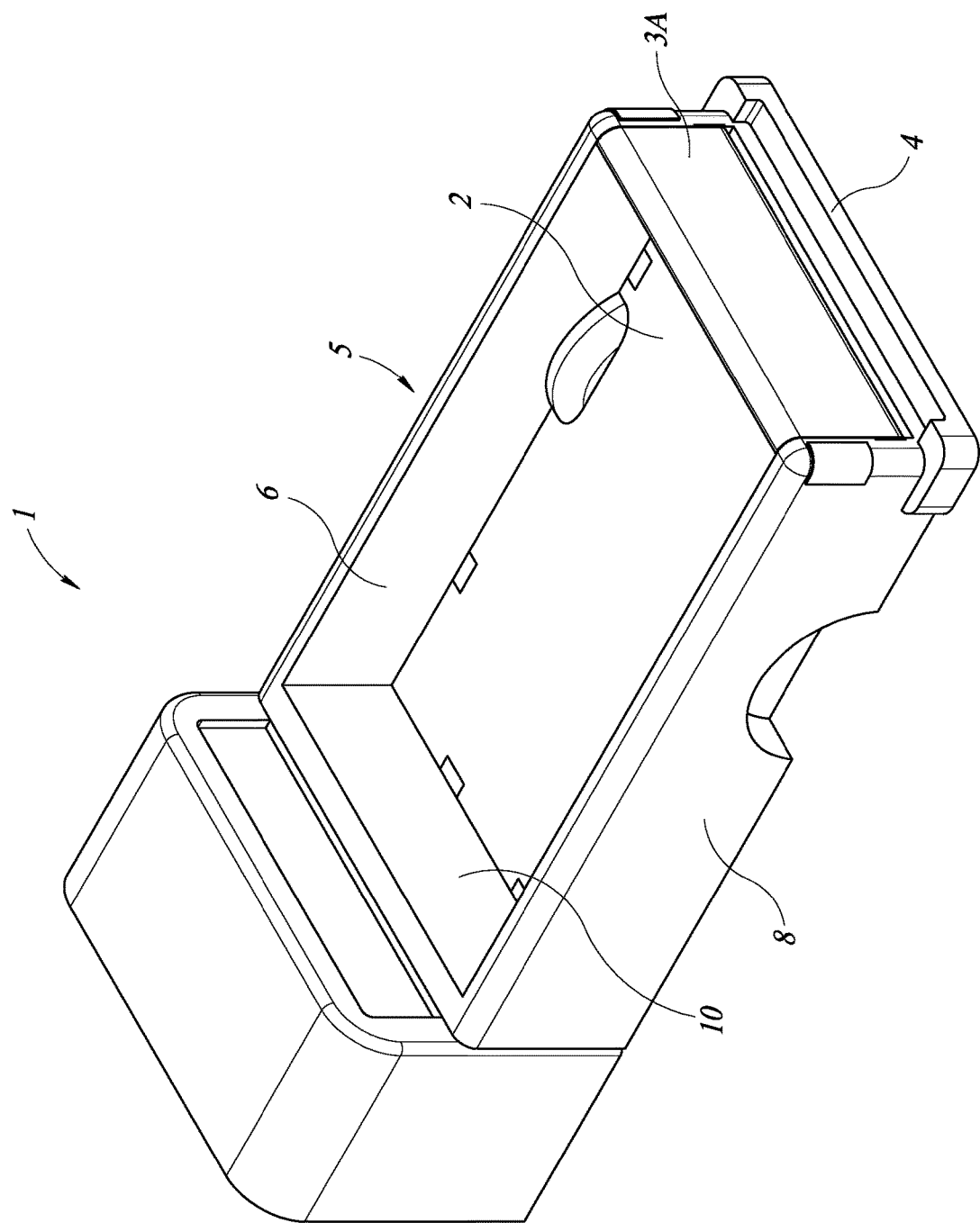
FIG. 1 is a driver side perspective view of a vehicle and a rear cargo bed area with a multifunctional tailgate door, according to one example embodiment.

FIG. 1 is directed to a driver side perspective view of a vehicle 1 with a rear cargo bed area 5 and a multifunctional tailgate door 3A, according to one example embodiment. The vehicle 1 may be a truck, sport-utility vehicle (SUV), or other suitable vehicle capable of utilizing the multifunctional tailgate door 3A. The multifunctional tailgate door 3A may be the length and width of conventional tailgate doors, but may also be customized to fit a variety of vehicles. The cargo bed area 5 is affixed to the rear of the vehicle 1. The cargo bed area 5 has a first rear cargo side 6 and a second rear cargo side 8, opposite the first rear cargo side 6. The cargo bed area 5 has a third cargo side 10 that is opposite to the multifunctional tailgate door 3A and transverse to the first and second rear cargo sides 6, 8 which substantially define the cargo bed area 5.

The cargo bed area 5 further includes a rear cargo floor 2 that is adjacent to a rear bumper 4. The rear cargo floor 2 is coupled to and positioned adjacent to the first, second, and third rear cargo sides 6, 8, and 10, respectively. The structure of the cargo bed area 5, in conjunction with the multifunctional tailgate door 3A, allows for sufficient space in a versatile package for loading and offloading cargo to and from the cargo bed area 5. The rear bumper 4 may take a wide variety of forms of a vehicle bumper, and is generally coupled to the cargo bed area 5 of the vehicle 1.

Figure 2A:
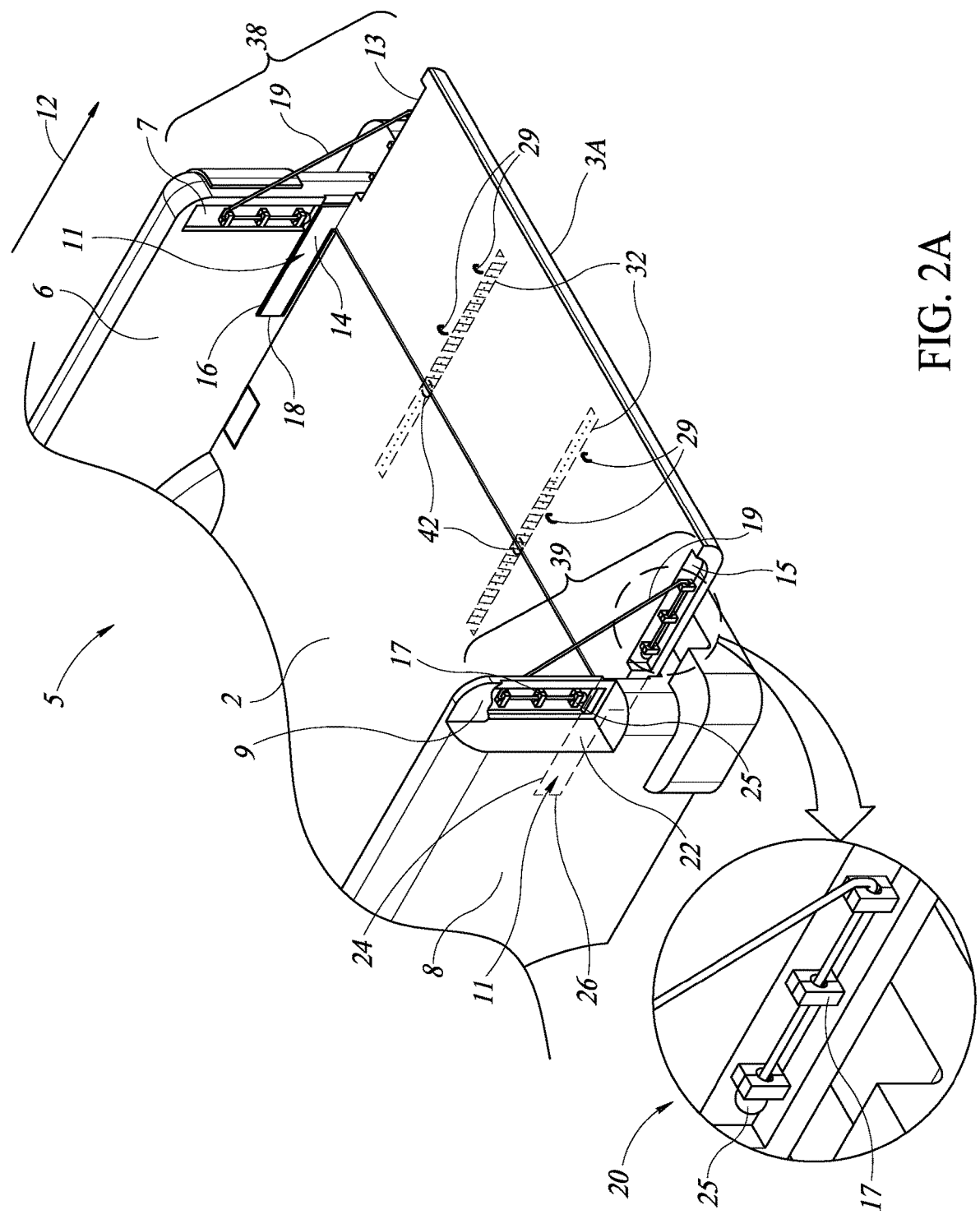
FIG. 2A is a partial driver side perspective view of the vehicle and rear cargo bed area of FIG. 1, and with an enlarged perspective view of the multifunctional tailgate door sidewall at a first position.

FIG. 2A is directed to a partial driver side perspective view of the vehicle of FIG. 1 having the cargo bed area 5 that includes the multifunctional tailgate door 3A adjacent to the rear cargo floor 2. FIG. 2A illustrates movement and/or orientation of the multifunctional tailgate door 3A in relation to the cargo bed area 5 and the rear cargo floor 2. In particular, the multifunctional tailgate door 3A may be rotatably or pivotably moved between a number of positions and at a variety of angles. For example, FIG. 2A illustrates the multifunctional tailgate door 3A when it is moved to an interim or intermediate position in which the multifunctional tailgate door 3A is oriented approximately parallel to the rear cargo floor 2 when viewed looking down. The multifunctional tailgate door 3A is comprised of a first sidewall 13, a second sidewall 15 opposite the first sidewall 13, and at least one anchor 29.

The multifunctional tailgate door 3A includes a rail system 11 coupled to the first and second sidewalls 13, 15 of the multifunctional tailgate door 3A. The rail system 11 is interposed between the first and second rear cargo sides 6, 8 and the rear cargo floor 2 of the cargo bed area 5. The rail system 11 is used in conjunction with the multifunctional tailgate door 3A to clear the rear bumper 4 when loading or unloading cargo into the cargo bed area 5. In particular, the rail system 11 is coupled to the multifunctional tailgate door 3A via the first and second sidewalls 13, 15, which allows the multifunctional tailgate door 3A to move in a first horizontal direction 12. The rail system 11 includes a first bracket 14 and a first guiderail or track 16. The first rear cargo side 6 includes a first rail recess 18 which coupleably receives the first guiderail or track 16. The first bracket 14 at one end is coupled to the first sidewall 13 of the multifunctional tailgate door 3A and is moveable via the first guiderail or track 16 in the first horizontal direction 12.

The rail system 11 further includes a second bracket 22 and a second guiderail or track 24. The second rear cargo side 8 includes a second rail access 26 which coupleably receives the second guiderail or track 24. The second bracket 22 at one end is coupled to the second sidewall 15 of the multifunctional tailgate door 3A and is moveable via the second guiderail or track 24 in the first horizontal direction 12. When clearing the rear bumper 4, the first and second brackets 14, 22 move via the respective first and second guiderails 16, 24 and extend outward from the cargo bed area 5 by moving the multifunctional tailgate door 3A. While the embodiments of the rail system 11 illustrated herein show the rail system 11 positioned externally relative to the cargo floor 2, in some alternative embodiments, the rail system 11 may be positioned underneath the rear cargo floor 2. In such alternative embodiments, the rail system 11 positioned underneath the rear cargo floor 2 may provide additional space and addition of other features, such as providing additional space for the tailgate support apparatus 38, 39 or embodiments and configurations of the multifunctional tailgate door 3A, which will be explained in further detail below.

In some embodiments, the vehicle 1 may optionally include a pair of channels 32. The pair of channels 32 houses a metal slide or similar device that slides within the channel 32 to slide down into the truck, and the bottom of the multifunctional tailgate door 3A, which will be explained in further detail below. In some embodiments, the channels 32 may assist with weight distribution and support by housing internal support devices (not shown). The pair of internal support devices may be positioned within the rear cargo floor 2 and extend into the multifunctional tailgate door 3A. For example, the internal support devices may be positioned within the channels 32 disposed in the rear cargo floor 2, or may be extendable into channels 32 disposed in the multifunctional tailgate door 3A. For example, when the multifunctional tailgate door 3A is in a position aligned with the rear cargo floor 2, the internal support devices may extend via rotary couplings 42. For example, the internal support devices comprise at least one tube or element that is rotatably coupled to a second element via the rotary coupling 42, as described in further detail below. In some embodiments, the internal support devices may be steel tubings, square stalks, or other support materials capable of keeping the multifunctional tailgate door 3A rigid while aligned with the rear cargo floor 2.

The multifunctional tailgate door 3A is coupled to the cargo bed area 5, at least in part, by tailgate support cables 19. The tailgate support cables 19 may be composed of an elastomeric or other similar material that can sustain the weight and maneuverability of the multifunctional tailgate door 3A. The tailgate support cables 19 include a pin member 25. The tailgate support cables 19 are detachably inserted and housed within a plurality of clamps 17. The tailgate support cables 19, the pin members 25, and the plurality of clamps 17 collectively comprise a first tailgate support apparatus 38 on the first rear cargo side 6, and a second tailgate support apparatus 39 on the second rear cargo side 8.

The pin member 25 may be a lock, latch, or other similar fastener that enables the tailgate support cable 19 to remain stationary within the plurality of clamps 17. The plurality of clamps 17 are mounted to the first and second sidewalls 13, 15 of the multifunctional tailgate door 3A, as illustrated in the enlarged section of FIG. 2A. FIG. 2A further illustrates a view of the second tailgate support apparatus 39, which is similar to the first tailgate support apparatus 38 and located on the second rear cargo side 8. The plurality of clamps 17 are also mounted on a first rear corner sidewall 7 and a second rear corner sidewall 9 (partially shown in FIGS. 2A, 3A, and 4A) of the first and second rear cargo sides 6, 8 in the cargo bed area 5.

The plurality of clamps 17 are arranged along the first and second sidewalls 13, 15 of the multifunctional tailgate door 3A and the first and second rear corner sidewalls 7, 9 of the cargo bed area 5. The tailgate support cable 19 can be removed from the plurality of clamps 17 by lifting and pulling the tailgate support cable 19 from the plurality of clamps 17 by the pin member 25. When the tailgate support cable 19 is removed from the clamp, it causes slack in the cable by which the multifunctional tailgate door 3A can be positioned at a first position 20, the first position 20 of the multifunctional tailgate door 3A generally disposed at a 90 degree angle with respect to the ground level or the rear cargo floor 2.

Figure 2B:
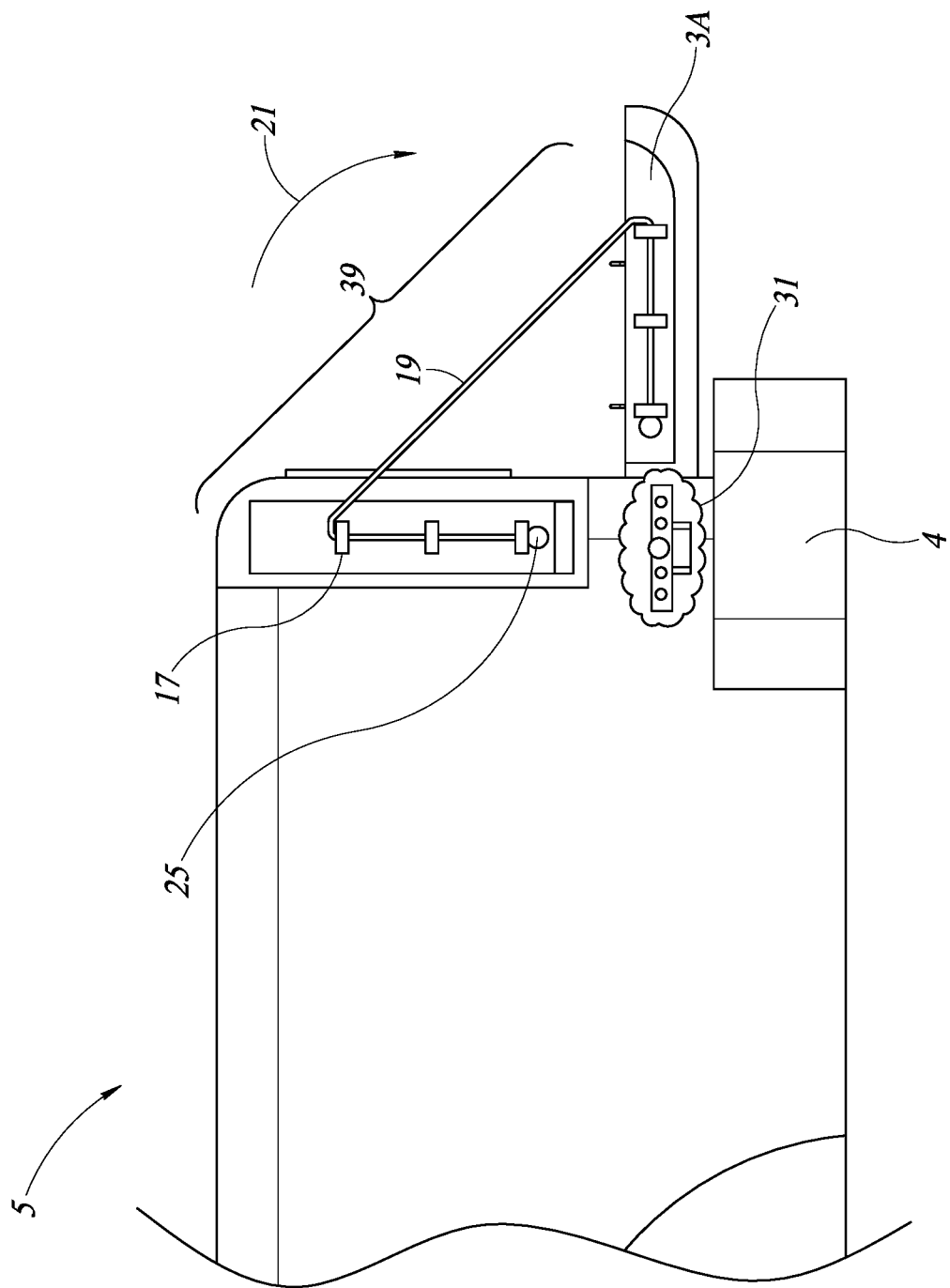
FIG. 2B is a partial driver side view of the rear cargo bed area of FIG. 1.

FIG. 2B illustrates a partial driver side view of the vehicle of FIG. 1 with the multifunctional tailgate door 3A shown in more detail. The multifunctional tailgate door 3A is illustrated at the first position 20 having been moved in a first direction 21 (e.g., rotary direction) from a closed position illustrated in FIG. 1. Moving of the multifunctional tailgate door 3A in the first direction 21 enables general loading and offloading of cargo into the cargo bed area 5. As described above, the multifunctional tailgate door 3A is capable of clearing the rear bumper 4 by utilizing the rail system 11 and the tailgate support cable 19 inserted into the plurality of clamps 17 and secured in place by the pin member 25.

In the cargo bed area 5, a rotary actuator hinge 31 is provided which is operationally coupled to the multifunctional tailgate door 3A and functions as the rotational or pivot axis. The rotary actuator hinge 31 pivots at the base of the multifunctional tailgate door 3A and uses, in some embodiments, pneumatic pressure to provide a turning or angular movement of the multifunctional tailgate door 3A using relatively high torque with minimal effort. The rotary actuator hinge 31 may move the multifunctional tailgate door 3A in the first direction 21 to improve accessibility and provide greater clearance of the cargo bed area 5. The rotary actuator hinge 31 may be positioned within one or both of the first and second sidewalls 13, 15 of the multifunctional tailgate door 3A. The rotary actuator hinge 31 may be fixed at a desired angle with the multifunctional tailgate door 3A, and therefore rotatable to pivot in a back and forth manner, as will be explained in greater detail below.

Figure 3A:
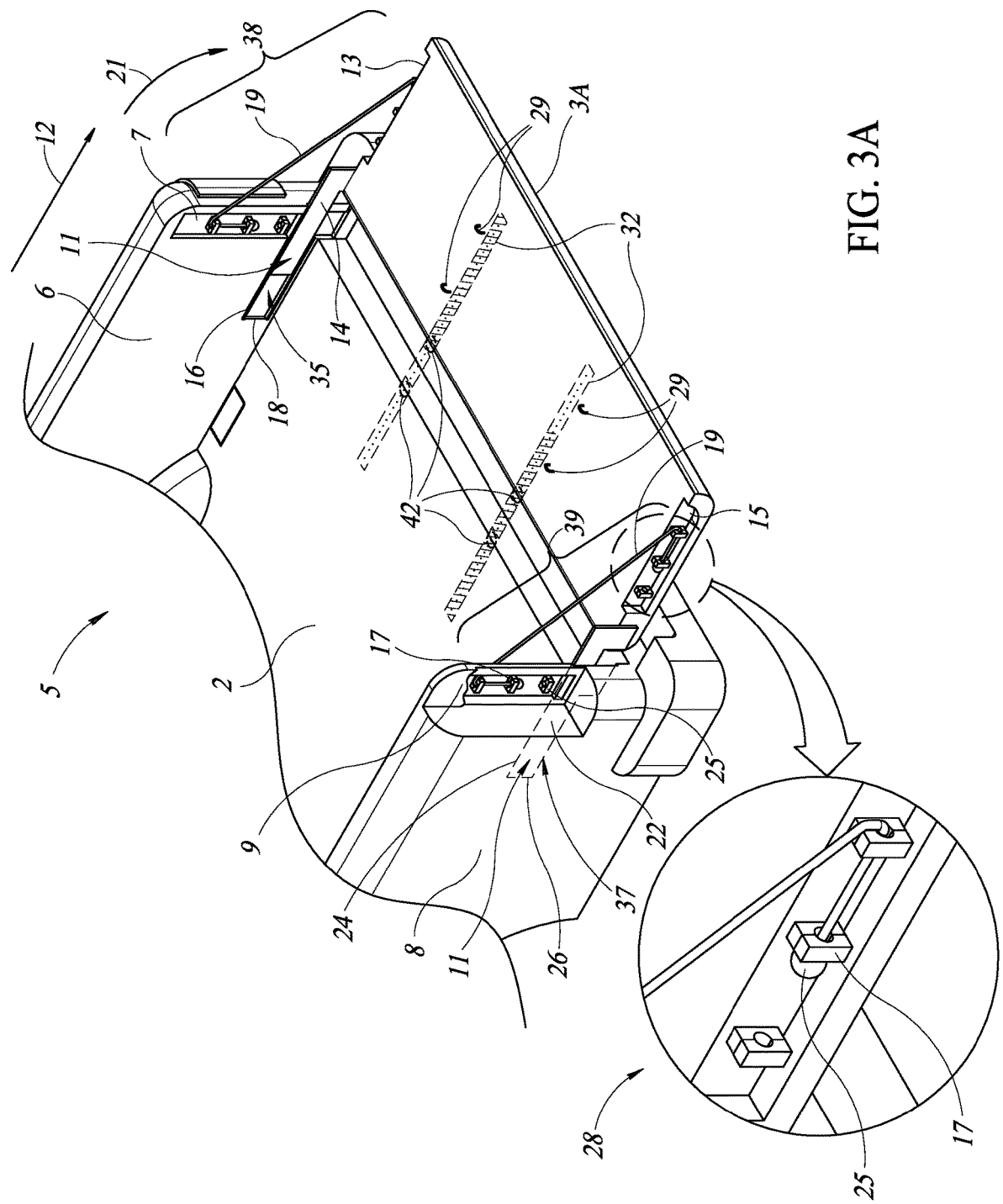
FIG. 3A is a partial driver side perspective view of the vehicle and rear cargo bed area of FIG. 1, and with an enlarged perspective view of the multifunctional tailgate door sidewall at a second position.

FIG. 3A is directed to a partial driver side perspective view of the vehicle 1 of FIG. 1 with the multifunctional tailgate door 3A and cargo bed area 5. As shown in FIG. 3A, the rail system 11 is configured to extend outward and allow the multifunctional tailgate door 3A to clear the rear bumper 4. As previously mentioned, with the tailgate support cable 19 being composed of elastomeric material, it is capable of extending outward in connection with the multifunctional tailgate door 3A.

Figure 3B:
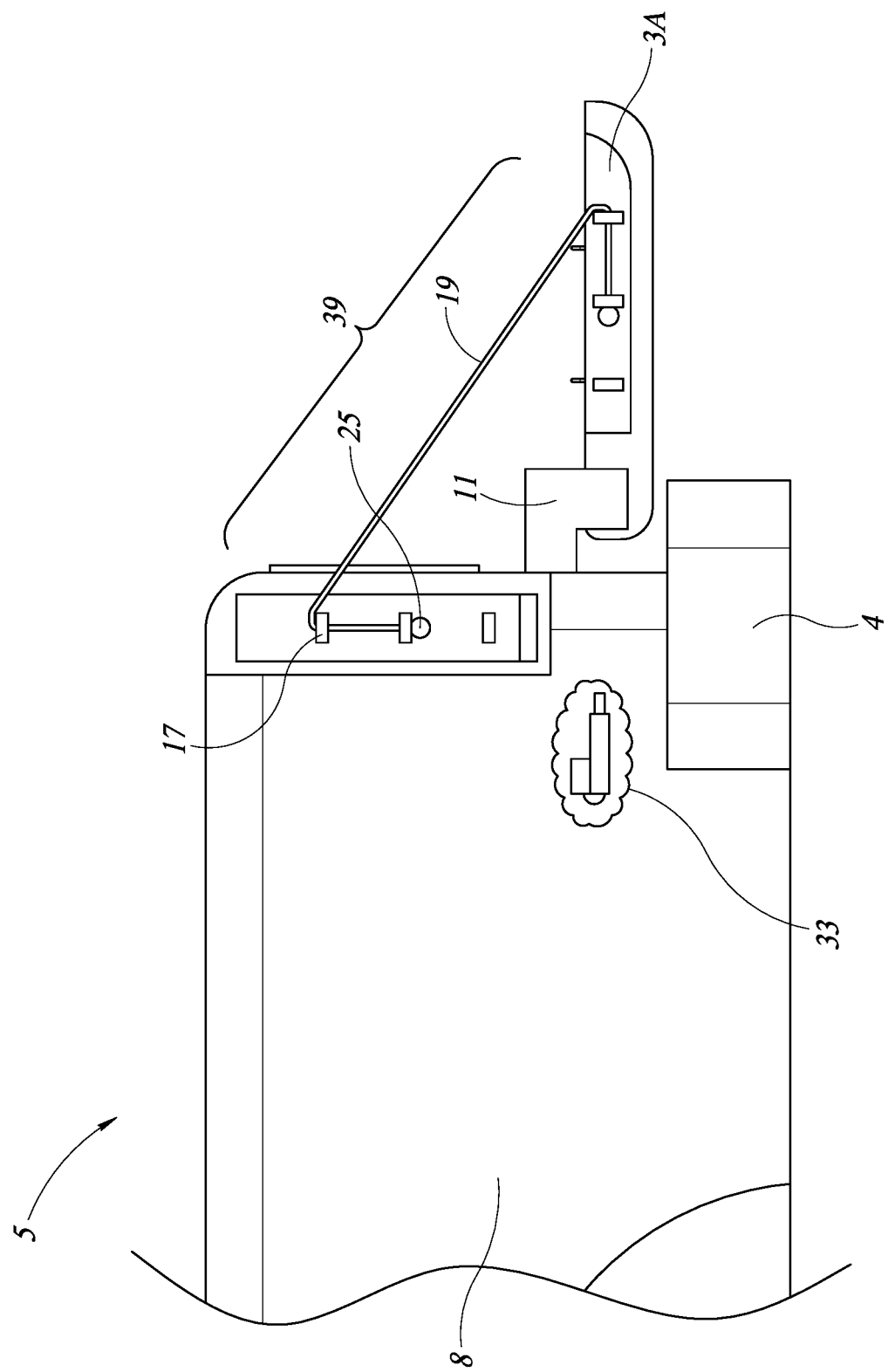
FIG. 3B is a partial driver side view of the rear cargo bed area of FIG. 1.

For example, a second position 28 is demonstrated in the enlarged section of FIG. 3A, which illustrates a portion of the second sidewall 15 of the multifunctional tailgate door 3A. As shown in FIGS. 3A and 3B, the pin member 25 and the tailgate support cable 19 have been uncoupled from the lower clamps of the plurality of clamps 17. The removal of the pin member 25 from the lower clamps of the plurality of clamps 17 increases the slack in the tailgate support cable 19 in combination with the rail system 11 extending in the first horizontal direction 12. In this manner, the multifunctional tailgate door 3A can extend outwardly away from the bumper 4 and in turn clear the bumper 4. For example, in some embodiments, a user may manually extend the multifunctional tailgate door 3A upon removing the pin member 25 as described above. In other embodiments, the vehicle 1 may include one or more systems or apparatuses that can be automated to extend or otherwise move the multifunctional tailgate door 3A, as described in more detail below.

With the assistance of the channels 32, the multifunctional tailgate door 3A can be stabilized by providing rigidity at various positions. In certain embodiments, the internal support devices may provide an internal structure for the split tailgate to remain aligned with the rear cargo floor 2 or in a bent and angled position. The channels 32 can therefore help maintain a sturdy and rigid posture while handling increased weight and loads.

The channels 32 may include the rotary couplings 42 that are housed within the rear cargo floor 2 and within the multifunctional tailgate door 3A. The rotary couplings 42 are capable of extending outward in unison with the rail system 11, and allow for bending of the internal devices in the channels 32, as mentioned above. This extension allows users the ability to load or unload cargos of extensive size that would not typically fit in standard size cargo bed areas.

FIG. 3B is directed to a partial driver side view of the cargo bed area 5 and the second rear cargo side 8. The rail system 11 allows for the horizontal movement of the multifunctional tailgate door 3A. In addition to the features described in detail above, the rail system 11 further includes a first channel 35 in the first rear cargo side 6, and a second channel 37 in the second rear cargo side 8 (see FIG. 3A). The first and second brackets 14, 22 are positioned in the first and second channels 35, 37, respectively, which allows the brackets 14, 22 to move within the first and second channels 35, 37 via guiderails or tracks 16, 24.

The rail system 11 may be operably coupled to a linear actuator 33 or other similar actuator used to generate linear motion within the cargo bed area 5. The linear actuator 33 may be integrated into one rear cargo side, or may be integrated into both the first and second rear cargo sides 6, 8. The linear actuator 33 operates in conjunction with the rail system 11 by extending outward to clear the cargo bed area 5 and rear bumper 4. This capability of the multifunctional tailgate door 3A enables a user to output minimal work effort in extending the door while increasing work efficiency. The linear actuator 33 powers the rail system 11 to slide in the first horizontal direction 12 within the first and second rear cargo sides 6, 8, and enables the multifunctional tailgate door 3A to reach the desired distance from the cargo bed area 5.

Figure 4A:
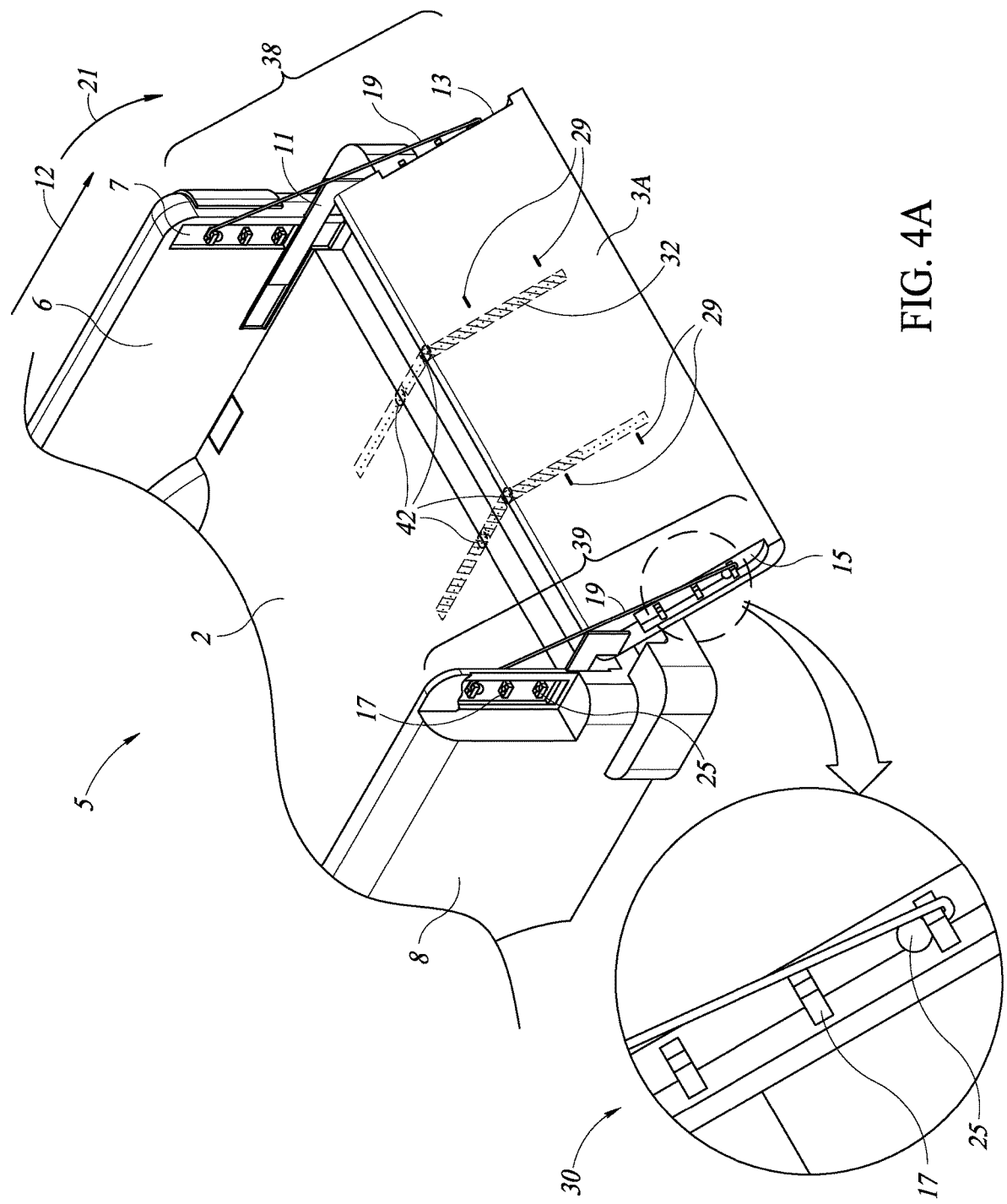
FIG. 4A is a partial driver side perspective view of the vehicle and rear cargo bed area of FIG. 1, and with an enlarged perspective view of the multifunctional tailgate door sidewall at a third position.

FIG. 4A is directed to partial driver side perspective view of the vehicle 1 of FIG. 1 with the multifunctional tailgate door 3A in the cargo bed area 5. The multifunctional tailgate door 3A is illustrated at a third position 30 after being moved in the first direction 21 from the first and second positions 20, 28. As demonstrated in the detailed view of the second sidewall 15, in the third position 30, the tailgate support cable 19 is positioned at the last of the plurality of clamps 17 and secured in place by the pin member 25. Again, the multifunctional tailgate door 3A having the channels 32 helps maintain sufficient rigidity when in the third position 30. The channels 32 may contain internal support devices that have the capability to bend and rotate laterally.

As previously mentioned, the rail system 11 attached to the multifunctional tailgate door 3A enables clearance from the cargo bed area 5 and the rear bumper 4. This clearance allows the multifunctional tailgate door 3A to extend outward in the first direction 21 and rotated or lowered to a desired position with respect to the ground. When removing the tailgate support cable 19 from the plurality of clamps 17 in both the first and second rear corner sidewalls 7, 9 and first and second sidewalls 13, 15, the extra slack from the cable enables the user to rotate the tailgate out and further down. This movement may be further aided by the channels 32 which assist with the weight distribution of the multifunctional tailgate door 3A with respect to the rear cargo floor 2 in the cargo bed area 5.

When the multifunctional tailgate door 3A is in the third position 30, it can provide certain advantages. For example, when loading typical large cargo such as appliances or furniture, difficulties arise because conventional tailgates do not extend beyond the typical 90 degree position with respect to the ground. In the third position 30, the multifunctional tailgate door 3A may function as a ramp. In this manner, the multifunctional tailgate door 3A can enable a user to load or offload large and hard to maneuver cargo, which could be done in a manner utilizing the multifunctional tailgate door 3A.

Figure 4B:
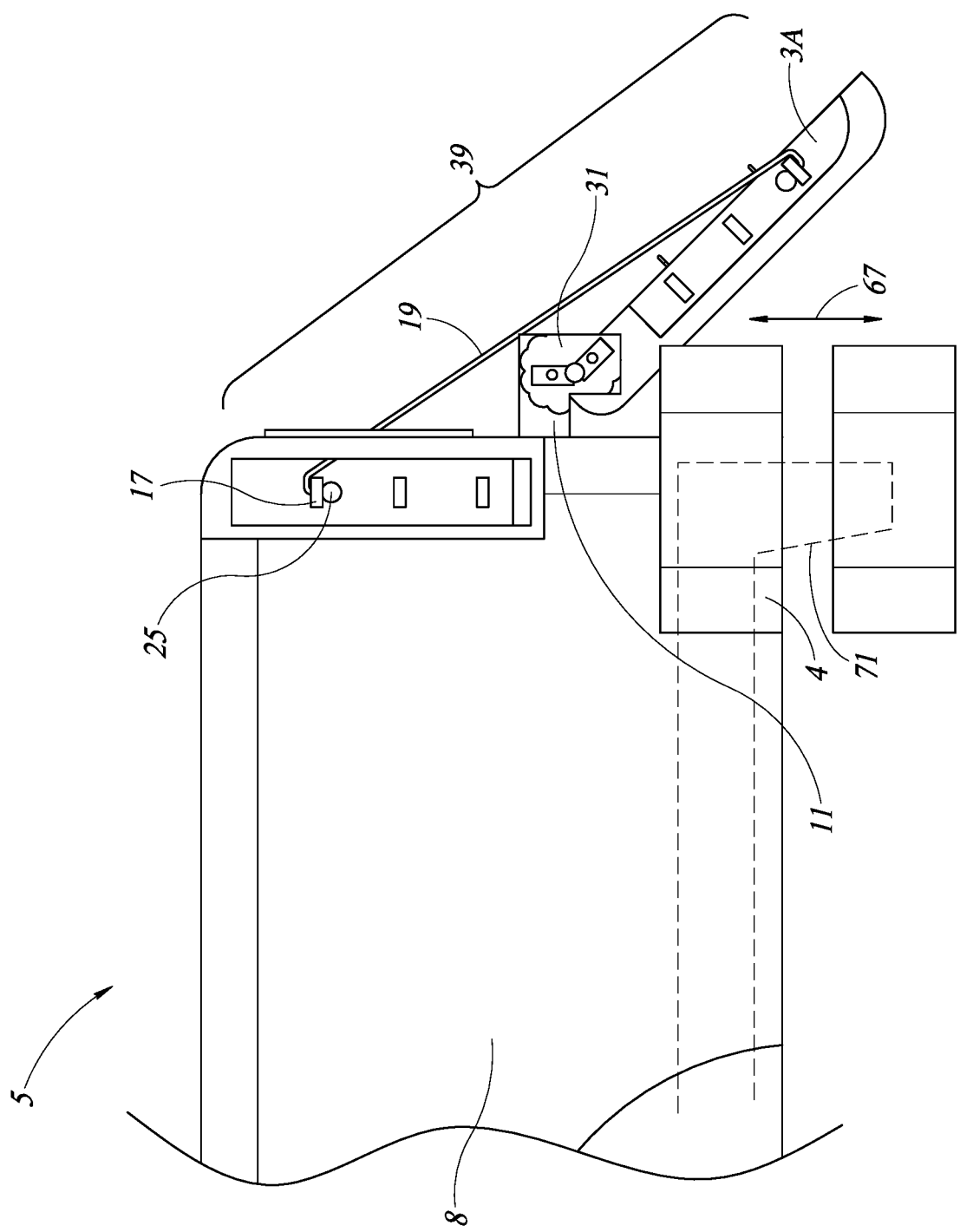
FIG. 4B is a partial driver side view of the rear cargo bed area of FIG. 1.

FIG. 4B is directed to a partial driver side view of the cargo bed area 5 and the multifunctional tailgate door 3A in the third position 30. The rotary actuator hinge 31 can assist with a rotation and lowering of the multifunctional tailgate door 3A in the first direction 21 at the third position 30. FIG. 4B further illustrates the rotary actuator hinge 31 with the pivot in the lower position and illustrates a bumper lowering platform 71, according to one example embodiment. The bumper lowering platform 71 may be provided in some embodiments and in other embodiments may be omitted. The bumper lowering platform 71 can allow clearing the rear bumper 4 with the lowered angled multifunctional tailgate door 3A. The bumper lowering platform 71 operates by movement in a vertical direction 67 to provide adequate clearance of the rear bumper 4. The bumper lowering platform 71 may be operated by motor, pneumatics, or mechanically. The bumper lowering platform 71 may be made of steel, aluminum, plastic, or other similar materials.

The multifunctional tailgate door 3A is capable of clearing and extending beyond the rear bumper 4. The rear bumper 4 affixed to the cargo bed area 5 may comprise a recessed middle portion to allow adequate clearance of the multifunctional tailgate door 3A. This provides clearance for the rail system 11 to extend the multifunctional tailgate door 3A using the rotary actuator hinge 31 in tandem with the tailgate support cable 19, plurality of clamps 17, and the pin member 25.

Figure 4C:
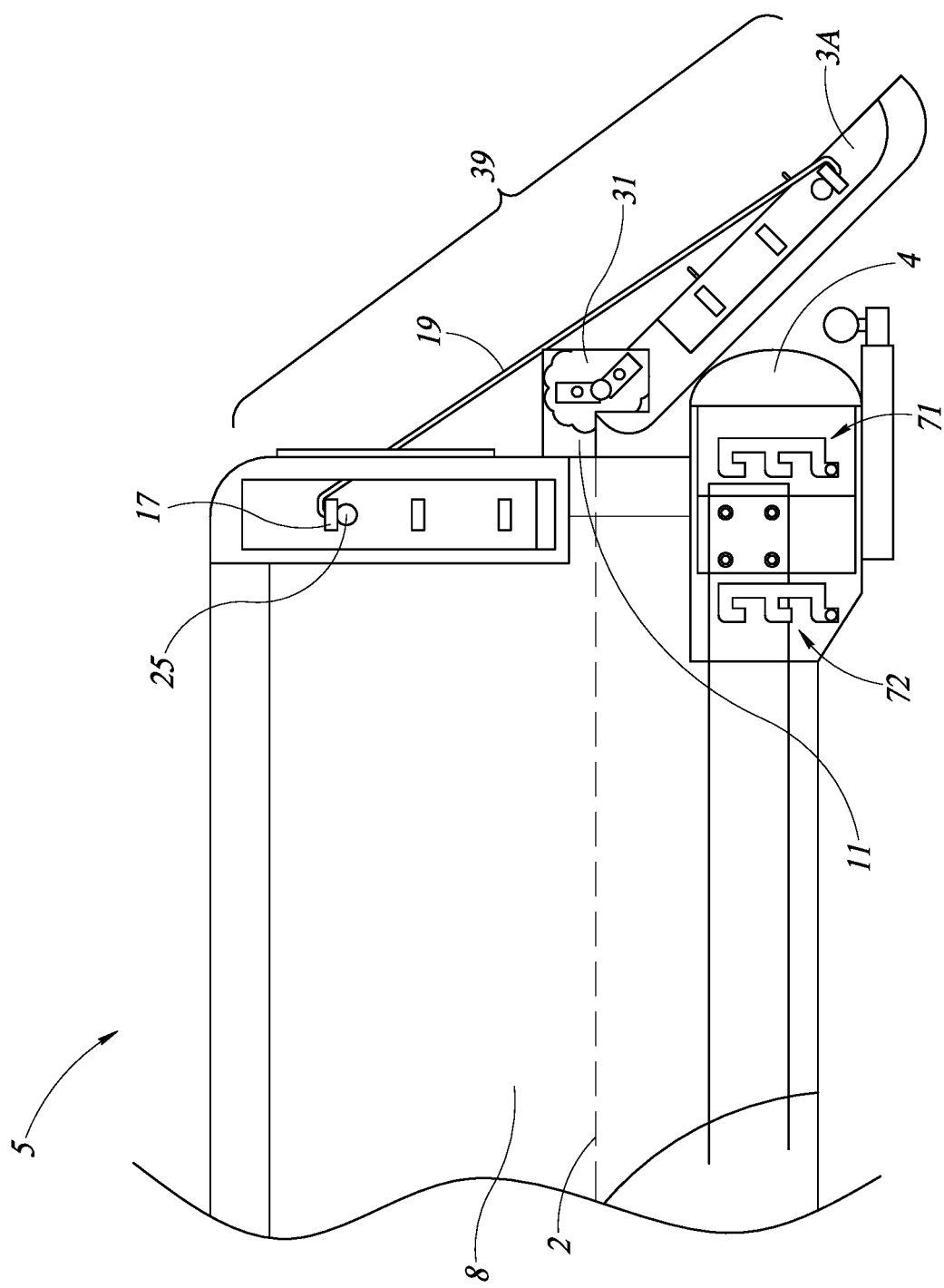
FIG. 4C is a partial driver side view of the rear cargo bed area of FIG. 1 and also illustrating a bumper lowering system according to one example embodiment.
Figure 4D:
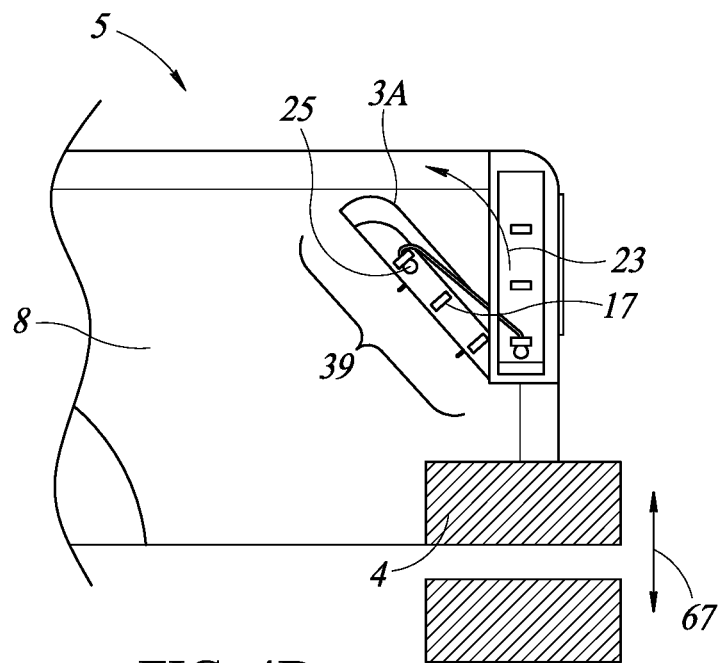
FIG. 4D is a partial driver side perspective view of the vehicle and rear cargo bed area with an example embodiment of the multifunctional tailgate door.

FIGS. 4C and 4D illustrate partial driver side views of the second rear cargo side 8 with the multifunctional tailgate door 3A in the cargo bed area 5, and a cross-sectional view of the bumper lowering platform 71. By utilizing the rotary actuator hinge 31 (not shown for clarity of description and illustration), the multifunctional tailgate door 3A can rotate in either the first direction 21 or in a second direction 23, as shown in FIG. 4D. As demonstrated, the multifunctional tailgate door 3A can function in a variety of ways, from extending outward using the rail system 11 as mentioned above, or may be utilized as a spoiler or to compress a cargo load.

Specifically, FIG. 4C shows the bumper lowering platform 71 in a scalloped type track or guide system 72. The bumper lowering platform 71 is mounted to the frame of a vehicle, e.g., a truck. In certain embodiments, the occupant of the vehicle 1 may receive three warning or position lights, signals, or some form of identifier indicating what position the bumper lowering platform 71 is in. For example, a "red" display light would indicate it is not safe to drive with the bumper in this position. A "yellow" display light would indicate it is not safe to drive with the bumper in this position, but is ready to be locked. A "green" display light would indicate it is ready to drive and the bumper lowering platform 71 is in the proper position and locked.

FIGS. 4C and 4D additionally show the multifunctional tailgate door 3A rotatably moveable in the second direction 23. The multifunctional tailgate door 3A may be extended in the third position 30 or the first position 20 having a 90 degree angle with respect to the cargo floor 2, and can rotate at these various positions due, at least in part, to the rotary actuator hinge(s) 31. The movement of the multifunctional tailgate door 3A in the second direction 23 is similar to the movement of the multifunctional tailgate door 3A in the first direction 21, described in detail above. The tailgate support cable 19 is removed and inserted into a desired clamp corresponding to the multifunctional tailgate door 3A being either in the first, second, or third positions 20, 28, 30.

Figure 4E:
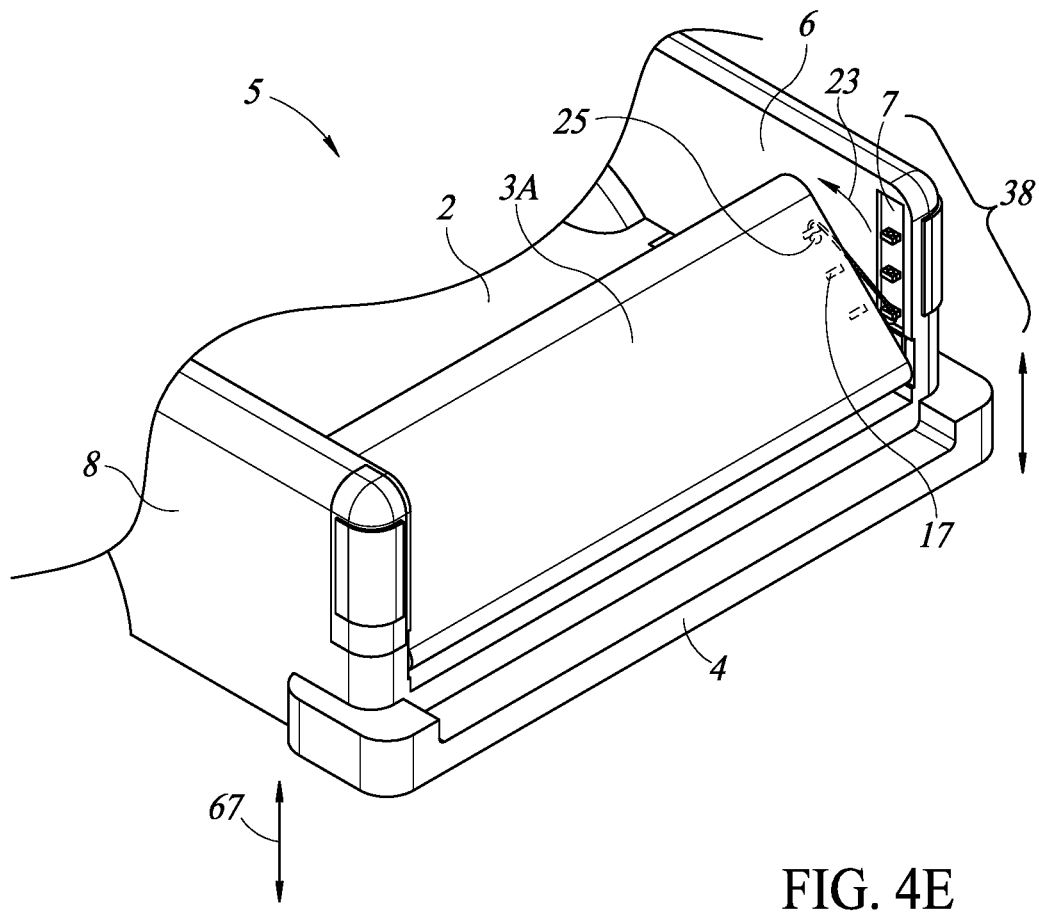
FIG. 4E is a partial driver side perspective view of the vehicle and rear cargo bed area of FIG. 1.

FIG. 4E is a perspective view of the multifunctional tailgate door 3A rotatably moveable in the second direction 23. As shown in FIG. 4E, the multifunctional tailgate door 3A is rotatably moved in the second direction 23 via the rotary actuator hinge(s) 31, tailgate support cable(s) 19, plurality of clamps 17, and the pin member(s) 25. Lowering the bumper lowering platform 71 in the vertical movement 67, and in conjunction with the multifunctional tailgate door 3A and tailgate support apparatus 38, 39, an individual may be able to lower the rear bumper 4 and reach further into the cargo bed area 5 to retrieve or place objects. This demonstrates how various elements of the multifunctional tailgate door 3A and bumper lowering platform 71 may cohesively function to benefit and support the user of the vehicle 1. As described above, the bumper lowering platform 71 allows the rear bumper 4 to be vertically moved in the vertical direction 67. As the rear bumper 4 is moved, such provides sufficient clearance for the multifunctional tailgate door 3A to clear the rear bumper 4 and rotatably move in the second direction 23 to be oriented in the manner illustrated in FIG. 4E, such that the multifunctional tailgate door 3A may function as a restrain device against the load.

The multifunctional tailgate door 3A may also function as a spoiler while engaged in the second direction 23. For example, the pin member 25 can secure the tailgate support cable 19 in the upper first clamp position in the second direction 23, as described above. In the first position 20 when the multifunctional tailgate door 3A is moved in the second direction 23, the pin member 25 is inserted into the upper first clamp. In the second position 28 when the multifunctional tailgate door 3A is moved in the second direction 23, the pin member 25 is inserted into the middle clamp. In the third position 30 when the multifunctional tailgate door 3A is moved in the second direction 23, the pin member 25 is inserted into the lower clamp.

Figure 5A:
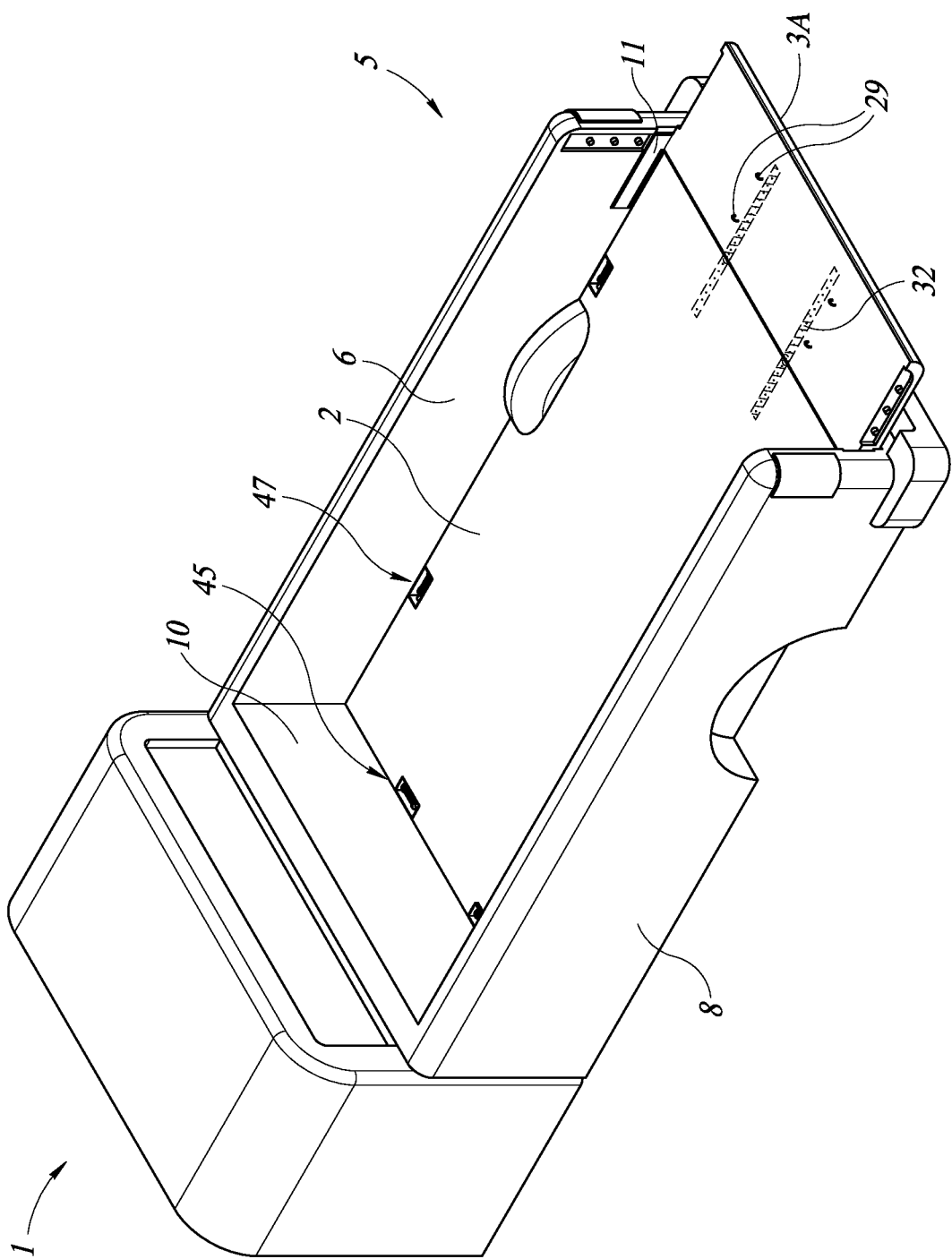
FIG. 5A is a driver side perspective view of the vehicle and a cargo bed load system, illustrating an example embodiment of a rail system.
Figure 5B:
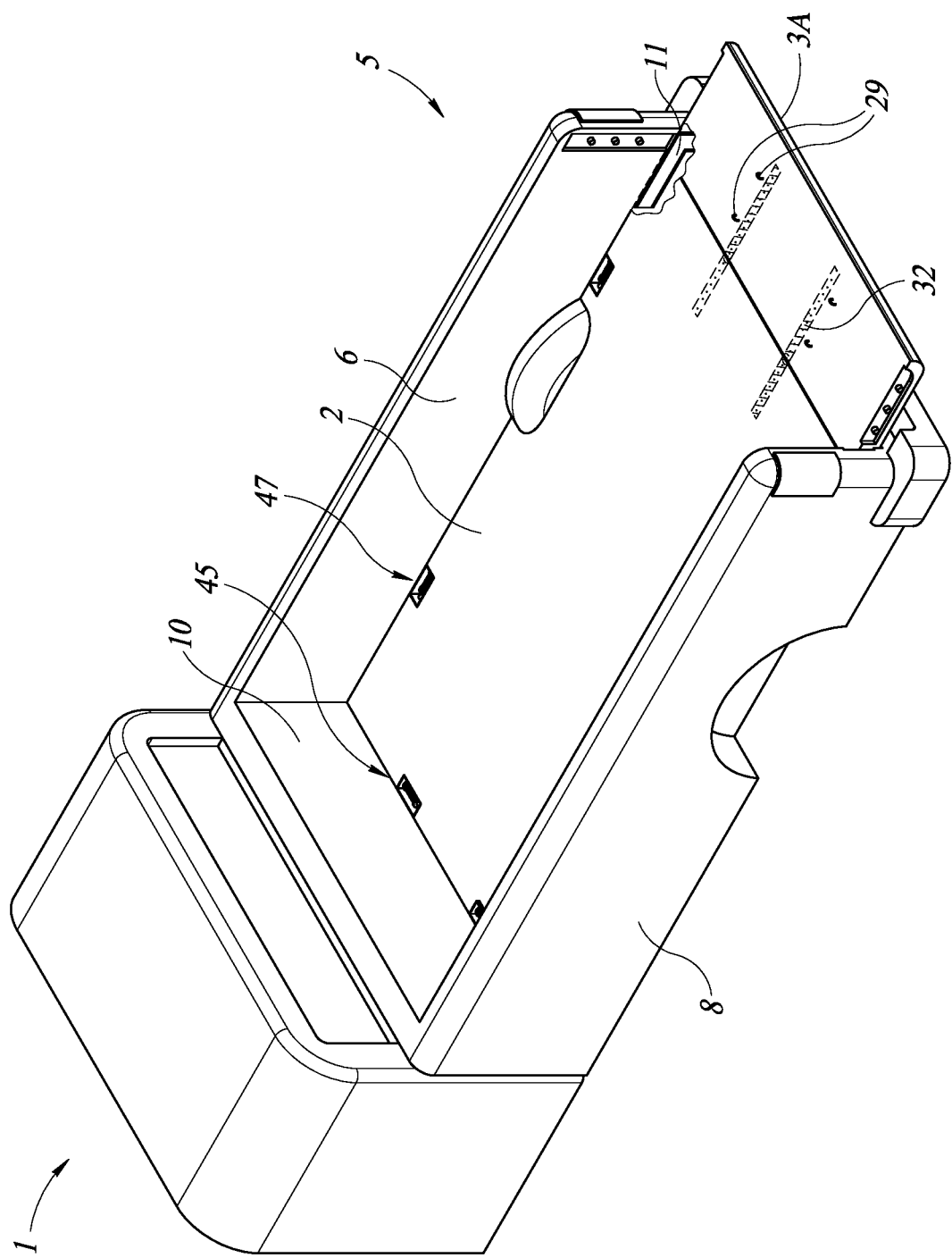
FIG. 5B is a driver side perspective view of the vehicle and cargo bed load system of FIG. 5A, illustrating the example embodiment of the rail system with certain components removed for clarity of illustration and description.
Figure 5C:
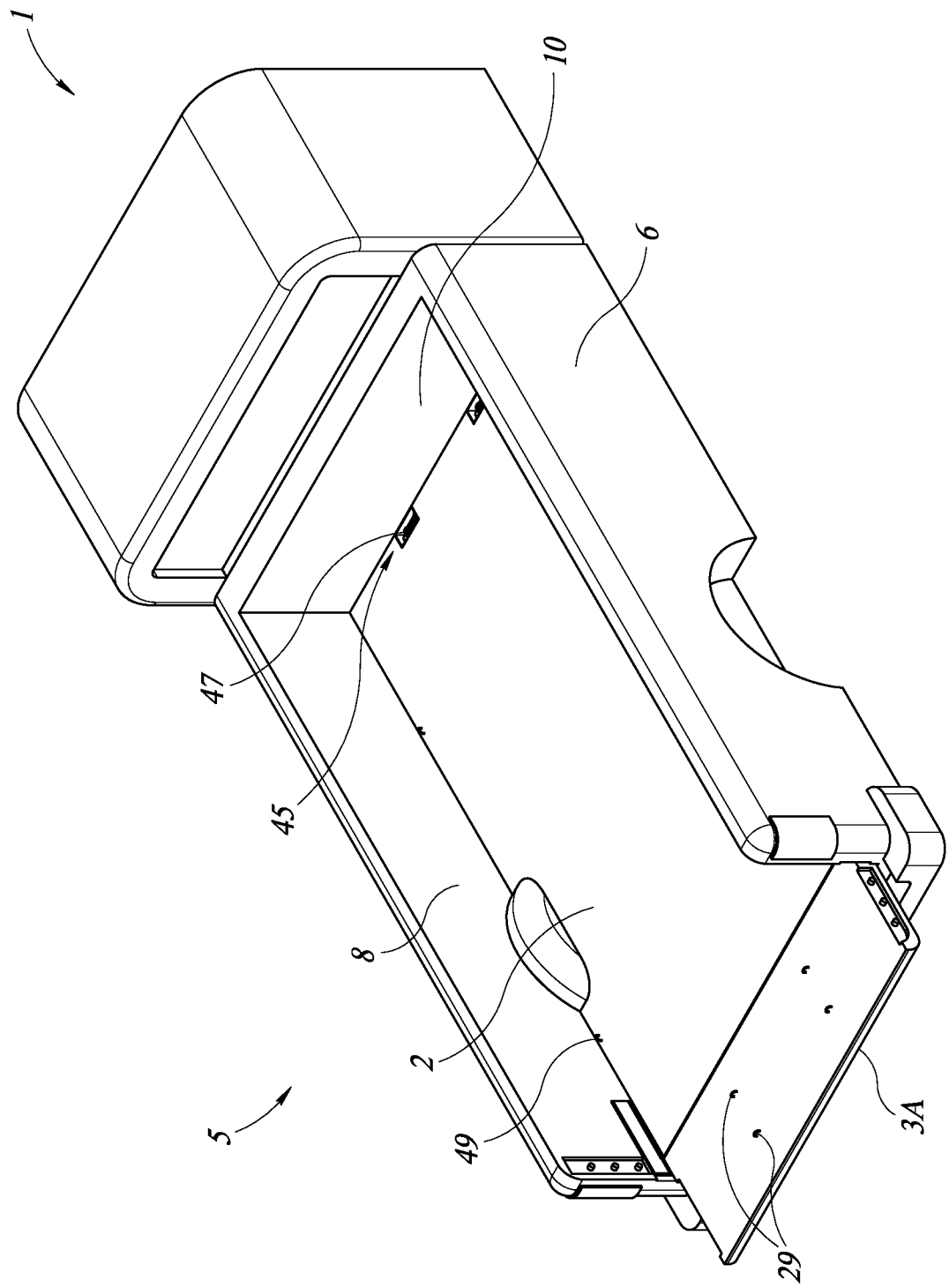
FIG. 5C is a passenger side perspective view of the vehicle and cargo bed load system of FIG. 5A.

FIGS. 5A-5C illustrate various views of the vehicle 1 with the multifunctional tailgate door 3A and the cargo bed area 5. The tailgate support cable(s) 19, plurality of clamps 17, and the pin member(s) 25 are not shown in FIGS. 5A-5C for clarity of illustration and description. The cargo bed area 5 comprises a plurality of recesses 45 disposed in the rear cargo floor 2 of the cargo bed area 5. In an example embodiment, as illustrated in FIG. 5A, the recesses 45 are positioned in the rear cargo floor 2 and along the base of the first and third rear cargo sides 6, 10, respectively. The recesses 45 may be located in various positions within the rear cargo floor 2 or within the cargo bed area 5.

The vehicle 1 includes a plurality of winches 47 or other similar hauling and lifting devices that are disposed in or around the recesses 45. The winch 47 may be utilized in a variety of manners. For example, the plurality of winches 47 may be used to compress or secure a load in the cargo bed area 5 as described in more detail below.

For example, FIG. 5B and FIG. 5C illustrate the passenger and driver side perspective views and demonstrates the rear cargo side 8 of the cargo bed area 5. Additionally, as described above in detail, FIG. 5B illustrates an example embodiment of the rail system 11 with portions of the rear cargo floor 2 and multifunctional tailgate door 3A removed for clarity. The cargo bed area 5 of the vehicle 1 includes a plurality of anchors 49. The plurality of anchors 49 may be comprised of metal, steel, or other similar material capable of holding a load securely in place.

The plurality of anchors 49 are affixed to the rear cargo floor 2. In an example embodiment, the plurality of anchors 49 are positioned on the surface of the rear cargo floor 2 and along the base of the second rear cargo side 8, opposite the first rear cargo side 6 and transverse to the third rear cargo side 10, and on the multifunctional tailgate 3A. The plurality of anchors 49 may be utilized individually or in conjunction with the plurality of winches 47. The plurality of anchors 49 are spaced apart and positioned to substantially align with the positioning or location of the plurality of winches 47. This allows for equal or substantially equal weight distribution while transporting the cargo load in the cargo bed area 5 of the vehicle 1.

Figure 5D:
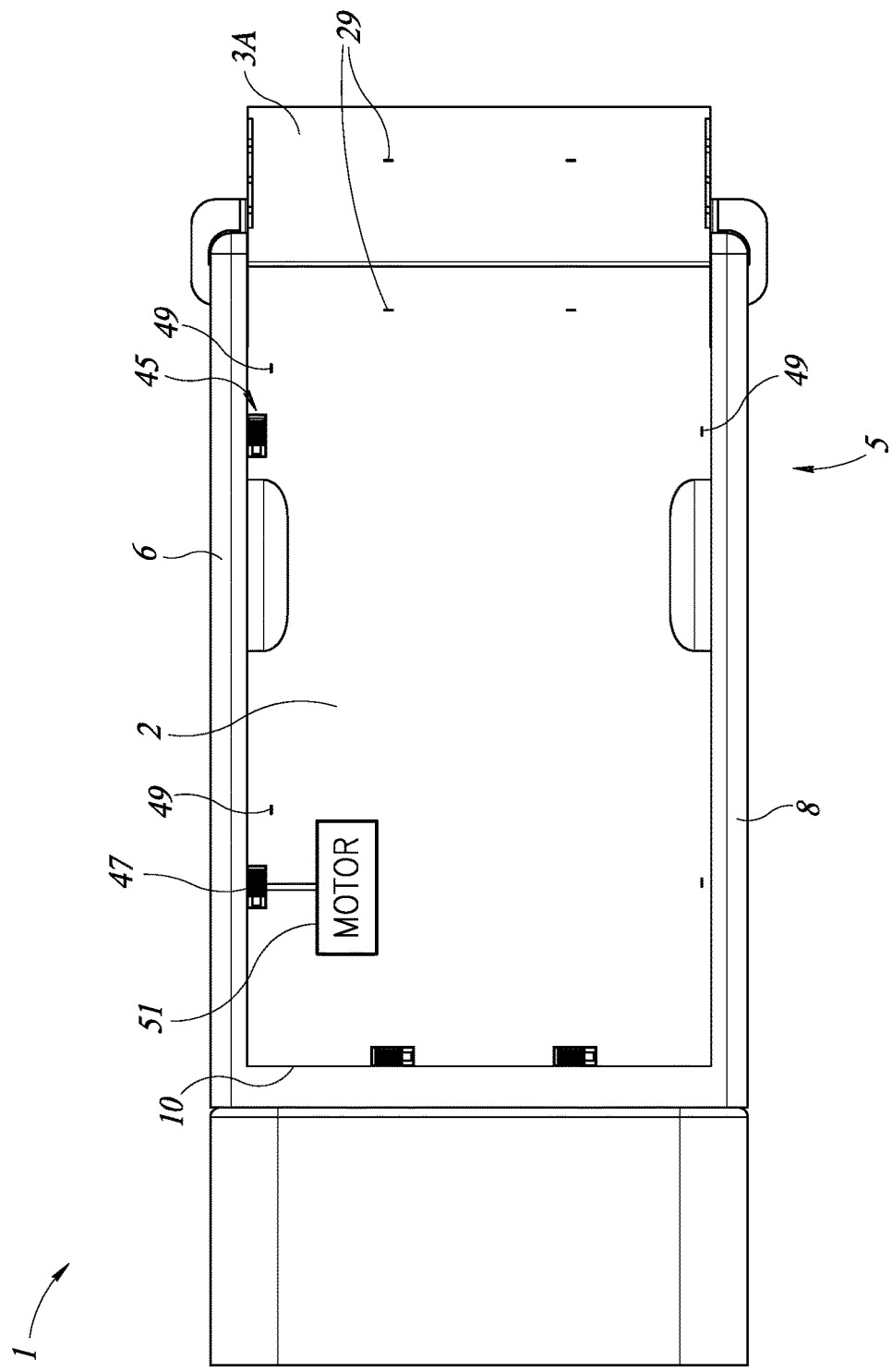
FIG. 5D is a top view of the vehicle and cargo bed load system of FIG. 5A.

FIG. 5D illustrates a top view of the vehicle 1 and cargo bed area 5. As described above, the plurality of recesses 45 situated within the rear cargo floor 2 are sized and shaped to respectively receive the plurality of winches 47. The plurality of winches 47 may be operated by a motor 51. The motor 51 may be a DC motor, permanent magnet motor, series wound motor, or other similar power source capable of cranking a winch. Although the embodiment illustrated in FIG. 5D shows a single motor 51, in some embodiments, each of the plurality of winches 47 may have an integrated motor 51 capable of operating the winch 47 or components thereof.

The motor 51 may power one winch or the plurality of winches 47 in the recesses 45. The motor 51 is housed in the cargo bed area 5 within the rear cargo floor 2. The motor 51 is electrically coupled to the winches 47. The motor 51 may be maneuvered and placed in a number of positions within the cargo bed area 5, and therefore is not limited to the position as shown in FIG. 5D.

Figure 6A:
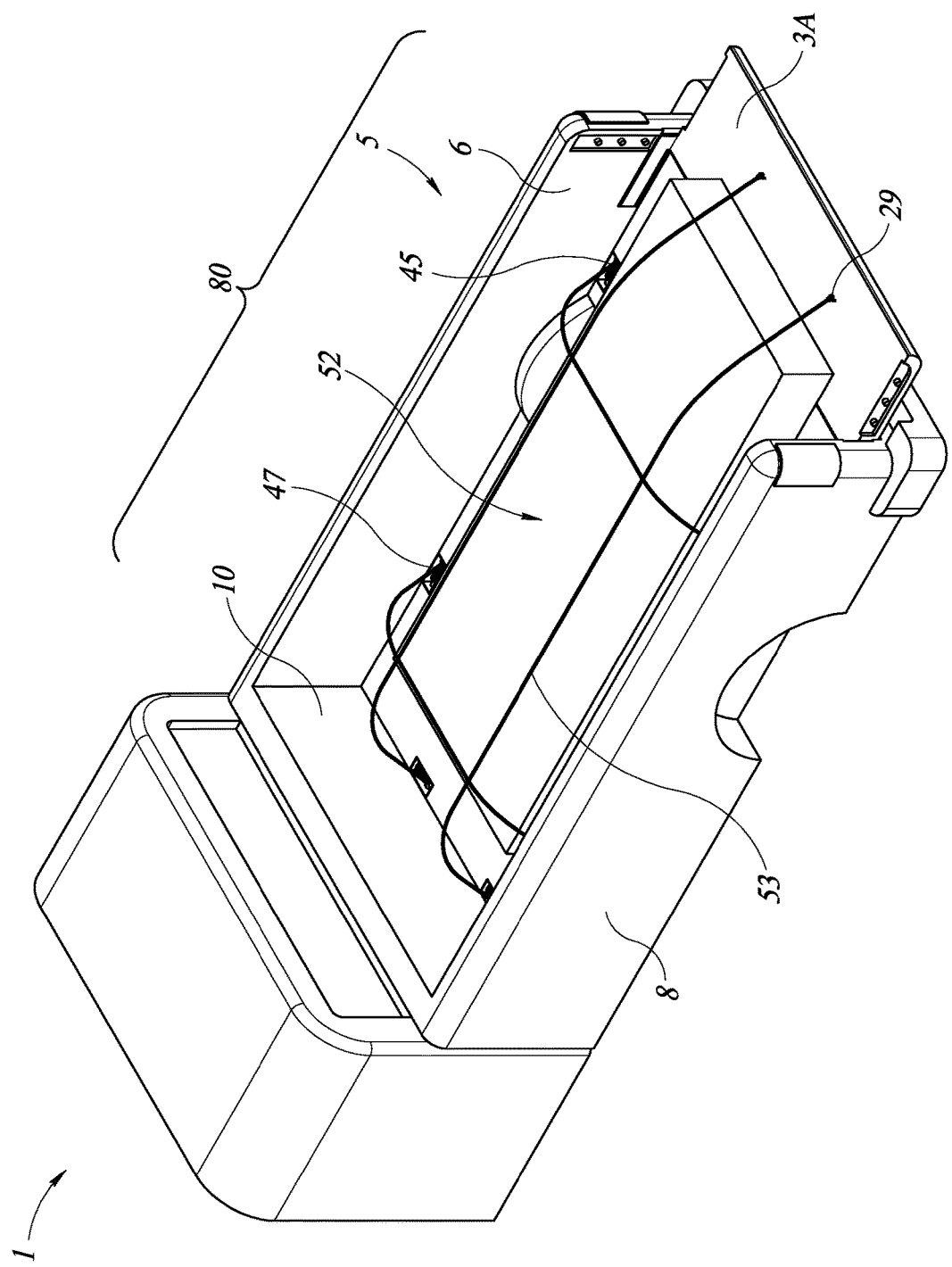
FIG. 6A is a driver side perspective view of the vehicle and cargo bed load system of FIG. 5A with a cargo bed cable and cargo load.
Figure 6B:
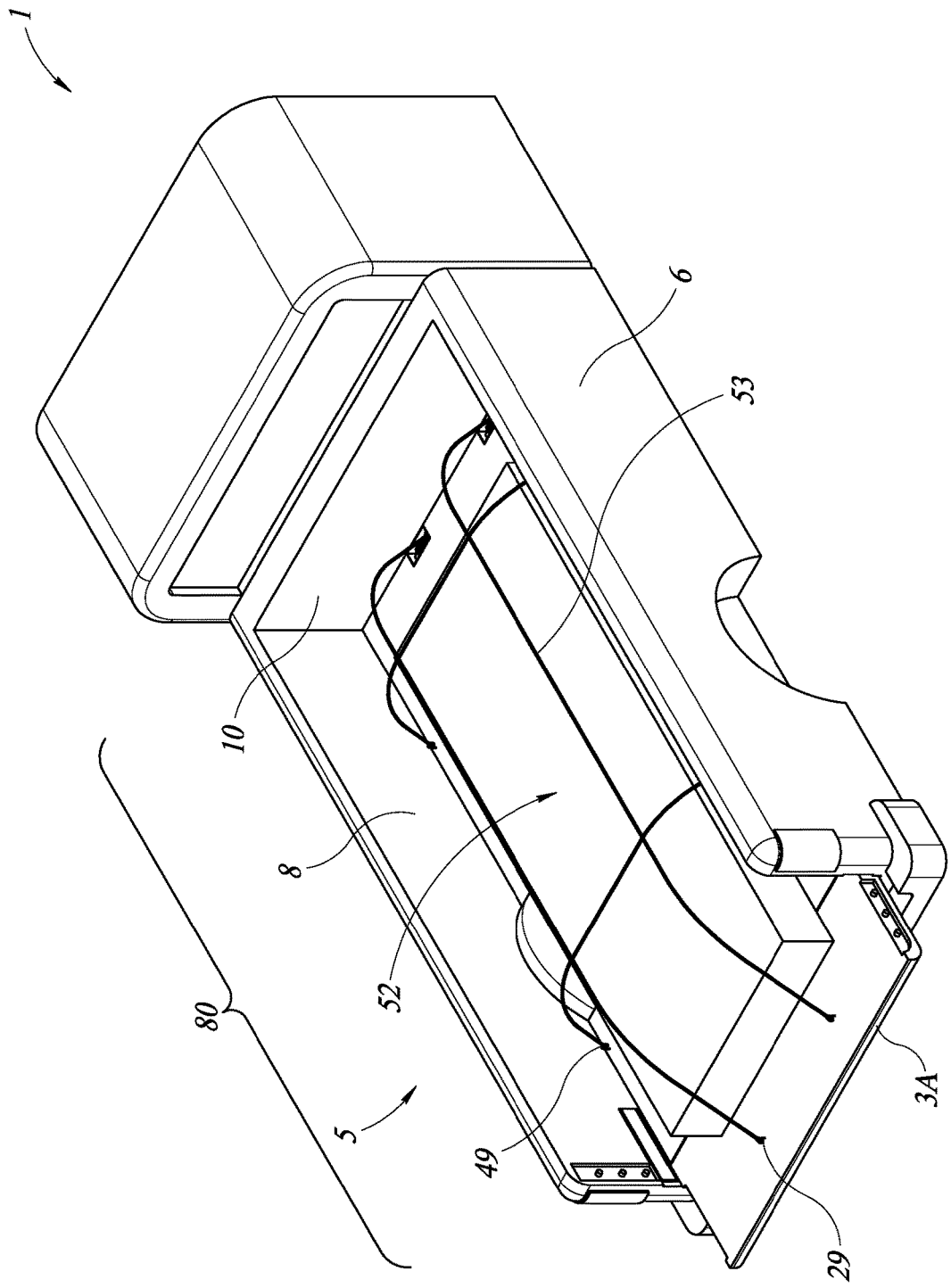
FIG. 6B is a passenger side perspective view of the vehicle and cargo bed load system of FIG. 5A with the cargo bed cable and cargo load.
Figure 6C:
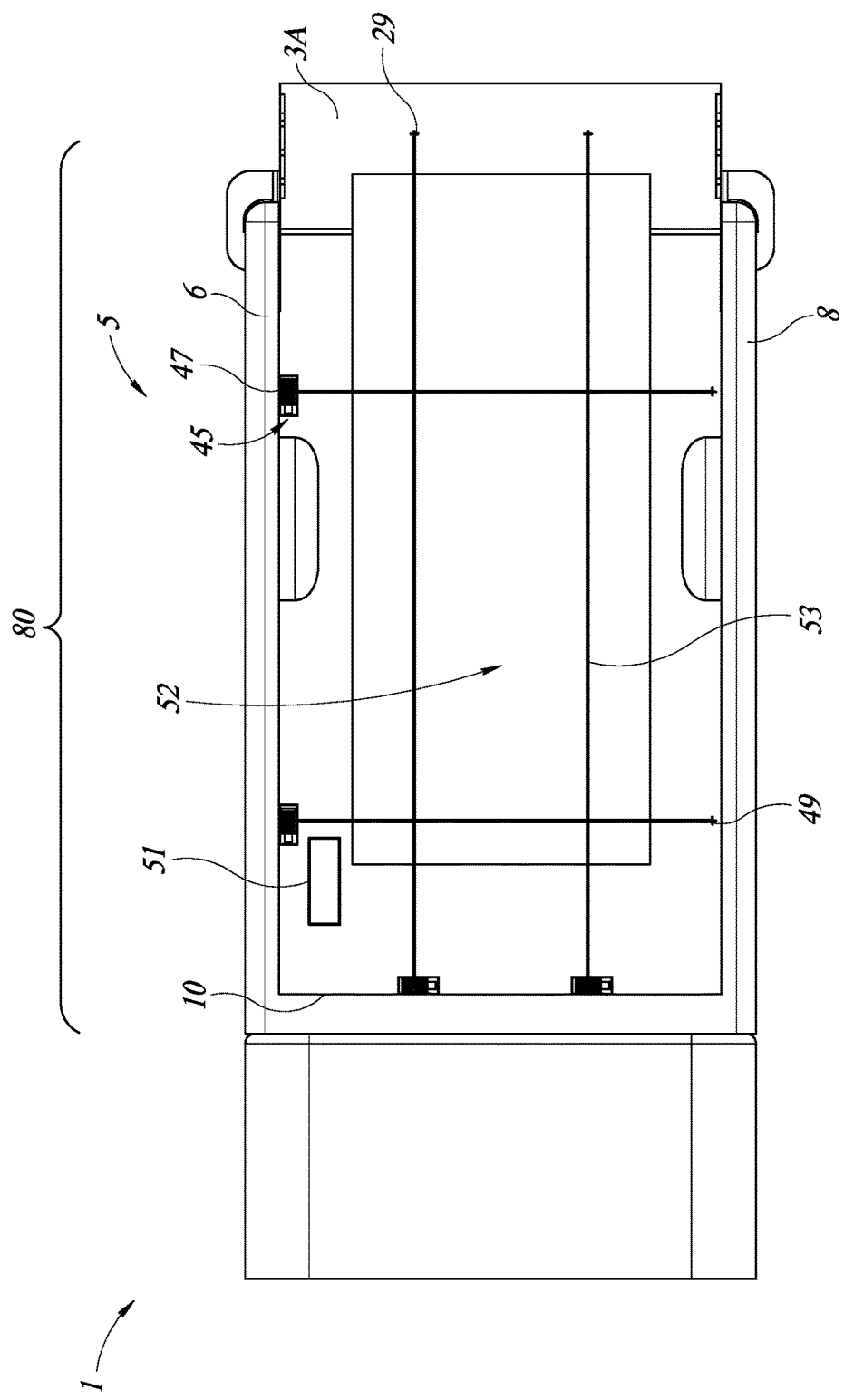
FIG. 6C is a top view of the vehicle and cargo bed load system of FIG. 5A with the cargo bed cable and cargo load.

FIGS. 6A-6C illustrate various views of a cargo bed load system 80 in the cargo bed area 5 of the vehicle 1. The cargo bed load system 80 includes the plurality of winches 47, the motor 51, and the plurality of anchors 49. Each of the plurality of winches 47 includes a winch cable 53 that is wound around a drum (not shown for clarity of description and illustration). The plurality of winch cables 53 may be a wire rope or cable and may be of various sizes and strength levels.

The plurality of winch cables 53 may be used collectively or individually to secure a cargo load 52 in the cargo bed area 5. For example, as shown in FIGS. 6A-6C, after the cargo load 52 is loaded into the cargo bed area 5, the winch cables 53 may be unwound from the drum and secured to the anchor 49. The motor 51 may thereafter be operated to remove slack, as illustrated in FIGS. 6A-6C, and add tension to the winch cables 53 to secure the cargo load 52. In some embodiments, the vehicle 1 may include a pair of winches 47 through which the winch cables 53 may extend in a longitudinal direction and secured to the corresponding anchors 49. In some embodiments, the vehicle 1 may include another pair of winches 47 through which the winch cables 53 may extend in a lateral or horizontal direction and secured to the corresponding anchors. In other embodiments, any number of winches 47 and anchors 49 may be arranged to secure the cargo load 52.

Accessibility of the cargo bed area 5 may be extended at a greater length when the winch cables 53 are attached to the at least one anchor 49 on the multifunctional tailgate door 3A, therefore increasing the size of the cargo bed area 5 by utilizing the rail system 11 in the first direction 21. As described above, in some embodiments, the linear actuator 33 may drive the rail system 11. The linear actuator 33 may be configured to provide any additional power that may be needed to extend the rail system 11 if a load is positioned on the multifunctional tailgate door 3 and cargo bed area 5. Moreover, the various embodiments described above can be combined to provide further embodiments.

FIGS. 7A-7D illustrate various views of an alternative embodiment of the multifunctional tailgate door 3B in the cargo bed area 5. In this embodiment, the multifunctional tailgate door 3B provides a variation in that it operates on a motorized platform. Again, the multifunctional tailgate door 3B rotates about a pivot point 81, which will be explained in more detail below. This motorized controllability is operable by at least three axis movements, which will be explained in further detail below. The multifunctional tailgate door 3B may operate in a vertical (up/down) or "axis A" movement 167, a full rotational or "axis B" movement 179 that rotates on the "axis A" movement 167, and a horizontal (in/out) or "axis C" movement 163.

In this embodiment, the multifunctional tailgate door 3B and the first and second cargo sidewall 6 includes a first multifunctional movement support apparatus 160A and a second multifunctional movement support apparatus 160B. The first multifunctional movement support apparatus 160A includes a first spline system 82A, which includes a first male spline member 161A, a first spline channel 155A, a first spline bracket 158A, and a first spline guiderail or track 156a on the first cargo sidewall 6. The second multifunctional movement support apparatus 160B (shown in FIG. 7B) includes a second spline system 82B, which includes a second male spline member 161B, a second spline channel 155B, a second spline bracket 158b, and a second spline guiderail or track 156B. The multifunctional tailgate door 3B further includes a first multifunctional spline bracket 168a and a first multifunctional spline guiderail or track 165A on a first multifunctional tailgate sidewall 159A. A second multifunctional spline bracket 168b and a second multifunctional spline guiderail or track 165B are positioned on a second multifunctional tailgate sidewall 159B, opposite to the first multifunctional tailgate sidewall 159A. The first and second multifunctional movement support apparatuses 160A, 160B may additionally include one or more seals, gears, O-rings, or the like which are provided to seal the multifunctional tailgate door 3B. Such seals may be positioned in or around the first and second spline channels 155A, 155B, or in other locations or areas to seal the multifunctional tailgate door 3B.

Figure 7A:
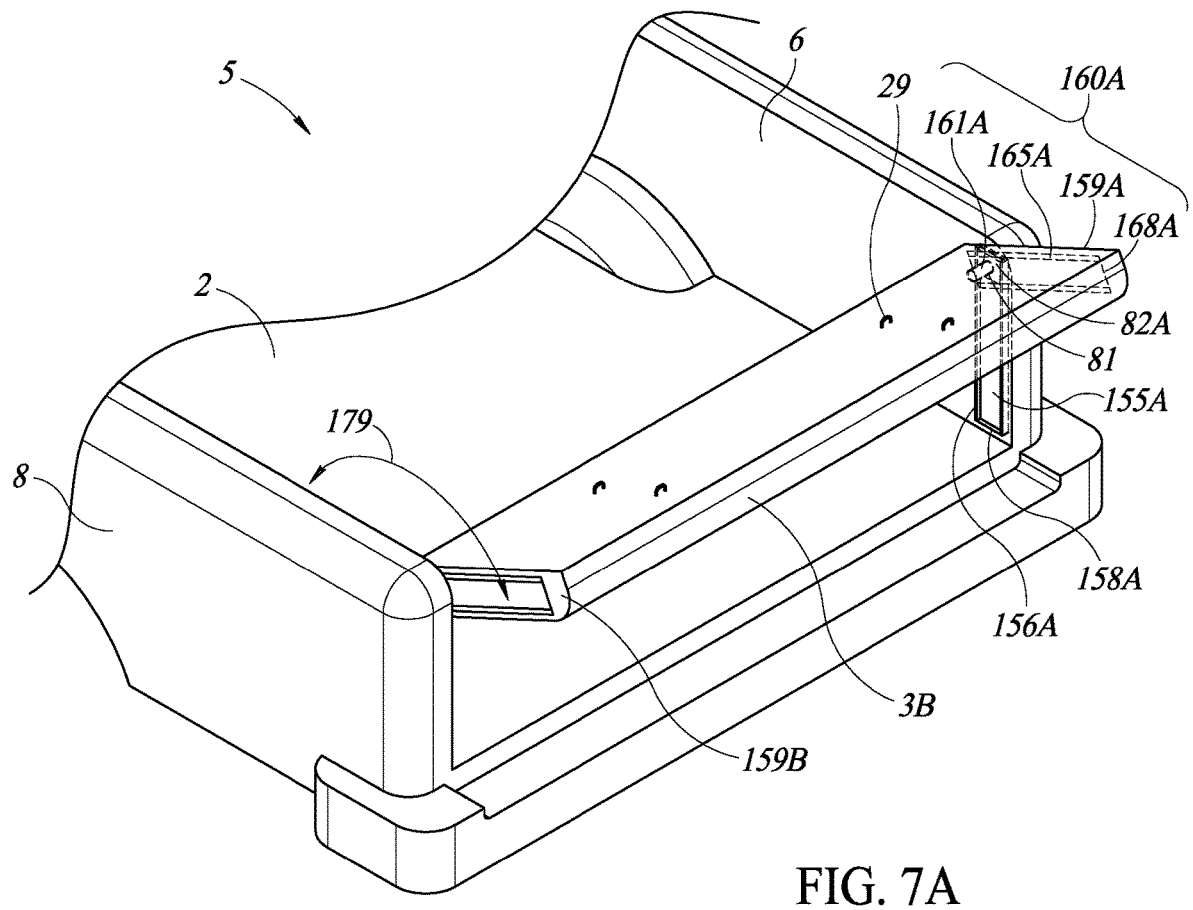
FIG. 7A is a perspective view of the vehicle and an example embodiment of the multifunctional tailgate door.
Figure 7B:
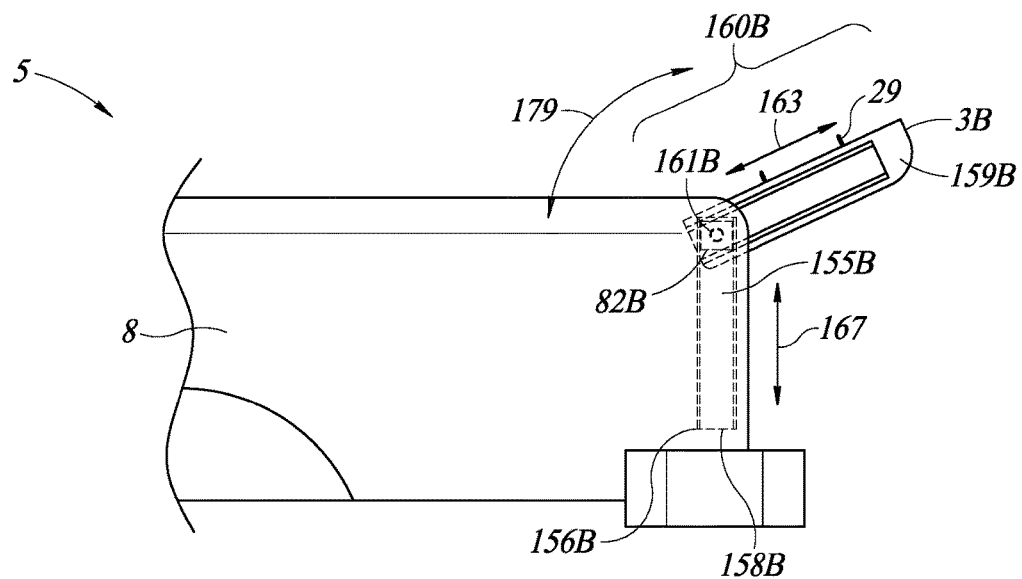
FIGS. 7B-7D are partial driver side views of the vehicle and the example embodiment of the multifunctional tailgate door of FIG. 7A, illustrating the multifunctional tailgate door in various positions.
Figure 7C:
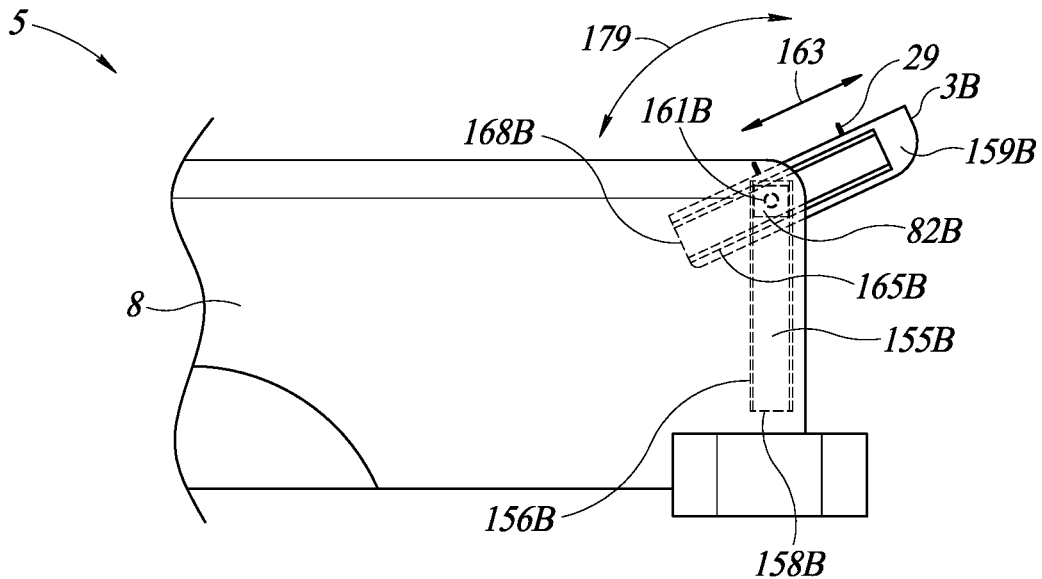
Figure 7D:
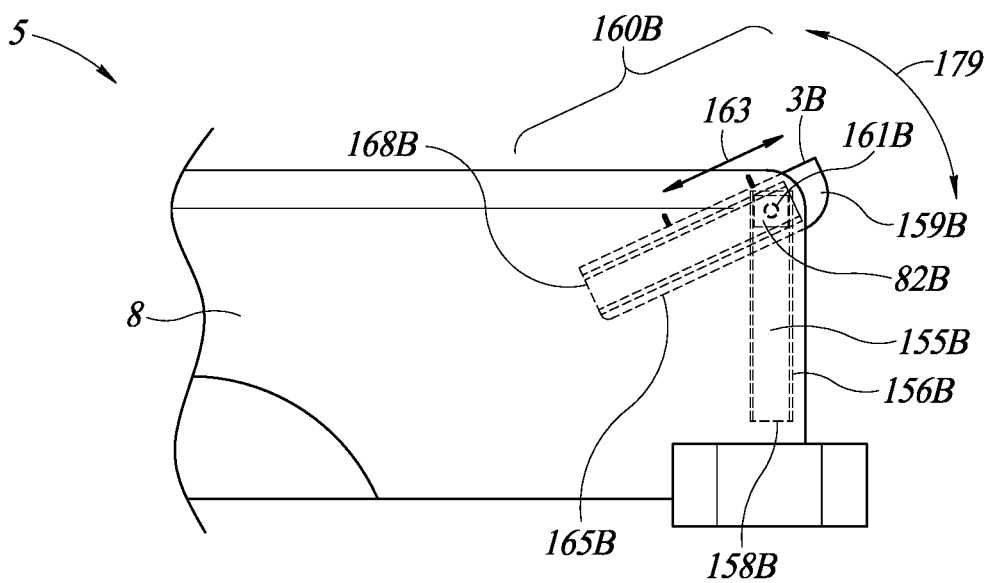

FIG. 7B is a partial driver side view of the embodiment of the multifunctional tailgate door 3B shown in FIG. 7A. As mentioned above, the axis "A" movement 167 is a vertical up and/or down sealed movement of the multifunctional tailgate 3B which permits its travel along the vertical direction on the inside of the first and second rear corner sidewalls 7, 9 of the vehicle 1. As the multifunctional tailgate door 3B moves vertically, the pivot point 81 also moves along with it. The axis "A" movement 167 controls the tailgate's adjustability equally on the first and second rear corner sidewalls 7, 9. This axis "A" movement 167 works in unison with both multifunctional tailgate door 3B sidewalls 159A, 159B to ensure proper operation and to mitigate misalignment issues (such as varying speeds) during synchronized vertical travel of the multifunctional tailgate door 3B. The first and second multifunctional movement support apparatuses 160A, 160B may include internal sealed gearing or other sealing structures to avoid dust, debris, and grime. This function of the multifunctional tailgate door 3B only raises or lowers the tailgate to change the elevation of the pivot point 81. The pivot point 81 is generally a point about which the multifunctional tailgate door 3B rotates around. The multifunctional tailgate door 3B can be positioned and oriented at different positions and orientations. For example, in FIG. 7B, the multifunctional tailgate door 3B is positioned at the highest point of the second spline channel 155B.

This configuration, for example, enables the multifunctional tailgate door 3B to function as a spoiler. Drag coefficients may be reduced or increased with the use of the multifunctional tailgate door 3B in the spoiler wind deflection position, as shown in FIG. 7B. The 45-degree tailgate adjustable spoiler wind deflection position increases the direct ram-air downward force by increasing the moment of aerodynamic drag coefficients. This increases the friction loads downforce onto the back tires of the truck resulting in more back end traction. The adjusted angular controlled spoiler may add measured downward force onto the back tires that benefit increased traction, without adding actual physical weight to the bed of the vehicle 1.

The full rotational or axis "B" movement 179 is a rotational movement that can be initiated based on any position of the multifunctional tailgate door 3B with respect to the axis "A" movement 167. The axis "B" movement 179 is configured as the moveable pivot point 81 for the first and second male spline members 161A, 161B. Each first and second spline members 161A, 161B include a corresponding shaft that connects or attaches the multifunctional tailgate door 3B through a first female spline member 162A and a second female spline member 162B. The axis "B" rotational movement 179 allows the multifunctional tailgate 3B to rotate at least 180 degrees from the standard or upright tailgate position, for example, as illustrated in FIG. 7A.

The horizontal (in/out) or axis "C" movement 163 provides a movement that follows both sides of the multifunctional tailgate door 3B. For example, this follows the axis "A" movement that has sealed movements travelling along the longitudinal direction of each multifunctional tailgate sidewall 159A, 159B of the multifunctional tailgate door 3B. The axis "C" movement 163 controls both sides and is calibrated to work in unison, thus assuring proper operation by not creating misalignment stresses or issues during synchronized longitudinal travel. The axis "C" movement extends from a retracted position within the first and second male spline member 161A, 161B of the axis "B" movement 179. If a user would prefer to remove the multifunctional tailgate door 3B from the vehicle 1, the user could retract the first and second male spline member 161A, 161B allowing removal of the tailgate. Once the first and second male spline member 161A, 161B is extended and locked into the female spline member 162A, 162B (not shown), the multifunctional tailgate door 3B is only able to extend or retract in and/or out from the connection point. This function allows changing of the distance of the multifunctional tailgate door 3B traveling into or away from the cargo bed area 5.

The first and second multifunctional movement support apparatus 160A, 160B functions in conjunction with the multifunctional tailgate door 3B to maneuver the moveable pivot point 81 in a manner that enables a user to adjust the multifunctional tailgate door 3B in a rotatably moveable, vertical, and/or horizontal position. For example, the multifunctional tailgate door 3B can be positioned at any vertical or horizontal height within the spline brackets 168A, 168B. By utilizing the first and second male spline members 161A, 161B, which will be explained in further detail below, the multifunctional tailgate door 3B may also rotate while in any position within the first and second multifunctional spline guiderail or tracks 165A, 165B, as mentioned above.

FIGS. 7A-12A illustrate the accessibility and maneuverability of the multifunctional tailgate door 3B.

Figure 8A:
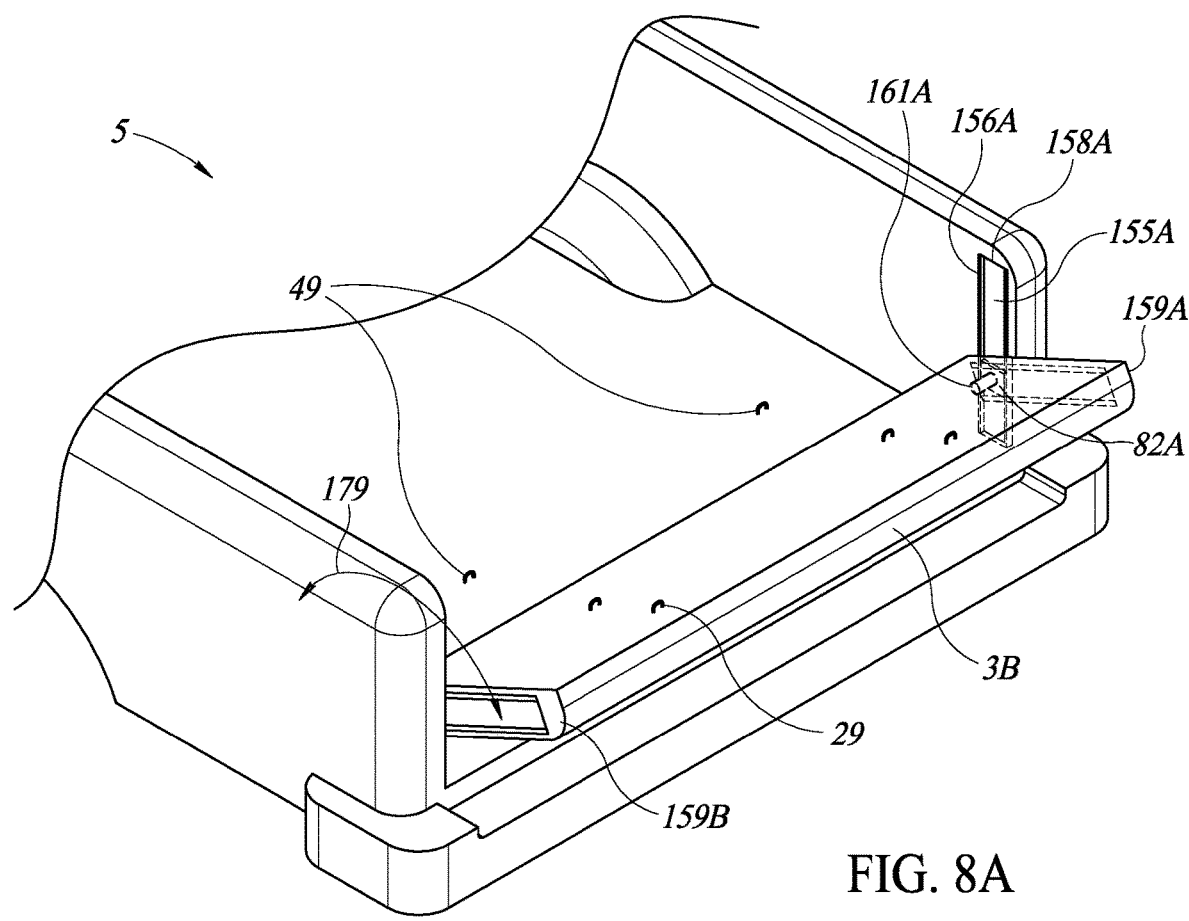
FIG. 8A is a perspective view of the vehicle and the example embodiment of the multifunctional tailgate door of FIG. 7A.
Figure 8B:
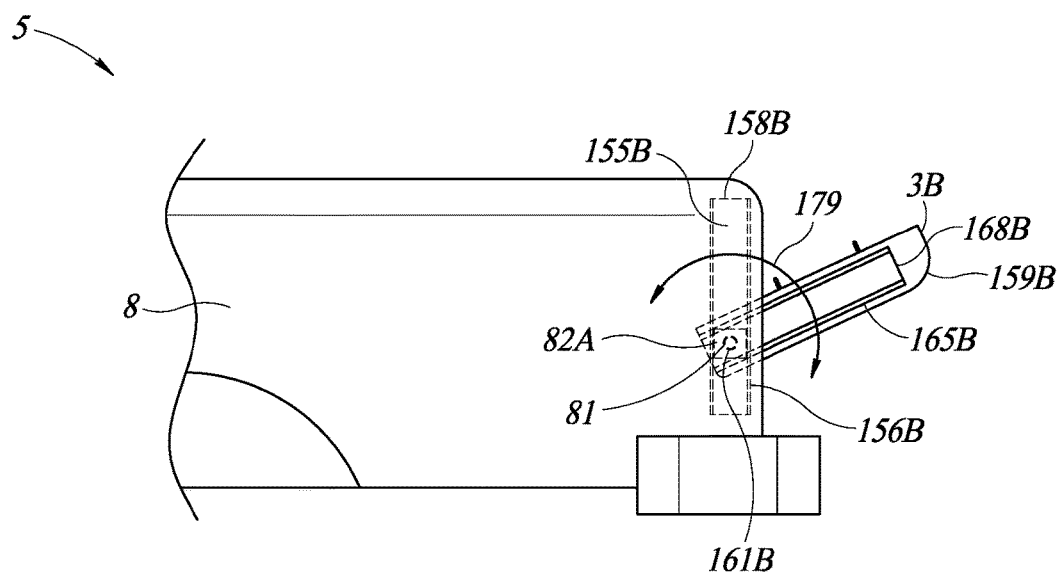
FIG. 8B is a partial driver side view of the vehicle and the example embodiment of the multifunctional tailgate door of FIG. 7A.

FIGS. 8A-8B illustrate the multifunctional tailgate door 3B moved in the axis A direction 167 along the first spline channel 155A and rotated in a clockwise direction on axis B 179. In particular, FIG. 8A shows a perspective view of the multifunctional tailgate door 3B, which is positioned approximately along a center of first spline channel 155A. The multifunctional tailgate door 3B may pivot at any point along the first and second spline channel 155A, 155B. As can be seen in FIG. 8B, the multifunctional tailgate door 3B is rotated in a clockwise direction, e.g., where an outer edge of the multifunctional tailgate door 3B is oriented away from the cargo bed area 5, and wherein the movable pivot point 81 is at a position along the second spline channel 155B.

Figure 9A:
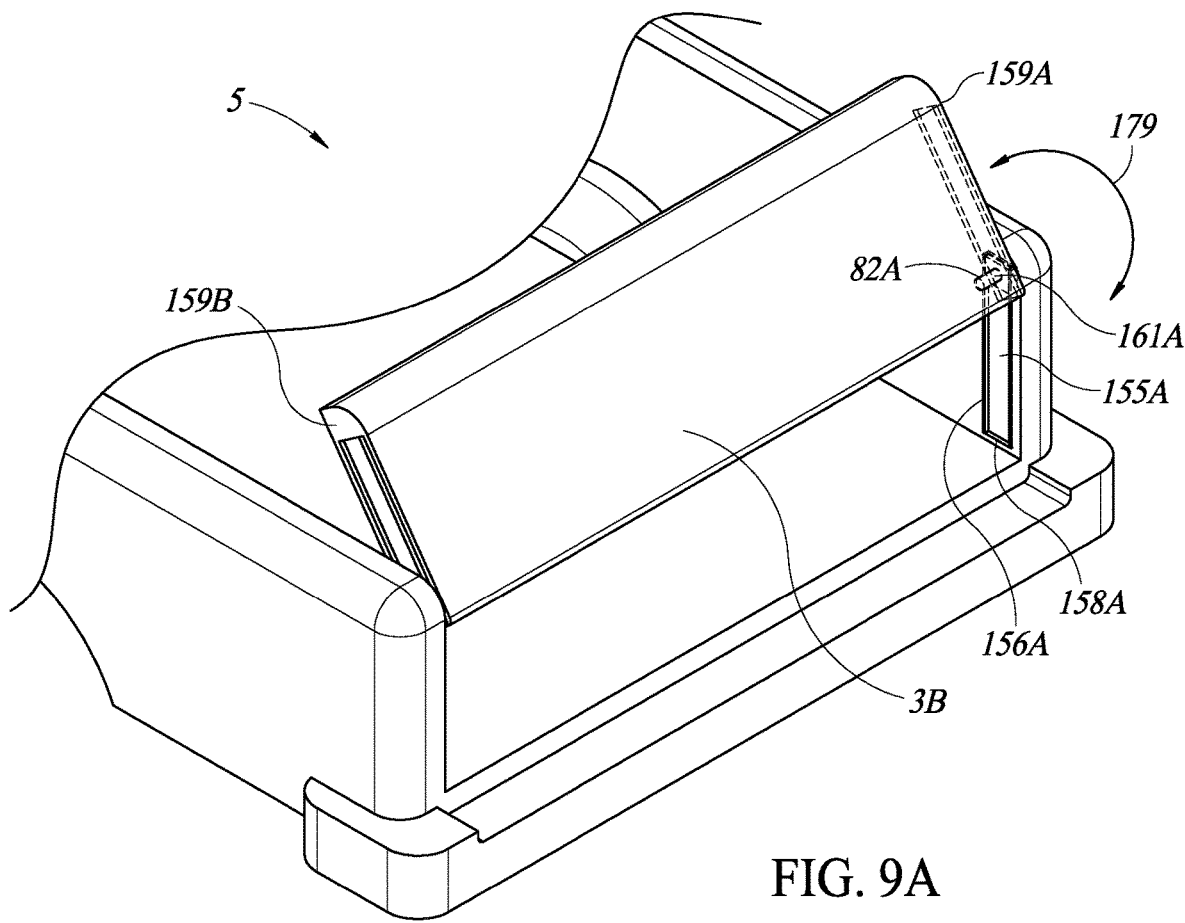
FIG. 9A is a perspective view of the vehicle and the example embodiment of the multifunctional tailgate door of FIG. 7A.
Figure 9B:
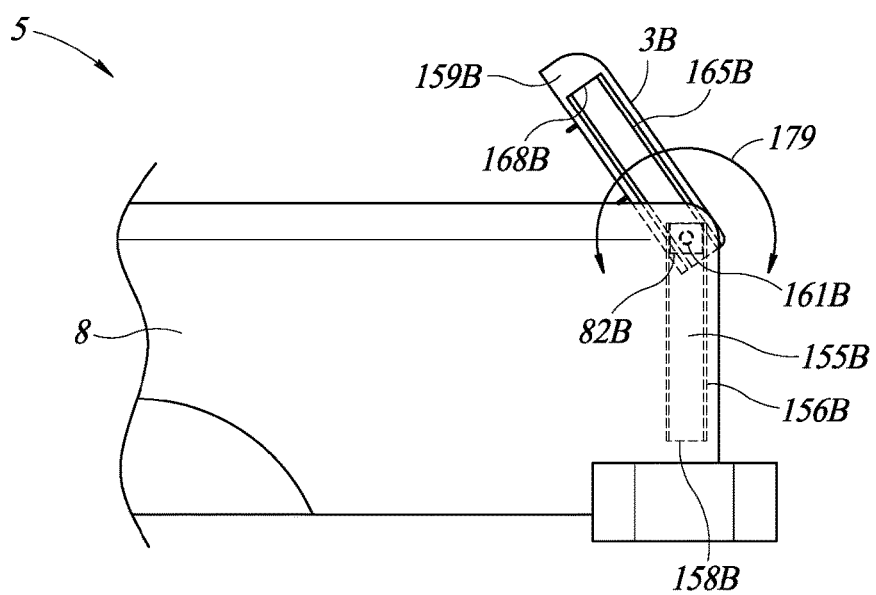
FIG. 9B is a partial driver side view of the vehicle and the example embodiment of the multifunctional tailgate door of FIG. 7A.

FIGS. 9A-9B illustrate the multifunctional tailgate door 3B moved in the axis A direction 167 along the first spline channel 155A and rotated in a counter-clockwise direction on axis B 179. In particular, FIG. 9A shows a perspective view of the multifunctional tailgate door 3B, which is moved near an upper end of the first spline channel 155A. The multifunctional tailgate door 3B may pivot at any height and point along the first and second spline channel 155A, 155B, as demonstrated in FIG. 9A. As can be seen in FIG. 9B, the multifunctional tailgate door 3B is rotated in a counter-clockwise direction, e.g., where an outer edge of the multifunctional tailgate door 3B is oriented toward the cargo bed area 5, and wherein the movable pivot point 81 is at the highest position along the second spline channel 155B.

Figure 10A:
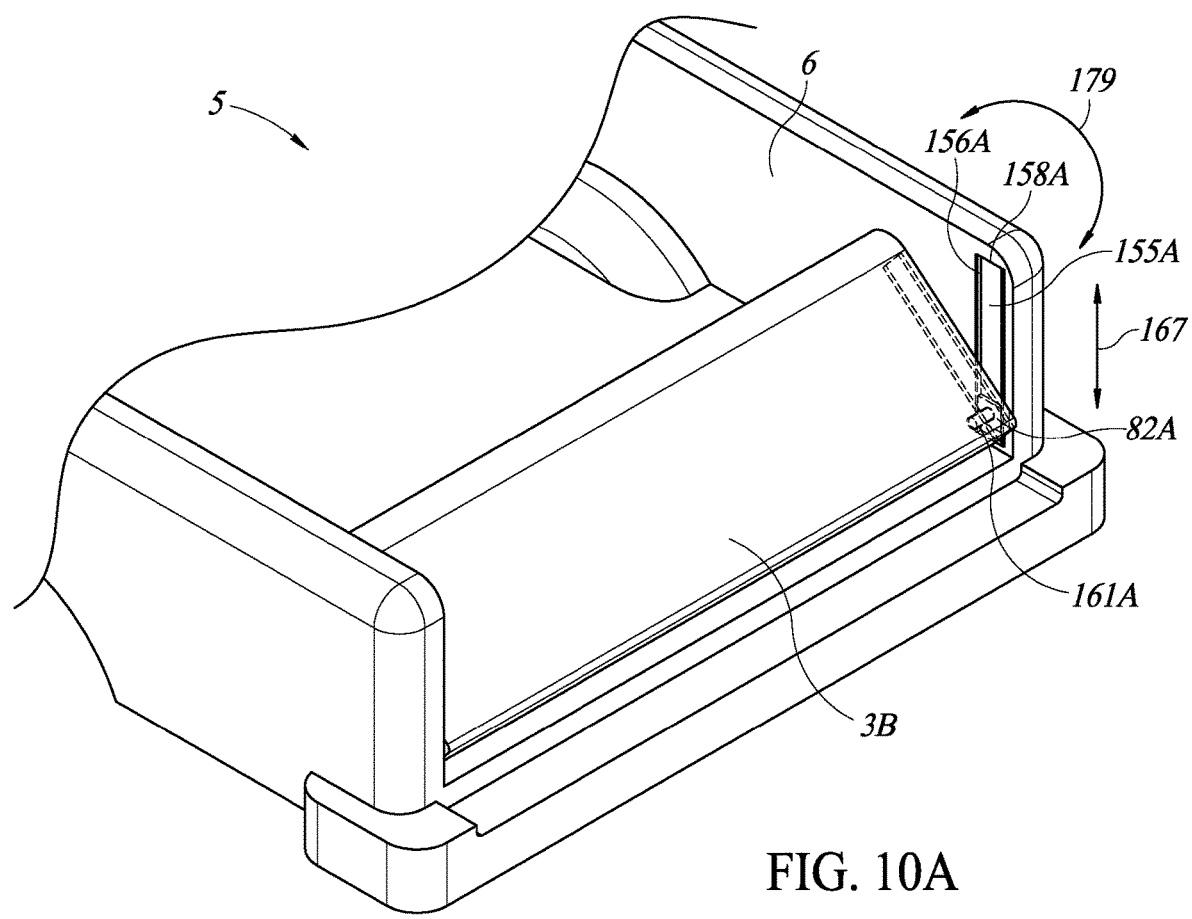
FIG. 10A is a perspective view of the vehicle and the example embodiment of the multifunctional tailgate door of FIG. 7A.
Figure 10B:
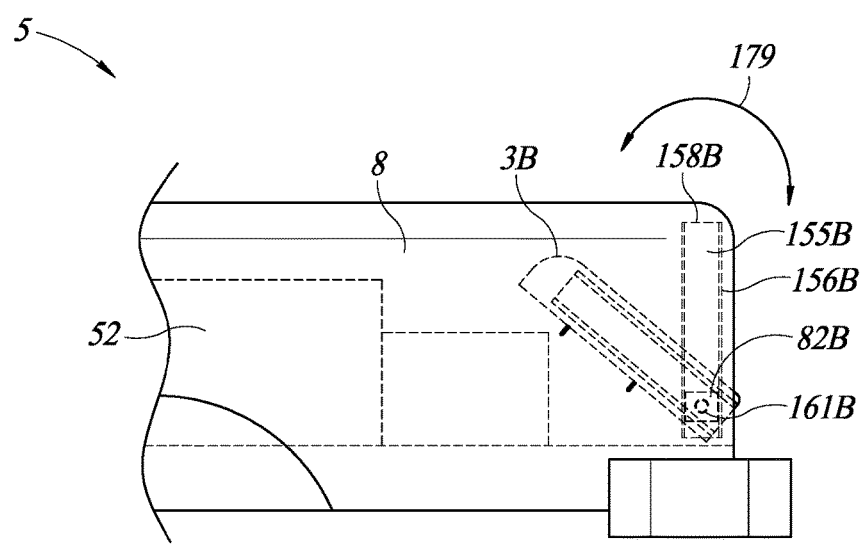
FIGS. 10B-10D are partial driver side views of the vehicle and the example embodiment of the multifunctional tailgate door of FIG. 7A with cargo.

FIGS. 10A-10B illustrate the multifunctional tailgate door 3B moved in the axis A direction 167 along the first spline channel 155A and rotated in a counter-clockwise direction on axis B 179. In particular, FIG. 10A shows a perspective view of the multifunctional tailgate door 3B, which is moved near a lower end of the first spline channel 155A. As can be seen in FIG. 10B, the multifunctional tailgate door 3B is rotated in a counter-clockwise direction, e.g., where an outer edge of the multifunctional tailgate door 3B is oriented toward the cargo bed area 5, and wherein the movable pivot point 81 is at a position along the second spline channel 155B and the multifunctional tailgate door 3B is rotated in a counter-clockwise direction on axis B 179.

Figure 10C:
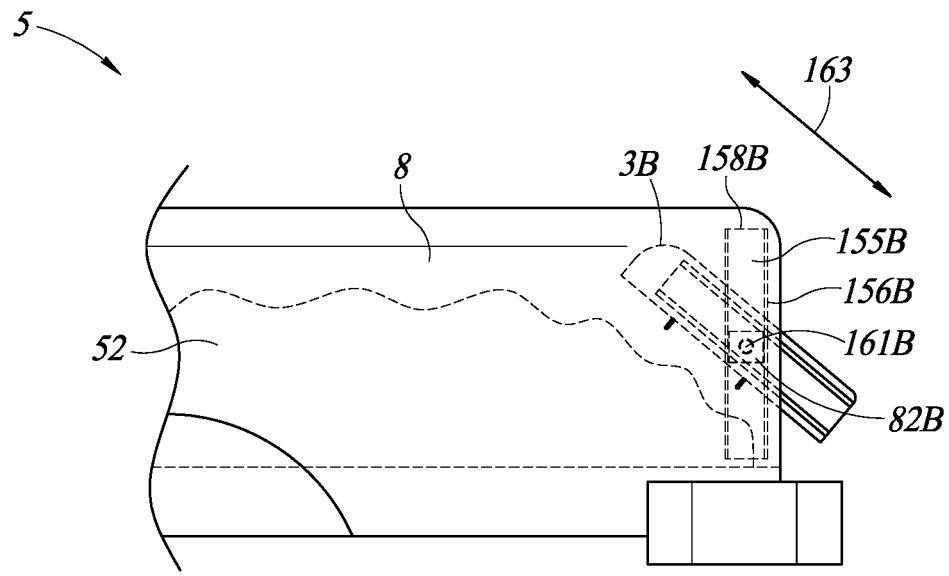
Figure 10D:
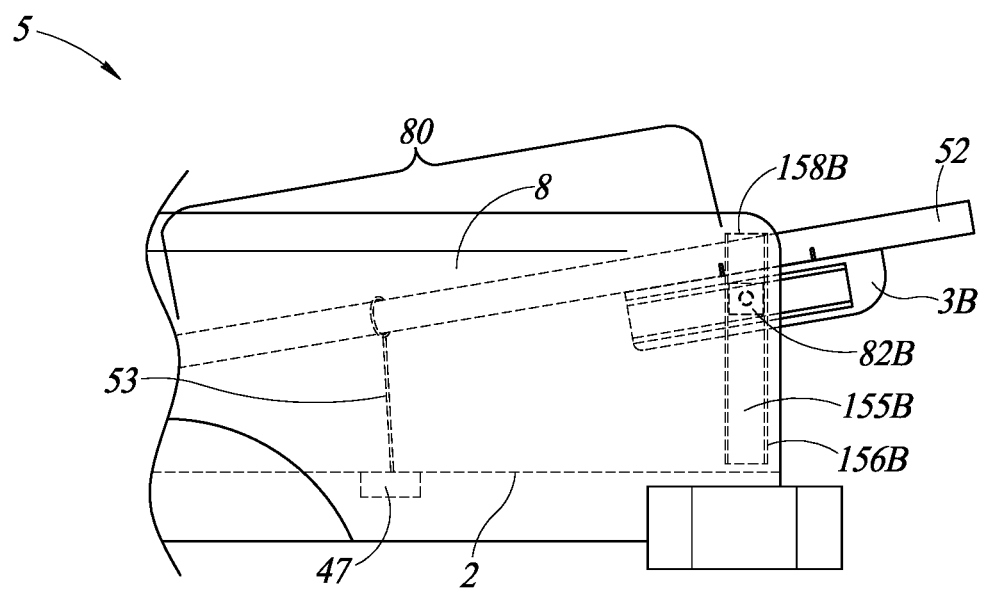

FIGS. 10C and 10D illustrate certain applications of the multifunctional tailgate door 3B in which the cargo may extend beyond the cargo bed area 5. For example, in FIG. 10C, the multifunctional tailgate door 3B is moved in a counter-clockwise direction on axis B 179 to orient it in a manner such that it secures the cargo 52. In this manner, a barrier may be formed that secures the cargo 52 of varying sizes, shapes, and arrangements. In particular, as shown in FIG. 10C, the multifunctional tailgate door 3B compacts and secures cargo 52, such as garbage, or any other type of stowed pile that may or may not extend beyond the cargo bed area 5.

FIG. 10D illustrates another application in which the multifunctional tailgate door 3B may work in conjunction with the cargo bed load system 80 to secure long pieces of cargo 52 such as lumber stacked or bundled. The multifunctional tailgate door 3B may be oriented in a manner shown in FIG. 10D such that it can provide a support to the cargo 52 load by displacing the pressure of the load throughout the surface of the multifunctional tailgate door 3B, as opposed to weight pressures of the load being borne by a top thin edge of the conventional tailgate when in the closed position.

The plurality of winch cables 53 extending from the plurality of winches 47 may tighten down the cargo 52 and help secure the load. This may be accomplished by looping the cable 53 around the cargo 52 and connecting an end of the winch cable 53 onto itself with a hook/clip, or by connecting to one of the plurality of anchors 49 affixed to the rear cargo floor 2 or the plurality of anchors 29 affixed to the multifunctional tailgate door 3B. This use of the cargo bed load system 80 and the multifunctional tailgate door 3B will help secure the cargo 52 from moving because the winch 47 can withdraw and tighten the winch cable 53 and efficiently secure the cargo 52. Additionally, this embodiment provides the security of a winch tie-down without having to find a rope or bungee to secure the load.

Figure 11A:
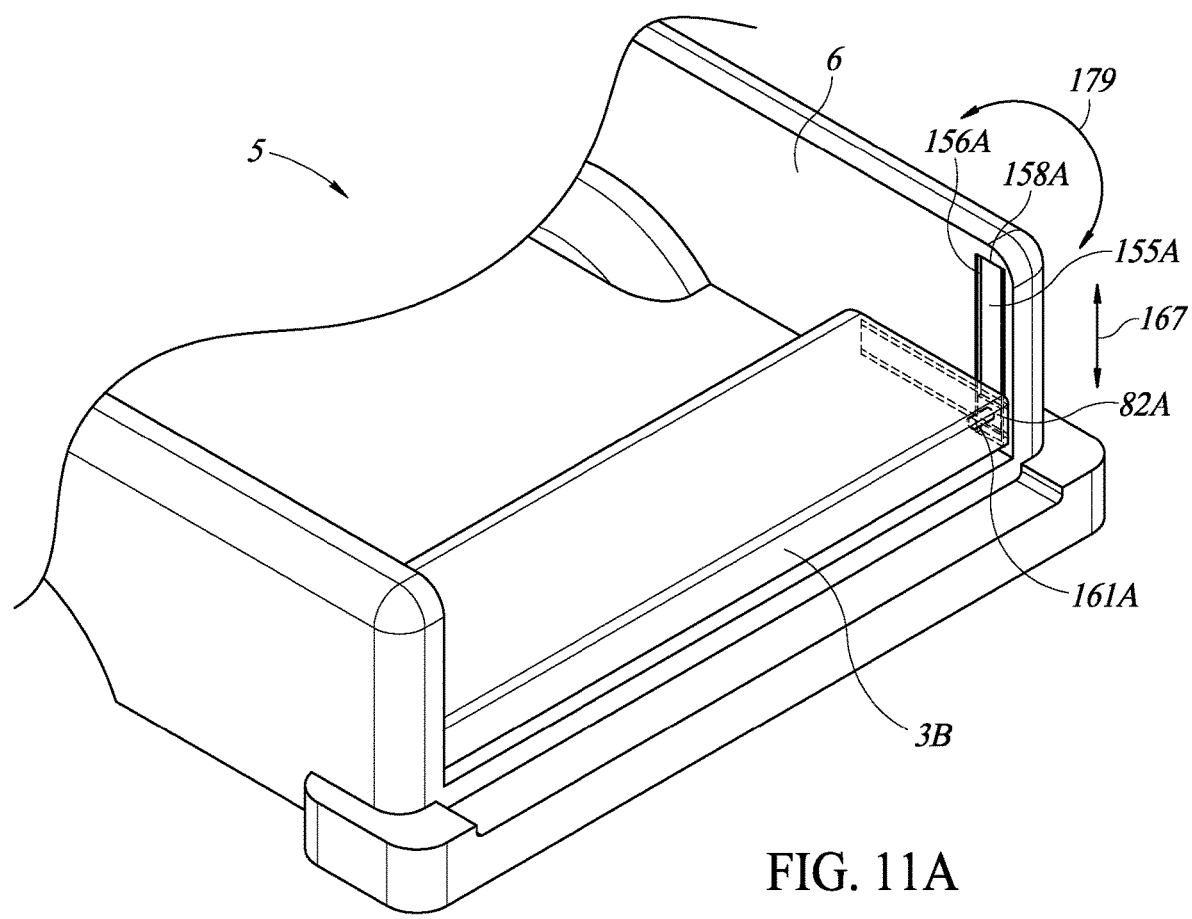
FIG. 11A is a perspective view of the vehicle and the example embodiment of the multifunctional tailgate door of FIG. 7A.
Figure 11B:
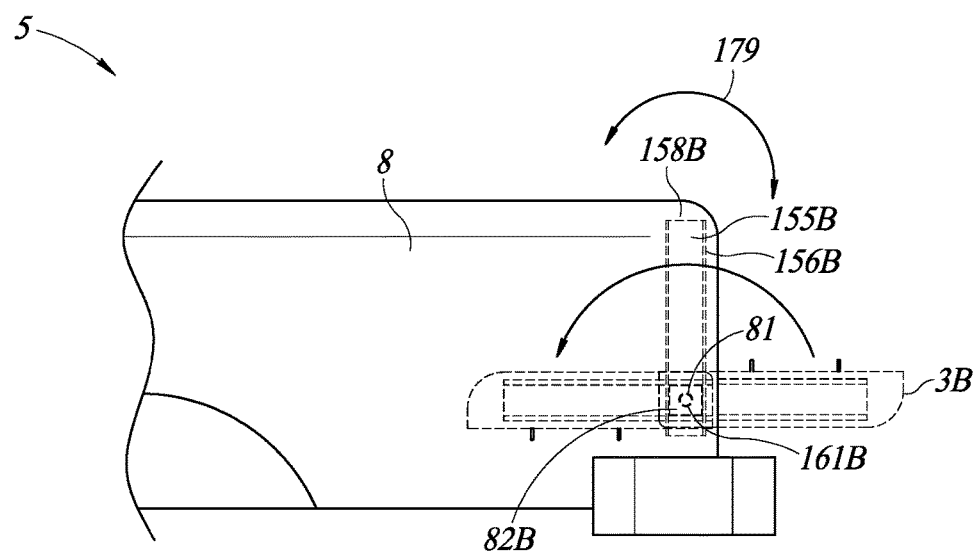
FIG. 11B is a partial driver side view of the vehicle and the example embodiment of the multifunctional tailgate door of FIG. 7A.

FIGS. 11A-11B illustrate the multifunctional tailgate door 3B moved in the axis A direction 167 along the first spline channel 155A and rotated in a counter-clockwise direction on axis B 179. In particular, FIG. 11A shows a perspective view of the multifunctional tailgate door 3B at a position in the axis A direction 167 along the first spline channel 155A and rotatably moved to a position where the multifunctional tailgate door 3B is approximately parallel to the rear cargo floor 2. FIG. 11B shows a partial driver side view of the multifunctional tailgate door 3B and wherein the moveable pivot point 81 is at the lowest position along the second spline channel 155B. This position enables the multifunctional tailgate door 3B to remain approximately parallel with the rear cargo floor 2 and compress small or thin cargo, such as plywood or drywall.

Figure 12A:
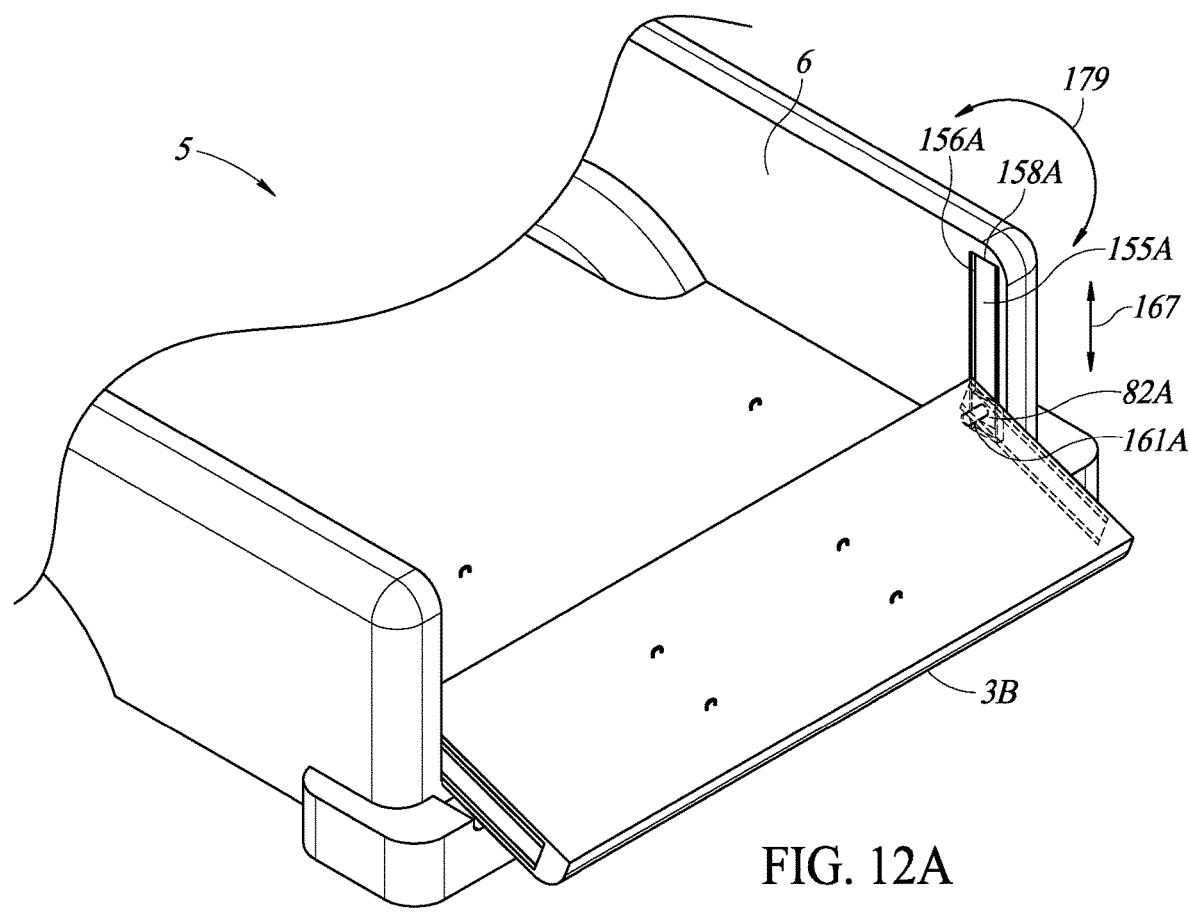
FIG. 12A is a perspective view of the vehicle and an example embodiment of the multifunctional tailgate door.

FIG. 12A demonstrates the multifunctional tailgate door 3B that has been rotated in axis B 179 to be oriented in the manner illustrated. In particular, as shown in FIG. 12A, the multifunctional tailgate door 3B may be rotated when it is in vertical position, such as the lower vertical position shown in FIGS. 12A, 12B, such that it extends beyond the conventional 90 degree "open" tailgate position and an end portion of the multifunctional tailgate door 3B can be oriented angularly past the rear cargo floor 2, allowing for ease of loading cargo.

Figure 12B:
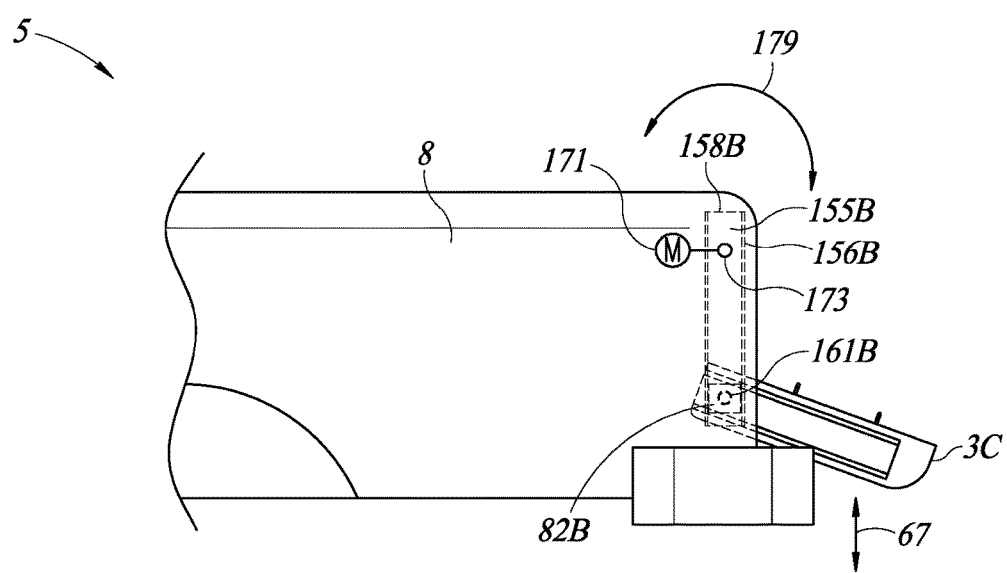
FIGS. 12B and 12C are partial driver side views of the vehicle and the example embodiment of the multifunctional tailgate door of FIG. 12A illustrating the multifunctional tailgate door in various positions.

FIG. 12B shows an embodiment of a multifunctional tailgate door 3C that is similar to the various embodiments of the multifunctional tailgate door 3A and 3B described herein, but also includes a motor 171. The motor 171 is positioned in the first (not shown for clarity of illustration and description) and/or second rear cargo side 8 with a controller 173 that is operably coupled to the motor 171. As described above, the motor 171 is capable of controllably operating the multifunctional tailgate door 3C. The controller 173 is operably coupled to the motor 171, wherein during operation, the controller 173 provides a signal to the motor 171 to controllably operate the multifunctional tailgate door 3C on axis A 167, axis B 179, and/or axis C 163. The motor 171 may be located on the first and/or second rear corner sidewall 7, 9.

Figure 12C:
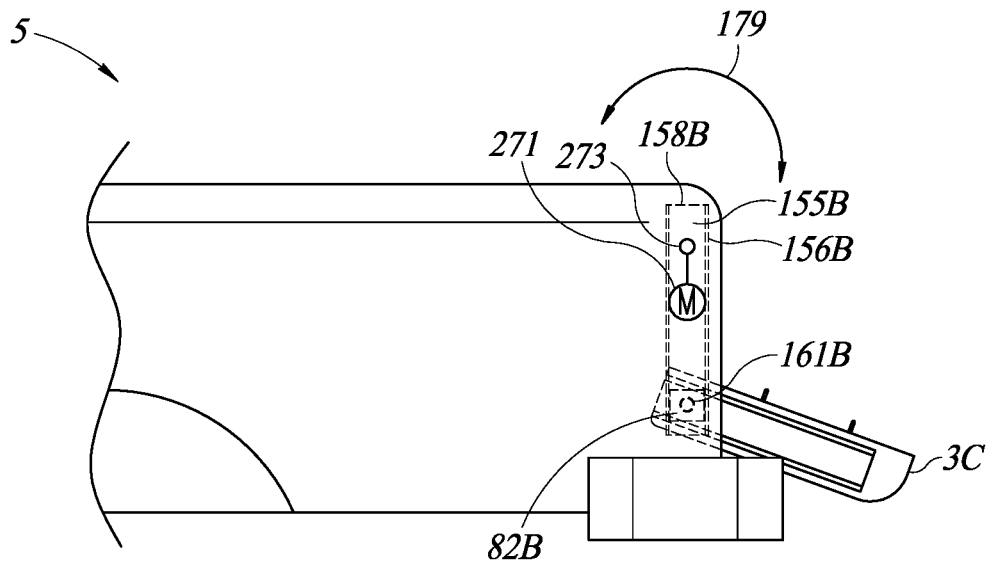

FIG. 12C shows another example embodiment of the multifunctional tailgate door 3C. The multifunctional tailgate door 3C is similar to the embodiment illustrated in FIG. 12B, but provides a variation in which a motor 271 is positioned in the first and/or second rear corner sidewalls 7, 9 with a controller 273 that is operably coupled to the motor 271. In this embodiment, the multifunctional tailgate door 3C has affixed hard points and omits the use of cables, which allows for seamless versatility while operating the multifunctional tailgate door 3C. As with other embodiments of the multifunctional tailgate door 3C, in some embodiments, the support cables may also be optionally integrated.

Figure 12D:
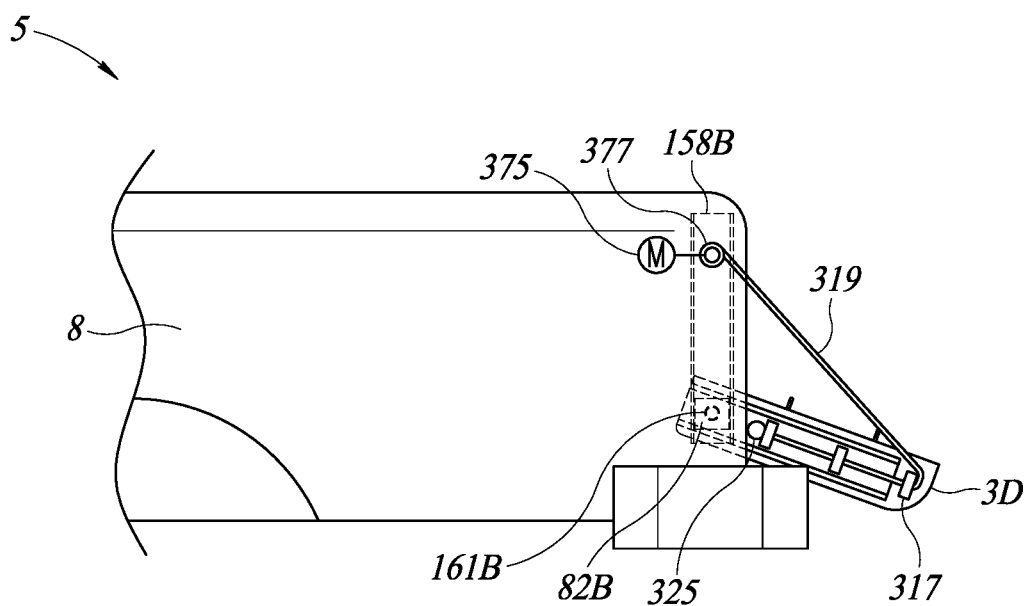
FIG. 12D is a partial driver side view of the vehicle and an example embodiment of the multifunctional tailgate door.

FIG. 12D shows an embodiment of a multifunctional tailgate door 3D that is similar to the various embodiments of the multifunctional tailgate door 3A-3C described herein, but provides a variation in which a motor 375 is provided and a cable 319 is provided. The motor 375 is operably coupled to a controller 377. A plurality of clamps 317 are affixed to the multifunctional tailgate door 3D and secured in place by a pin member 325. In this embodiment, the motor 375 helps release and/or respool the cable 319 to obtain preferred tailgate angles. The motor 375 may be housed within the first and/or second rear cargo sides 6, 8 for preferred tailgate angles that can be selected from various hard-point options within the multifunctional tailgate door 3D.

Figure 12E:
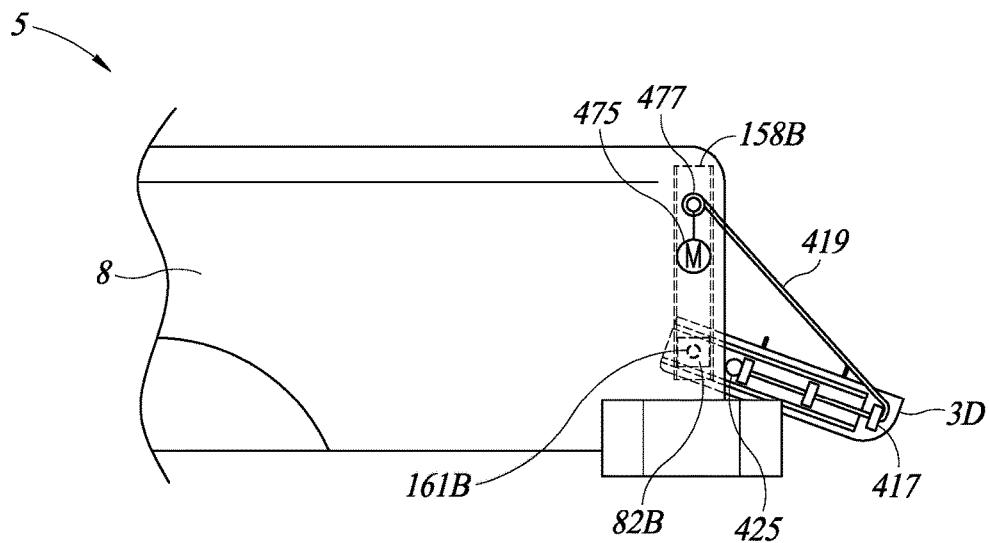
FIG. 12E is a partial driver side view of the vehicle and the example embodiment of the multifunctional tailgate door of FIG. 12D.

FIG. 12E shows the example embodiment of the multifunctional tailgate door 3D of FIG. 12D, but provides a variation in which a motor 475 is housed in the first and/or second rear corner sidewalls 7, 9, and helps release and/or respool the cable 419 as described above. A cable 419 is coupled to a controller 477 that is operably coupled to the motor 475. A plurality of clamps 417 are affixed to the multifunctional tailgate door 3D and secured in place by a pin member 425.

Figure 13:
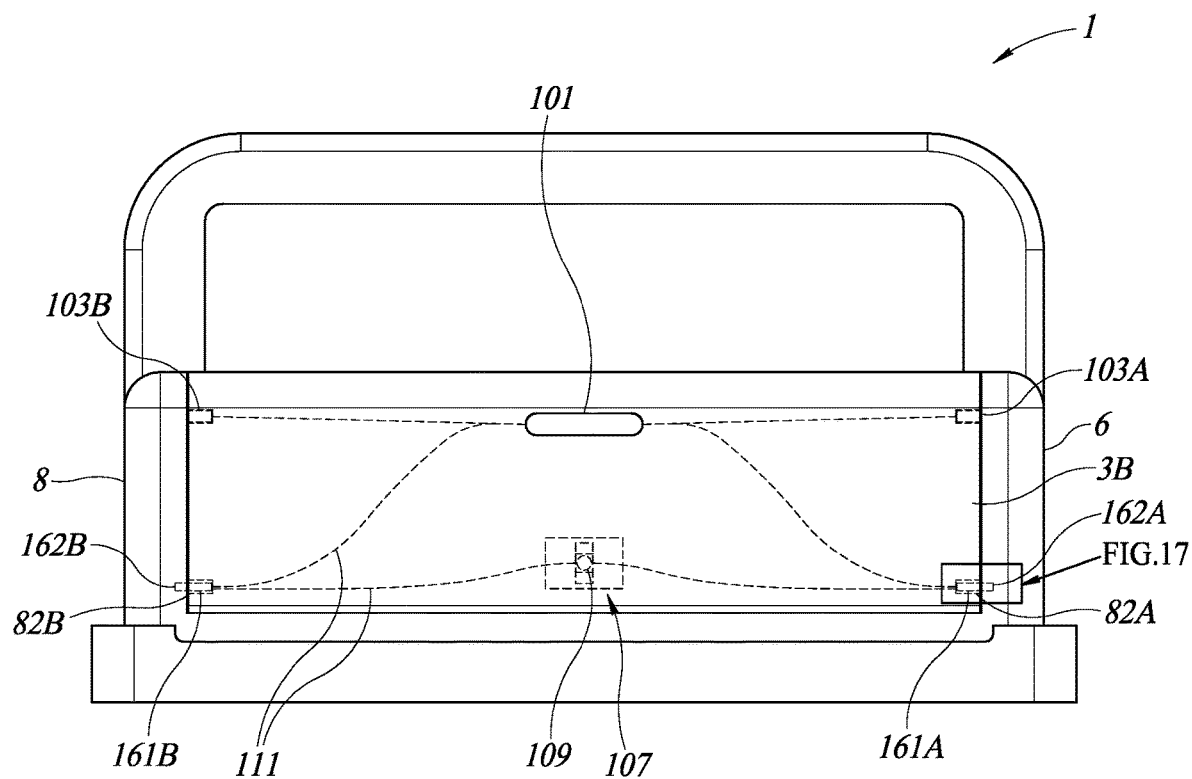
FIG. 13 is a rear view of the vehicle and the example embodiment of a multifunctional tailgate door of FIG. 7A.

FIG. 13 is a rear view illustration of the vehicle 1 and the multifunctional tailgate door 3B of FIG. 7A. Specifically, FIG. 13 shows a variety of elements included in the multifunctional tailgate door 3B of FIG. 7A, which includes a center top latch 101 and retraction pins 103A, 103B. The retraction pins 103A, 103B are located on both sides of the multifunctional tailgate door 3B that extend into the rear corner sidewalls 7, 9 (not shown). The center top latch 101 is coupled to the retraction pins 103A, 103B by a plurality of cables 111 that span the width of the multifunctional tailgate door 3B. The plurality of cables 111 are also located within a cover panel 107 of the multifunctional tailgate door 3B.

A cabled or steel rod turn/twisting style locking device 109 is housed behind the cover panel 107 within the multifunctional tailgate door 3B. The multifunctional tailgate door 3B includes the first and second male spline members 161A, 161B, and the first and second female spline members 162A, 162B. The locking device 109 retracts either one or both sides of the first and second male spline members 161A, 161B located on the tailgate. As the first and second male spline members 161A, 161B are turned, they are received in the first and second female spline members 162A, 162B located in the rear corner sidewalls 7, 9 (not shown). The locking device 109 includes a bolt having splined gears that are configured to turn in one direction. As a result, the splines and gears transmit torque and have external teeth that enable the gears to lock into place with a mating component, such as the first and second male spline members 161A, 161B locking in place with the first and second female spline members 162A, 162B. This enables both sides of the multifunctional tailgate door 3B to simultaneously transfer torque and thus allow for synchronous operation. Additionally, the turning of the splined gears in one direction allows for removal of the multifunctional tailgate door 3B in one direction only, which ensures keeping the first and second male spline members 161A, 161B bolted on the tailgate and the first and second female spline members 162A, 162B on the rear corner sidewalls 7, 9 working synchronously, which can prevent misalignments.

If the multifunctional tailgate door 3B has to be fully removed, the multifunctional tailgate door 3B is generally moved along the axis "C" movement 163 via the pivot point 81 to the position shown in FIG. 7A. Thereafter, the multifunctional tailgate door 3B can be moved to the lowest position along axis A 167, as shown, for example, in FIG. 10A. When the multifunctional tailgate door 3B is in this position, it can be rotated and moved as a conventional tailgate. In particular, a conventional tailgate is generally a hinged tailgate that is stored flush between the cargo bed of a vehicle, such as a truck or SUV. The conventional tailgate is generally configured to allow entrance to the truck bed by extending outward from a position flush with the cargo bed of the truck.

Additionally, in some embodiments, the multifunctional tailgate door 3B may also include a bypass (not shown) within the multifunction tailgate door 3B that allows the multifunctional tailgate door 3B to function as a conventional tailgate. The bypass includes a means that allows the user to operate the multifunctional tailgate door 3B as the user so chooses, without having to utilize the motorized or pneumatic embodiments of the multifunctional tailgate door 3B, if so desired. This bypass position is the standard position that the multifunctional tailgate door 3B will be set in, allowing complete disengagement and/or free use without resistance from any motor or pneumatics means of operation. This bypass is controlled by an on/off switch (not shown) located within the locked cover panel 107 in the multifunctional tailgate door 3B, the same locked cover panel 107 that houses the steel rod turn/twisting style locking device 109.

Figures 14A, 14B:
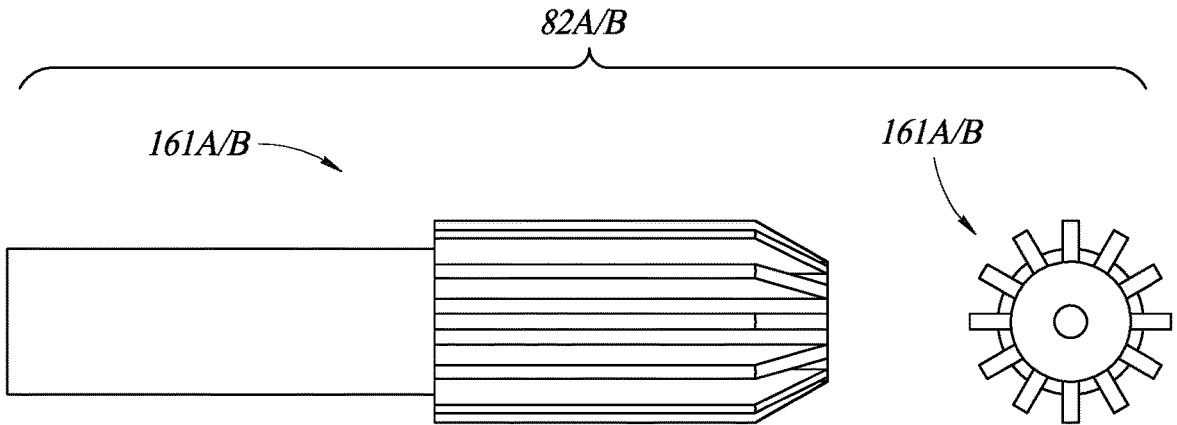
FIG. 14A is a side view of a male spline within the multifunctional tailgate door of FIG. 13.
FIG. 14B is a front view of the male spline of FIG. 14A.
Figures 14C, 14D:
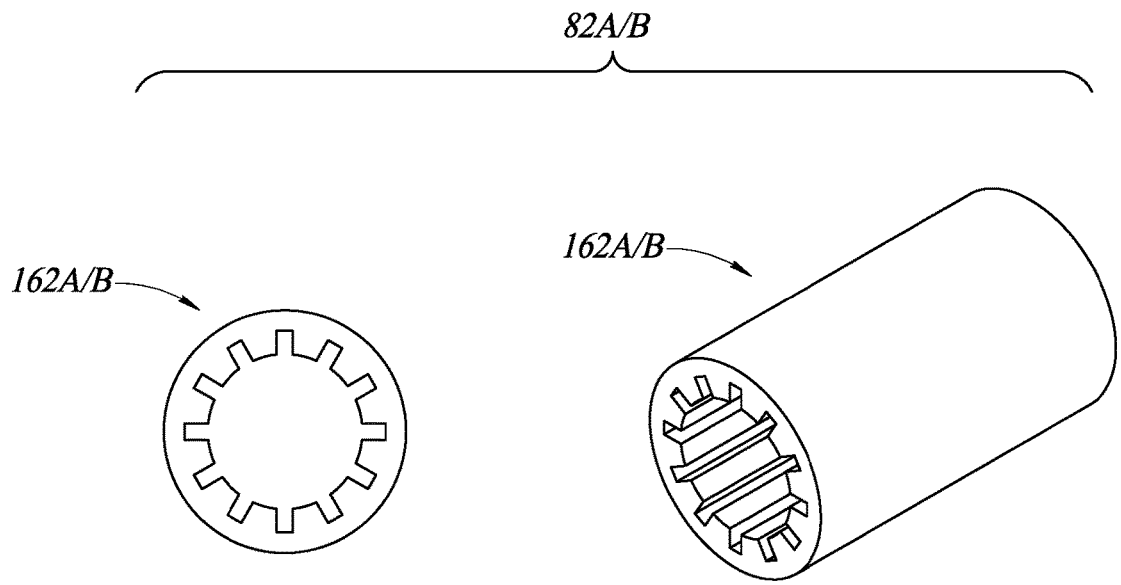
FIG. 14C is a front view of a female spline within the multifunctional tailgate door of FIG. 13.
FIG. 14D is a perspective view of the female spline of FIG. 14C.

FIGS. 14A-14D show a detailed view of the first and second spline systems 82A, 82B, as described above. For example, FIG. 14A shows a side view of the first and second male spline members 161A, 161B, which may be located on one or more embodiments of the multifunctional tailgate door described herein. FIG. 14B shows a front view of the first and second male spline members 161A, 161B of FIG. 14A. FIG. 14C shows a front view of the first and second female spline members 162A, 162B. FIG. 14D shows a perspective view of the first and second female spline members 162A, 162B of FIG. 14C. As mentioned above, the first and second female spline members 162A, 162B are located within the rear corner sidewalls 7, 9 of the vehicle 1.

Figure 15:
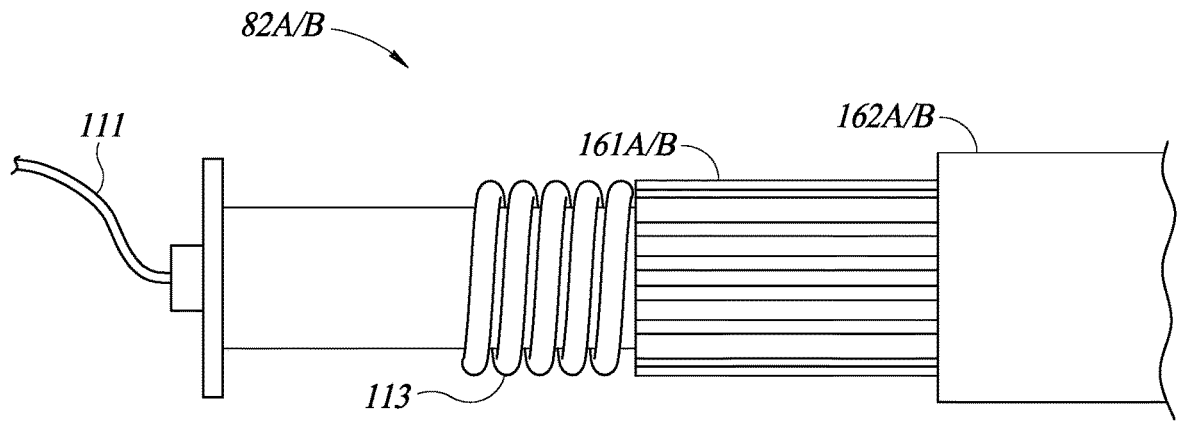
FIG. 15 is a side view of the spline assembly within the multifunctional tailgate door of FIG. 13.
Figure 16:
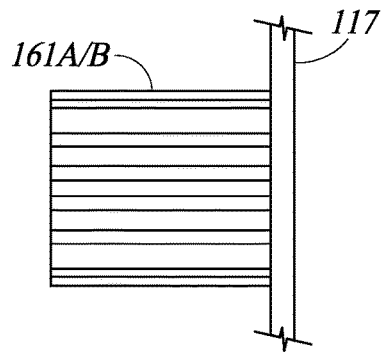
FIG. 16 is a partial side view of the spline within the multifunctional tailgate door of FIG. 13.

FIGS. 15 and 16 show a detailed side view of the first and second spline system 82A, 82B having the first and second male spline member 161A/161B and the first and second female spline members 162A, 162B. In FIG. 15, the cable 111 within the multifunctional tailgate door 3B is coupled to the first and second male spline member 161A. A lock spring 113 is positioned and fitted around a portion of the first and second male spline member 161A/161B and works in unison with the cable 111 to retract for possible removal of the multifunctional tailgate door 3B. FIG. 16 further shows the first male spline member 161A, which includes a collar of FIG. 15, and a mounting surface 117.

Figure 17:
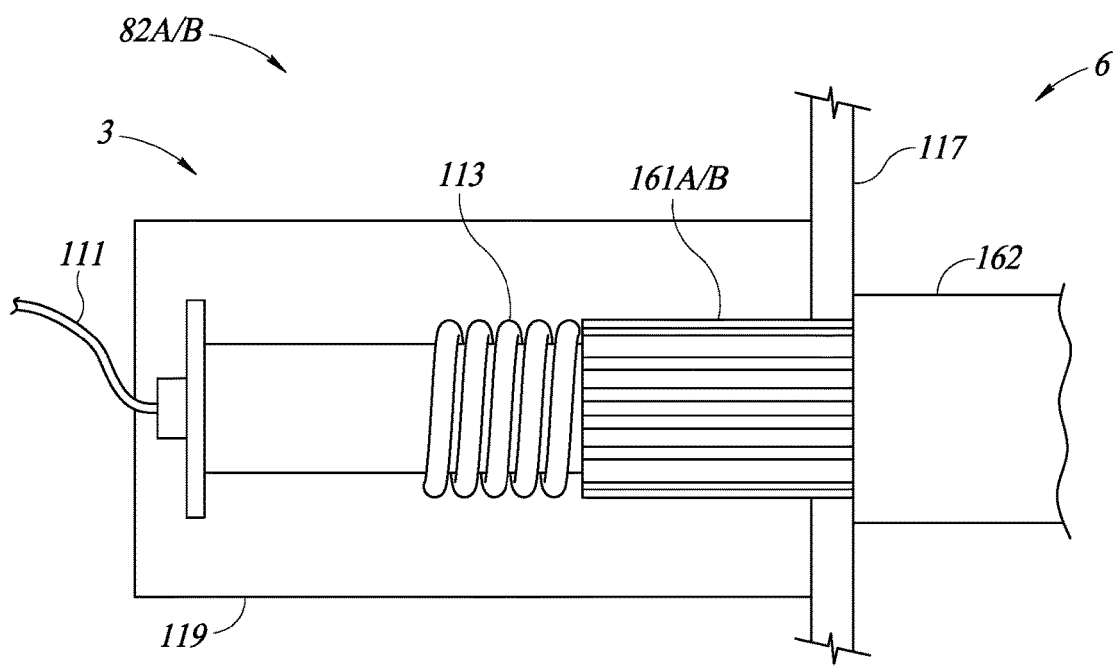
FIG. 17 is a partial cross-sectional view of the spline assembly within the multifunctional tailgate door of FIG. 13.

FIG. 17 is a cut-away portion of the multifunctional tailgate door 3B of FIG. 13 showing the spline system 82A, 82B. The spline system 82A, 82B shows the cable 111 coupled to the first and second male spline member 161A/16aB, which is housed within a pin sleeve 119. The pin sleeve 119 is located within the multifunctional tailgate door 3B. The first and second male spline member 161A, 161B is positioned within the pin sleeve 119 and extends through the mounting surface 117. The first and second spline member 161A, 161B is received by the female spline member 162A, 162B positioned in the rear corner sidewalls 7, 9. As previously mentioned, the first and second male spline members 161A, 161B have a tapered end to help align into the lock position of the first and second female spline members 162A, 162B. The first and second male spline members 161A, 161B and the first and second female spline members 162A, 162B may be made of steel or other similar material. The assembly of the spline system 82A, 82B may be sealed from water, dirt, and other debris by gears, O-rings, or the like in order to function smoothly.

Figure 18A:
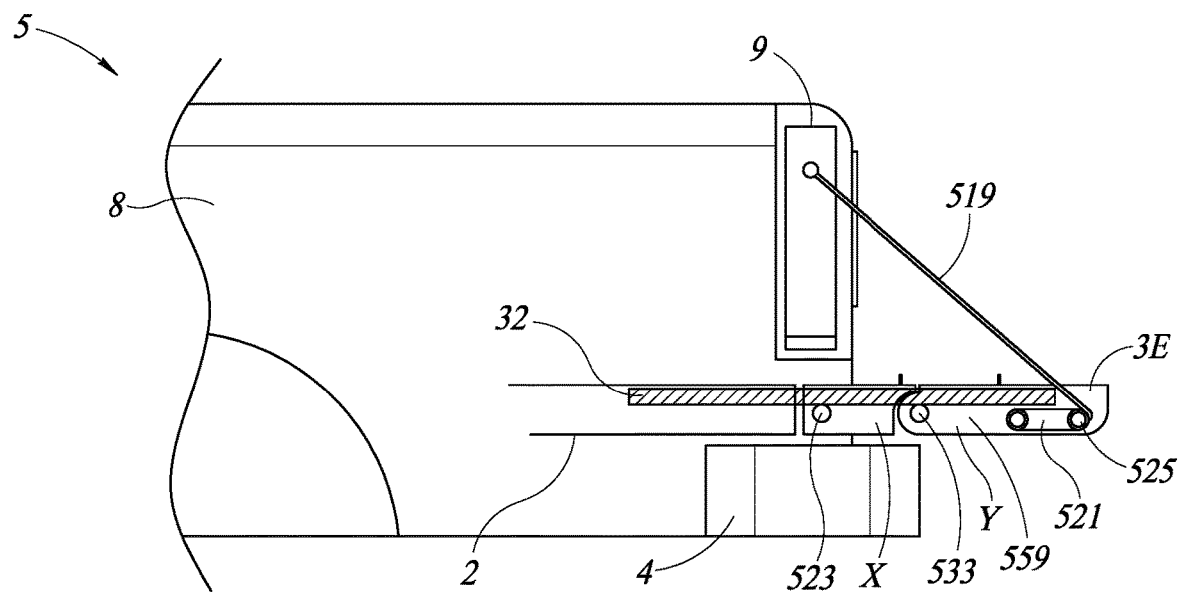
FIGS. 18A and 18B are side views of the vehicle and an example embodiment of the multifunctional tailgate door, illustrating the multifunctional tailgate door in different positions.
Figure 18B:
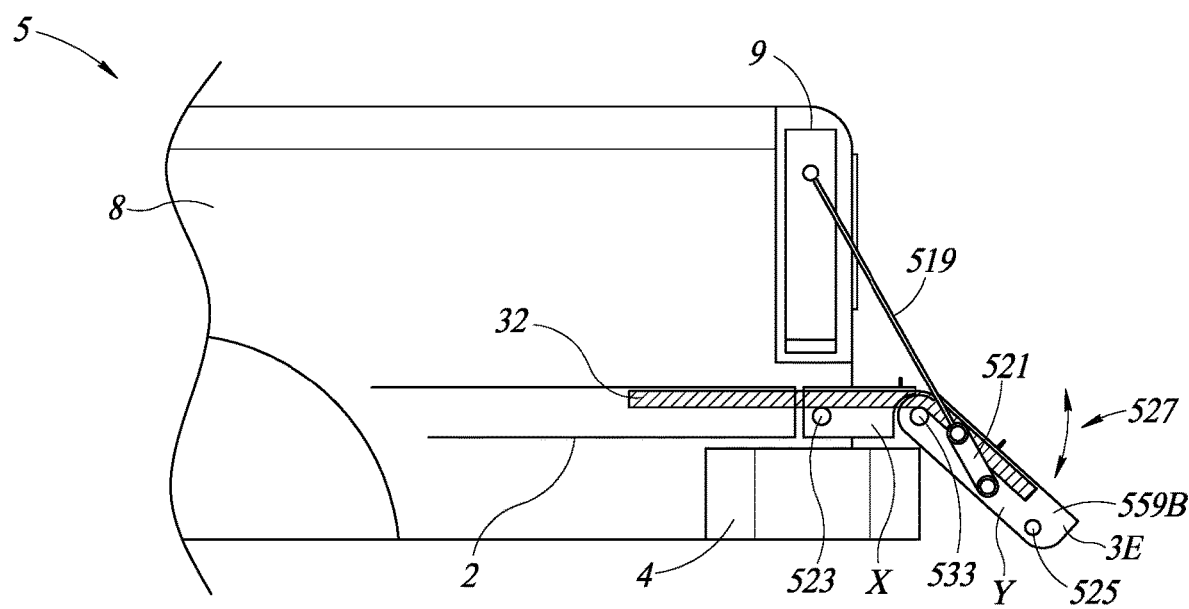

FIGS. 18A and 18B show an alternative embodiment of a multifunctional tailgate door 3E. FIG. 18A shows the partial driver side view of the second rear cargo side 8 of the cargo bed area 5. The rear corner sidewalls 7, 9 have a cable 519 that is coupled a multifunctional tailgate sidewall 559 of the multifunctional tailgate door 3E by a quick connect 521. The quick connect 521 may be a coupling or bearing that connects the cable 519 to the multifunctional tailgate door 3E and allows the user to quickly lower the multifunctional tailgate door 3E by releasing or uncoupling the quick connect 521.

The multifunctional tailgate door 3E includes a first portion X and a second portion Y. The first portion is coupled to the second portion Y via a metal slide that is housed in channels 32, as described in further detail below. The multifunctional tailgate door 3E can pivotably move about a first tailgate pivot point 523. In particular, the first tailgate pivot point 523 allows both first and second portions X, Y of the multifunctional tailgate door 3E to pivotably move about the first tailgate pivot point 523 in a conventional manner, as will be explained in further detail below. The multifunctional tailgate door 3E may also pivotably move about a second tailgate pivot point 533. In particular, the second portion Y of the multifunctional tailgate door 3E may pivotably move relative to the first portion X, which allows the multifunctional tailgate door 3E to clear the bumper by having a smooth rotation joint movement. In this manner, the multifunctional tailgate door 3E may have adequate strength and simple usability, while also maintaining a design that incorporates a flat top or inside surface that can still provide use as a conventional tailgate surface.

The channels 32, mentioned above, are placed within the rear cargo floor 2 and within the multifunctional tailgate door 3E. The channels 32 provide a cavity for the slide movement that locks in and out of the multifunctional tailgate door 3E, which will be described in further detail below. The channel 32 may house the slide device (not shown) that slides within the channel 32 to slide into the rear cargo floor 2 of the cargo bed area 5, and the second portion Y of the multifunctional tailgate door 3E. This allows the multifunctional tailgate door 3E a longitudinal breaking point where the second portion Y of the multifunctional tailgate door 3E may freely drop beyond the bumper, while the first portion X is supported with the slide underneath the rear cargo floor 2 and within the first portion of the multifunctional tailgate door 3E.

The quick connect 521 is coupled to the sidewalls of the multifunctional tailgate door 3E. The cable 519 is attached to the quick connect 521 by at least one quick release pin member 525. The quick release pin member 525 may be a sealed bearing or other similar structure that is made of steel, plastic and/or any other rigid material. The quick release pin member 525 releases the connection of the cable 519 from the quick connect 521 and the multifunctional tailgate sidewall 559 by a pin pull or other material capable of quick and easy disconnection, allowing the multifunctional tailgate door 3E to further extend down at a lowering position. Additionally, this embodiment of the multifunctional tailgate door 3E may also work in unison to lower the rear bumper 4 as part of and in conjunction with the bumper lowering platform 71 detailed previously.

FIG. 18B shows the multifunctional tailgate door 3E in which the multifunctional tailgate door 3E has been rotated about the second tailgate pivot point 533 to lower the tailgate beyond the rear portion of the bumper 4. By releasing the quick connect 521 from the quick release pin member 525, the multifunctional tailgate door 3E swings in a quick lowering movement 527 and lowers the multifunctional tailgate door 3E in a quick and easy manner. The multifunctional tailgate door 3E may have one quick release pin member 525, or may have a plurality of quick release pin members that may provide more cable length and allow the tailgate to drop further.

Figure 19A:
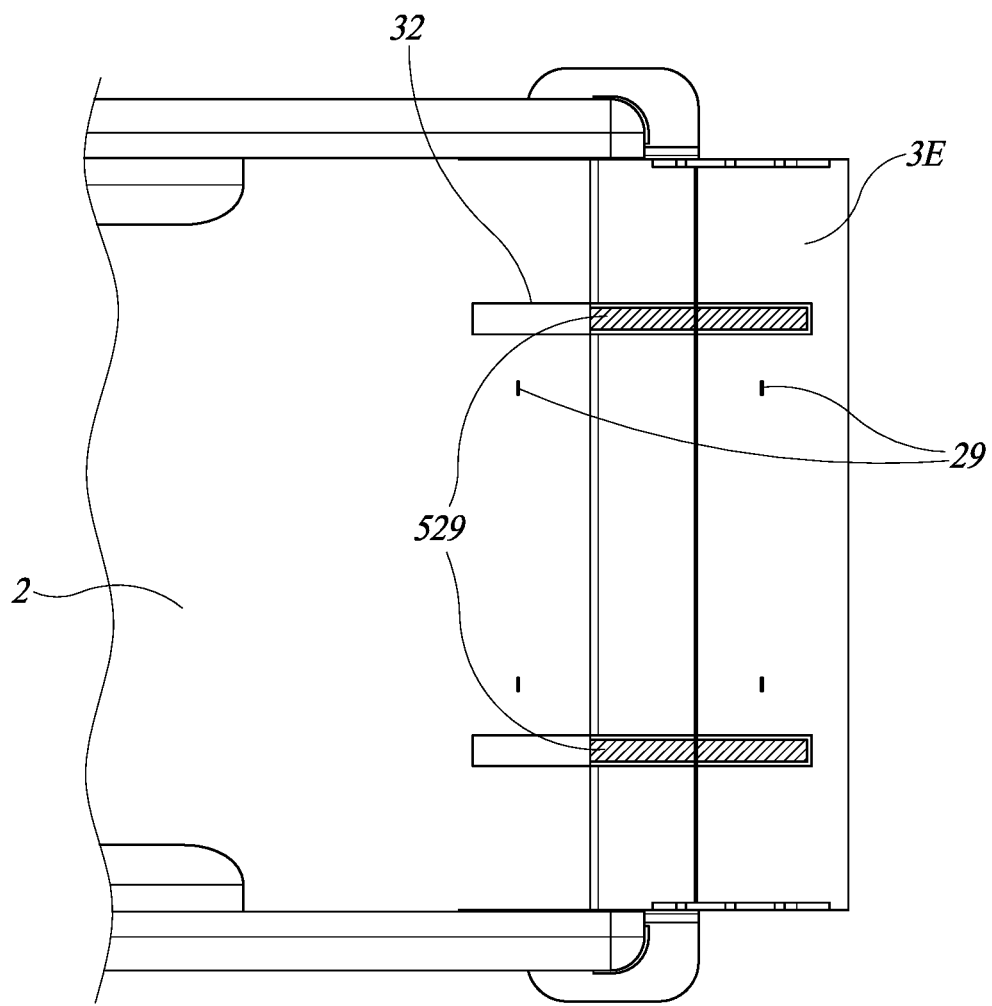
FIG. 19A is a top view of the vehicle and an example embodiment of a multifunctional tailgate door in a first sliding position.
Figure 19B:
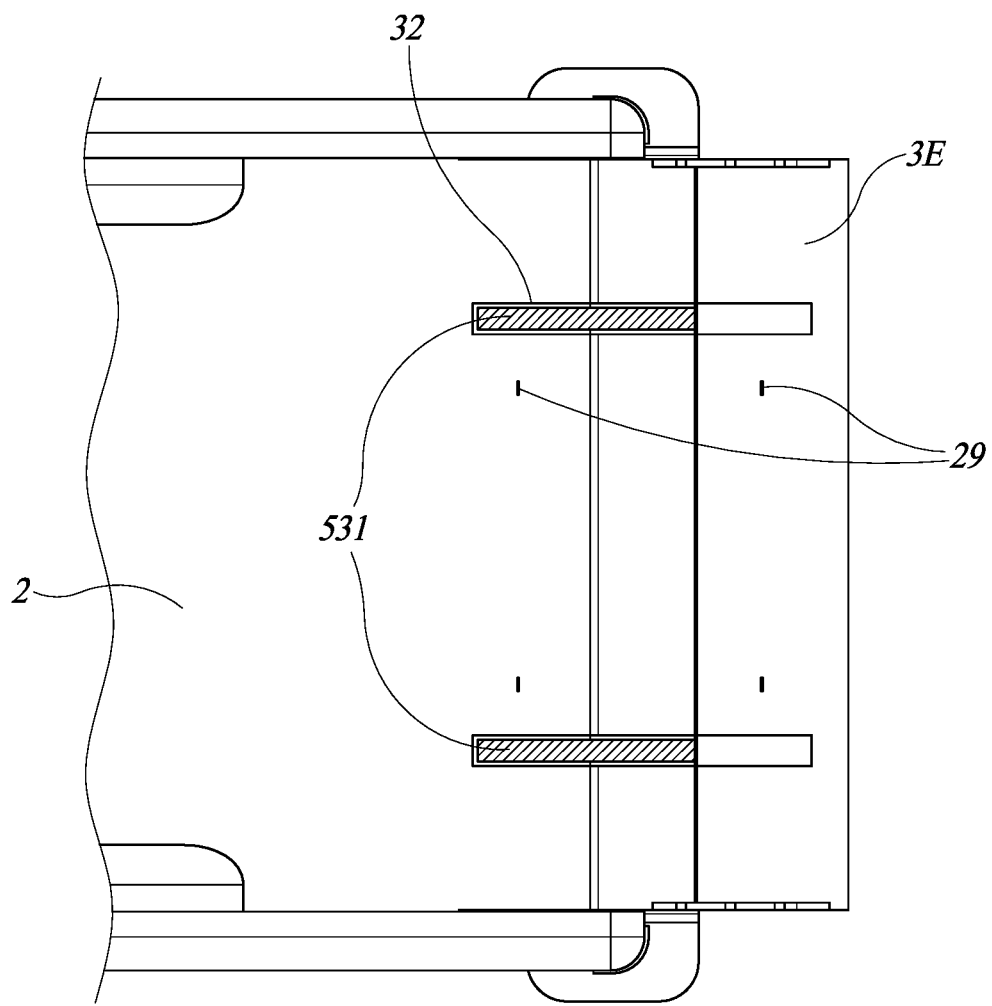
FIG. 19B is a top view of the vehicle and the multifunctional tailgate door of FIG. 19A in a second sliding position.

FIGS. 19A and 19B show a top view of the cargo bed area 5 having the channels 32 in both the rear cargo floor 2 and the multifunctional tailgate door 3E. The channels 32 function in two settings. FIG. 19A shows the channel 32 in setting "A" 529. Setting "A" of the channel 32 enables the multifunctional tailgate door 3E to function as a conventional tailgate, as defined in detail above. A channel slide (not shown) supports both channels 32 within the multifunctional tailgate door 3, as briefly mentioned above in FIGS. 18A and 18B. The channel slide may be composed of any material that is rigid, such as metal, steel, etc. In setting "A" 529, the multifunctional tailgate door 3E may function as one complete unit, using the first pivot point 523 to open and close, similar to a conventional usage tailgate, as defined in detail above. The control of the channel slide may be motorized to activate a specified setting, which may additionally also be activated to support the weight of the multifunctional tailgate door 3E, or may be manual and operable by hand.

FIG. 19B shows the channel 32 in setting "B" 531. Setting "B" 531 of the channel 32 retracts the channel slide into the rear cargo floor 2 to support the rear cargo floor 2 and the rear bumper 4 covering a portion of the multifunctional tailgate door 3E. For example, the channel 32 in setting "B" 531 allows the second portion Y of the multifunctional tailgate door 3E, using gravity, to break downward in a lowering position, as shown in FIG. 18B. When not in use, setting "A" is the default setting and the channel slide is housed completely within the multifunctional tailgate door 3E.

Figure 20A:
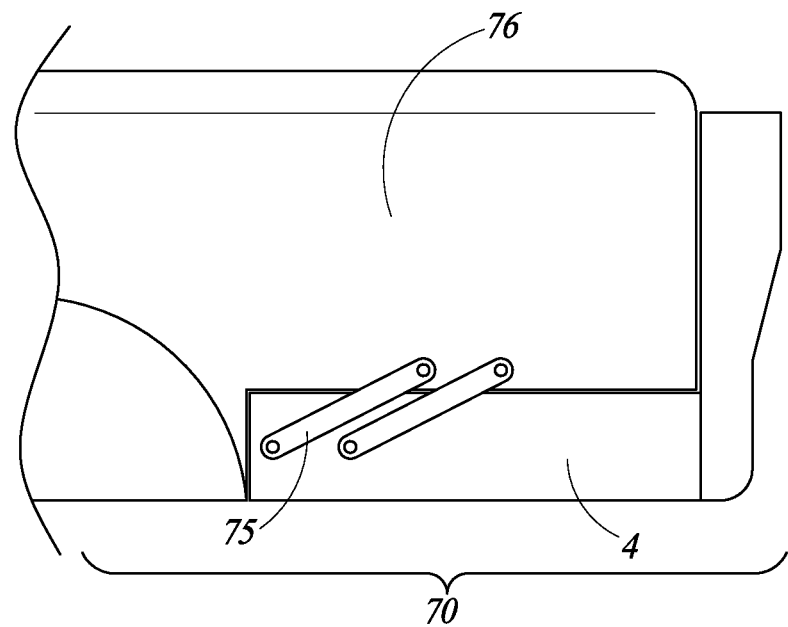
FIG. 20A is a partial driver side view of the vehicle and an example embodiment of a bumper lowering platform in a disengaged position.
Figure 20B:
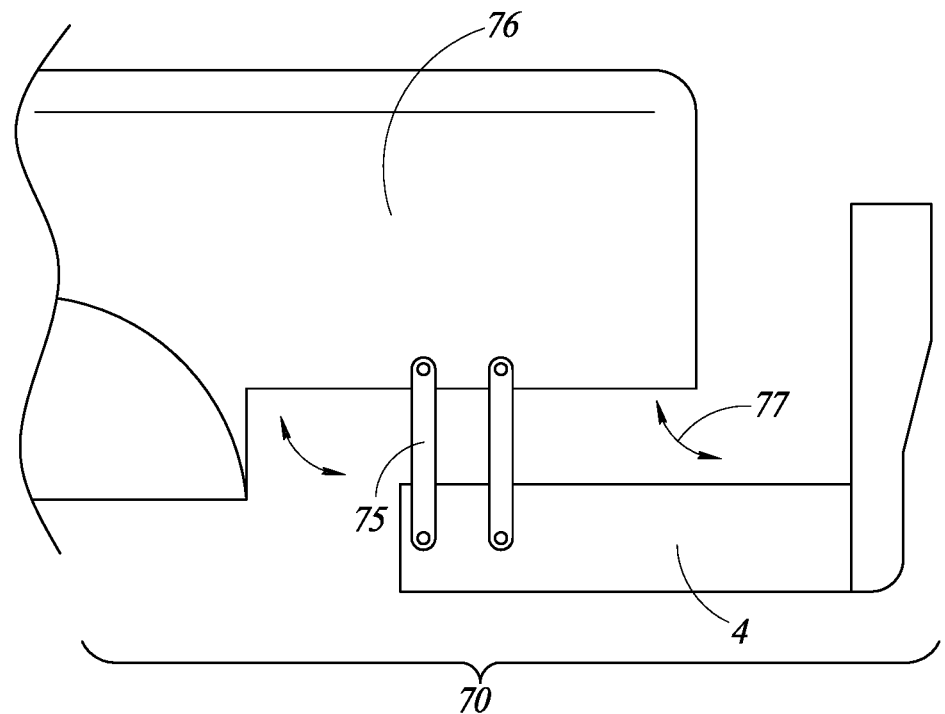
FIG. 20B is a partial driver side view of the vehicle and the example embodiment of the bumper lowering platform of FIG. 20A in an engaged position.

FIGS. 20A and 20B show an embodiment of a bumper lowering platform 70 in a locked and unlocked position, respectively. The bumper lowering platform 70 may include the rear portion of the bumper 4, a frame 76, and a plurality of swing arms 75. When the multifunctional tailgate door, for example, multifunctional tailgate door 3A, is lowered, it generally will be activated or operable while the vehicle 1 is being actively loaded and/or unloaded with a cargo load. In this embodiment, and previously mentioned bumper lowering platforms 70, FIGS. 20A, 20B demonstrate how the bumper lowering platform 70 may be utilized with motors, pneumatics, hydraulics, etc. In this embodiment, the plurality of swing arms 75 couple the rear portion of the bumper 4 to the frame 76. The plurality of swing arms 75 may each have a locking pin assembly that locks into a series of holes housed within the arc of the swing arms 75 located within the frame 76. The plurality of swing arms 75 may also activate a clip to lock the rear portion of the bumper 4 into the upper position, enabling the vehicle 1 to drive with the rear portion of the bumper 4 locked into position. The plurality of swing arms 75 could be operable from a mechanical switch, button, or other similar device capable of operating the swing arms 75.

As shown in FIG. 20B, the bumper lowering platform 70 having the plurality of swing arms 75 operates by lowering and swinging down and away in a sweeping movement 77, either in a first direction from a default position to clear the dropped multifunctional tailgate, or in a second direction to return to the default position. To return the bumper lowering platform 70 to the locked position, as shown in FIG. 20A, the bumper lower platform 70 is retracted up and out of the way of the user. This action moves the rear portion of the bumper 4 to its locked and secure position in order for the vehicle 1 to operate with the bumper 4 secured. Thus, when the bumper lowering platform 70 is in the up position, as shown in FIG. 20A, it is locked and secured. When the bumper lowering platform 70 is in the down position, as shown in FIG. 20B, it is unlocked and freely operable.

Figure 21A:
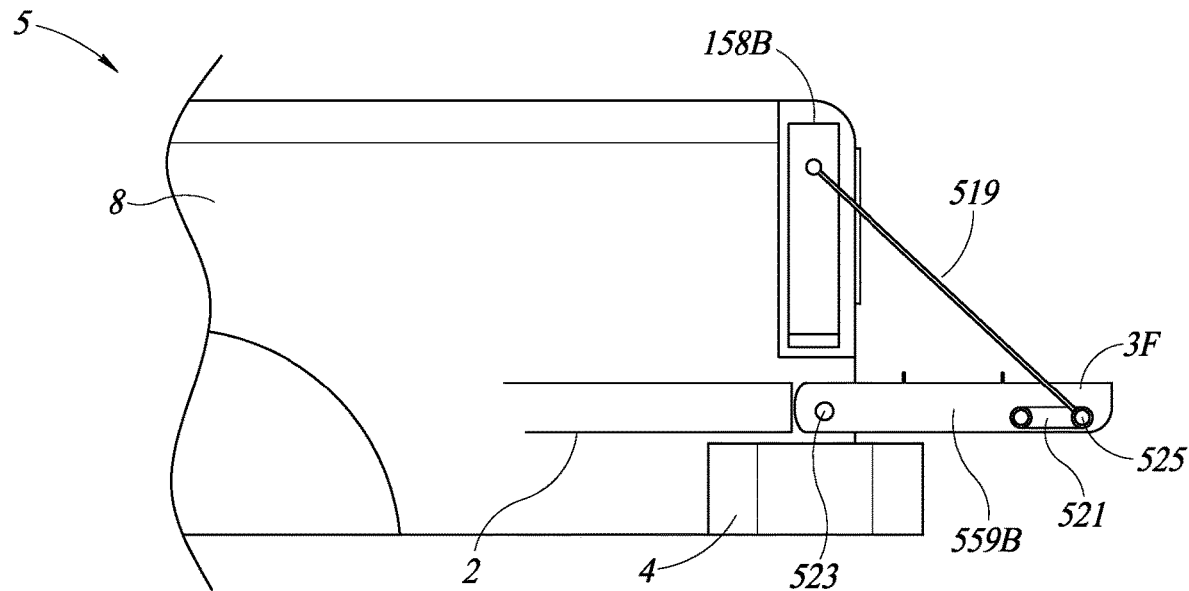
FIG. 21A is a partial driver side view of the vehicle and an example embodiment of a multifunctional tailgate door in a first position.
Figure 21B:
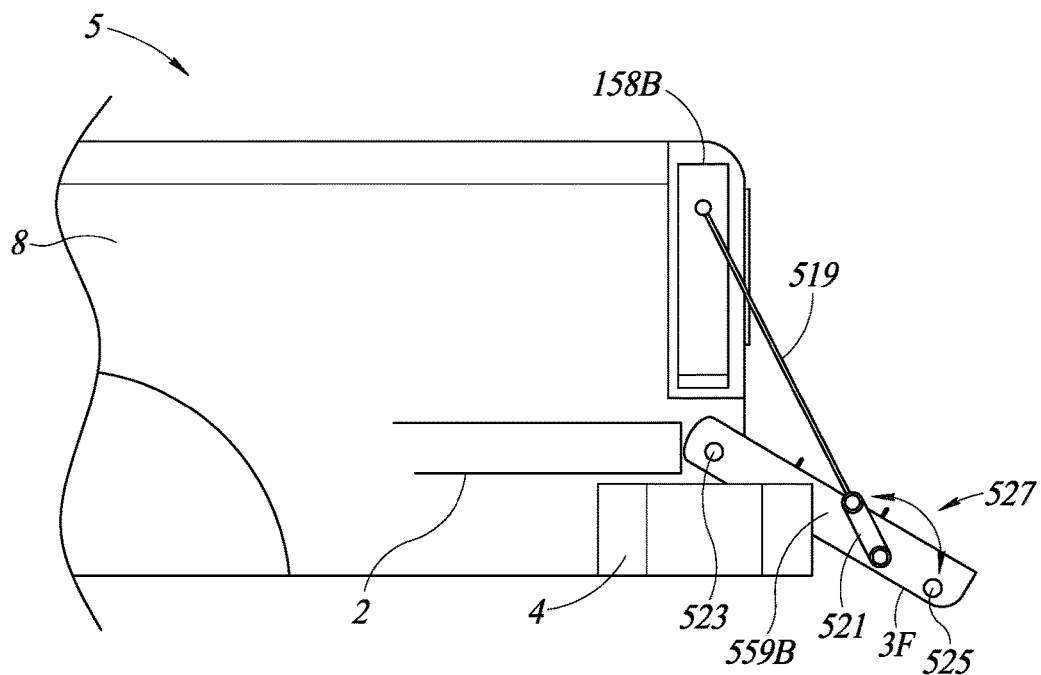
FIG. 21B is a partial driver side view of the vehicle and the example embodiment of the multifunctional tailgate door of FIG. 21A in a second position.

FIGS. 21A and 21B illustrate an example embodiment of a multifunctional tailgate door 3F that is similar to the embodiment shown in FIGS. 18A and 18B, but provides a variation in which the multifunctional tailgate door 3F does not use or integrate the channels 32 and settings "A" and "B" 529, 531. As mentioned above, the quick connect 521 is coupled to the sidewalls of the multifunctional tailgate door 3F. The cable 519 is attached to the quick connect 521 by at least one quick release pin member 525. The quick release pin member 525 releases the connection of the cable 519 from the quick connect 521 and the second multifunctional tailgate sidewall 559 by a pin pull or other material capable of quick and easy disconnection, allowing the multifunctional tailgate door 3F to further extend down at a lowering position.

Figure 22A:
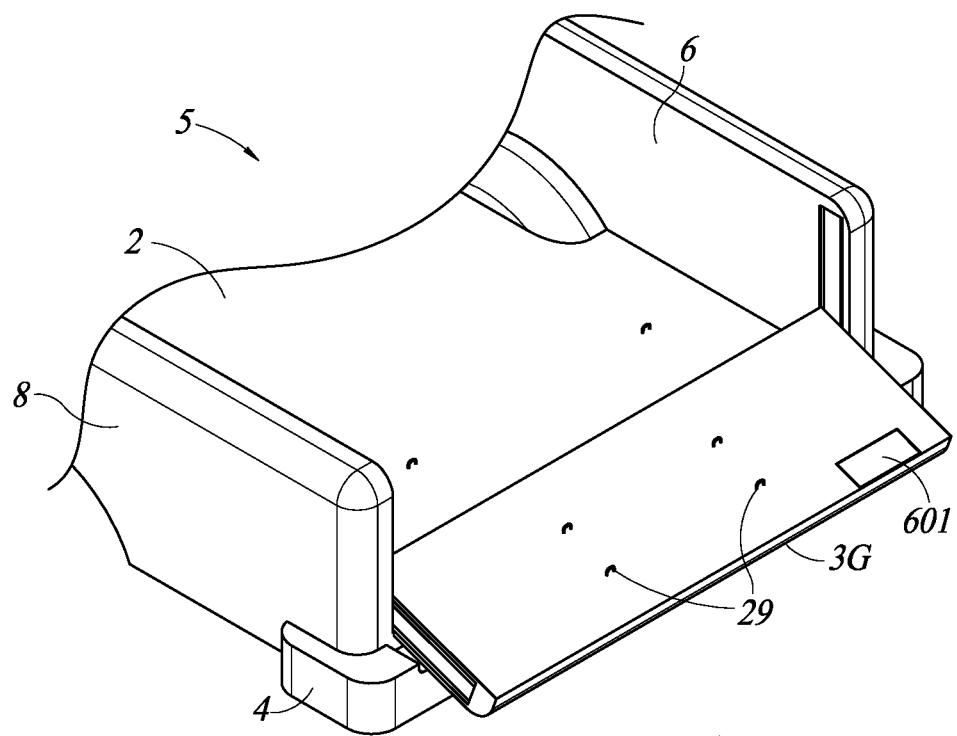
FIG. 22A is a perspective view of the vehicle and an example embodiment of a multifunctional tailgate door with a pull-out step in a disengaged position.
Figure 22B:
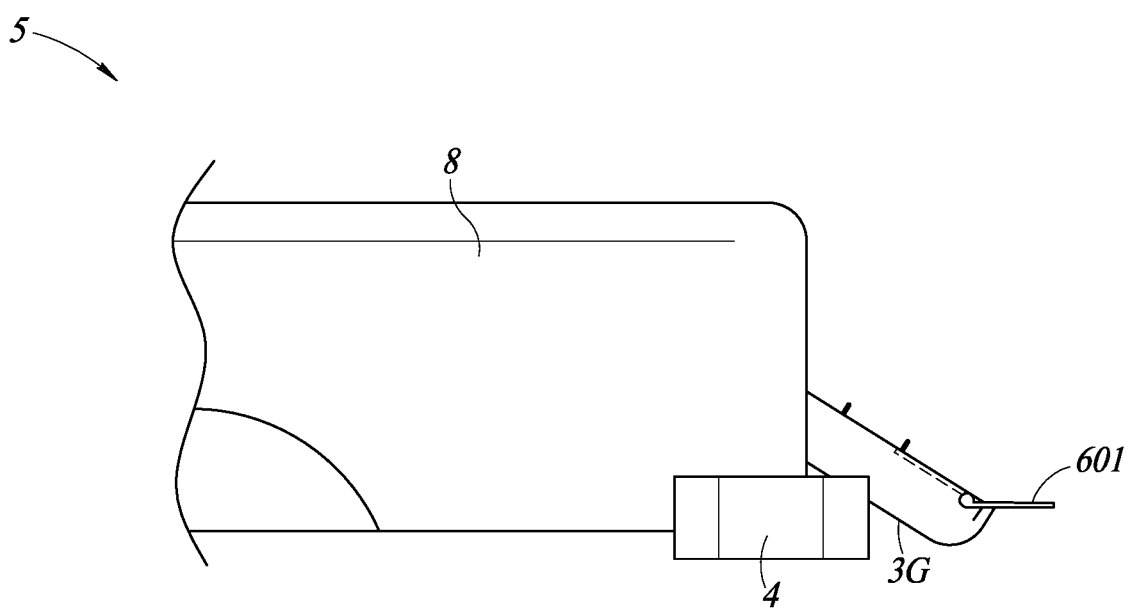
FIG. 22B is a partial driver side view of the vehicle and the example embodiment of the multifunctional tailgate door of FIG. 22A with a pull-out step in an engaged position.

FIGS. 22A and 22B show an embodiment of a multifunctional tailgate door 3G in the cargo bed area 5 of the vehicle 1. FIG. 22A shows the multifunctional tailgate door 3G having a foldable step 601 in a closed position. The foldable step 601 is positioned on the multifunctional tailgate door 3G. The foldable step 601 may be a step encompassing any width of the multifunctional tailgate door 3G. For example, the foldable step 601 may be the width shown in FIG. 22A, the entire width of the multifunctional tailgate door 3G, or any width of the multifunctional tailgate door 3G. The foldable step 601 may also be situated in a variety of positions on the multifunctional tailgate door 3G.

In this embodiment, the foldable step 601 is positioned towards the edge of the multifunctional tailgate door 3G to provide adequate weight support when the multifunctional tailgate door 3G is lowered. FIG. 22B shows the foldable step 601 rotated in an outward position that enables a user to step onto the foldable step 601. This creates a greater accessibility to the cargo bed area 5. The foldable step 601 also helps the user to clear the rear portion of the bumper 4 and/or hitch when exiting the cargo bed area 5.

Figure 22C:
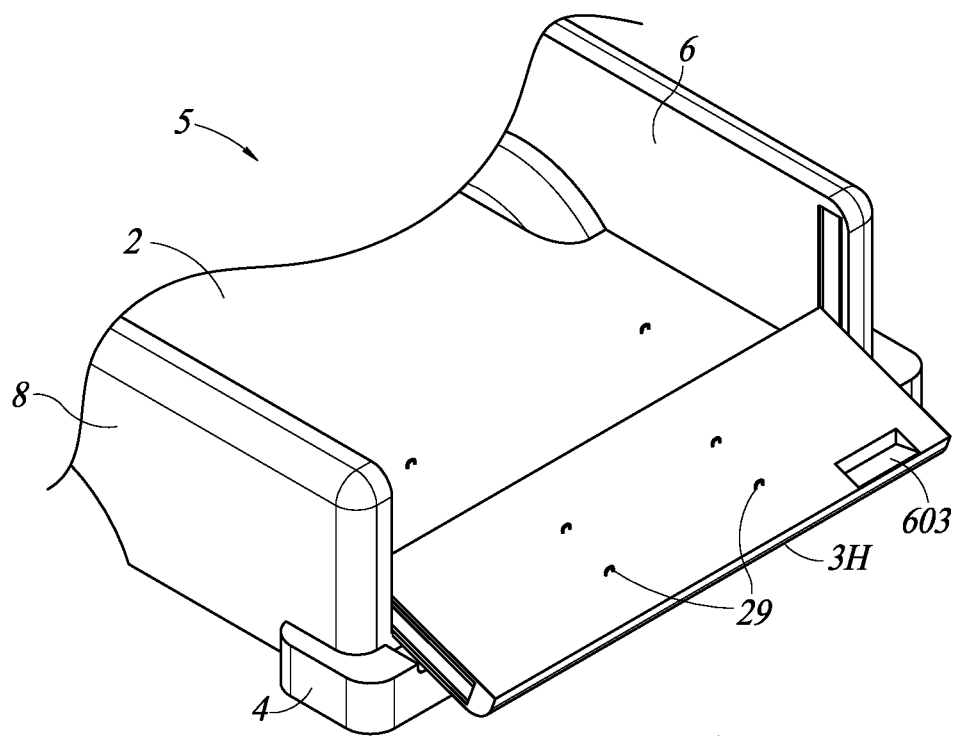
FIG. 22C is a perspective view of the vehicle and an example embodiment of a multifunctional tailgate door with a step cavity in the multifunctional tailgate.
Figure 22D:
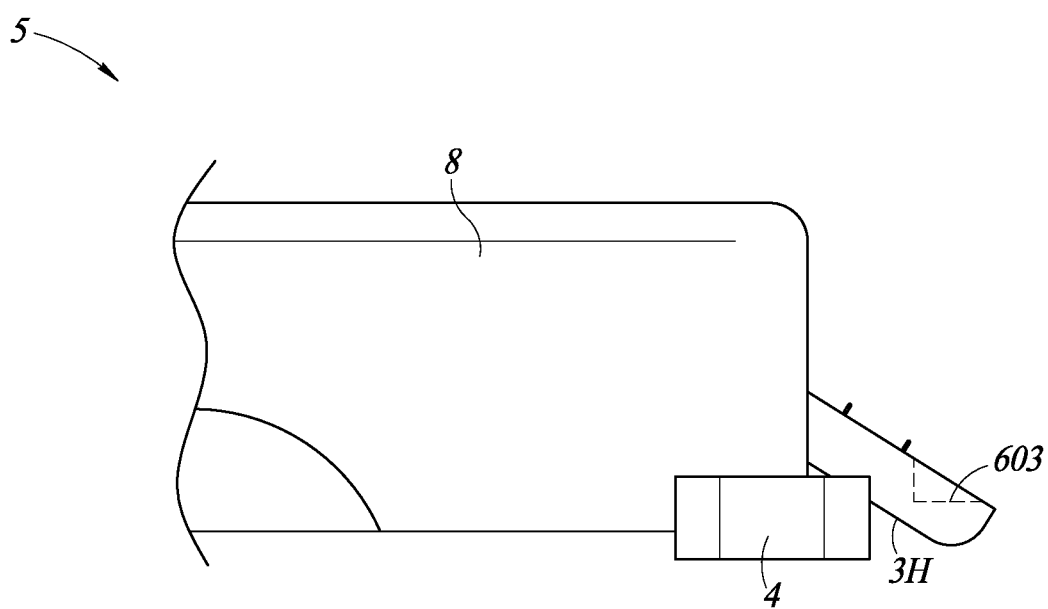
FIG. 22D is a partial driver side view of the vehicle and the example embodiment of the multifunctional tailgate door of FIG. 22C with the step cavity.

FIGS. 22C and 22D show an embodiment of a multifunctional tailgate door 3H in the cargo bed area 5 of the vehicle 1 having a step cavity 603. FIG. 22C shows a perspective view of the step cavity 603 that is indented into the multifunctional tailgate door 3H, and designed for the tip of a user's foot to safely fit into the step cavity 603. The step cavity 603 can be molded into the design of the inside portion of the multifunctional tailgate door 3H. The step cavity 603 may be a cavity encompassing any width of the multifunctional tailgate door 3H. The step cavity 603 may also be positioned in a variety of configurations within the multifunctional tailgate door 3H.

FIG. 22D shows the partial driver side view of the cargo bed area 5 with the step cavity 603 in the multifunctional tailgate door 3H. The step cavity 603 is configured to occupy an inside portion of the multifunctional tailgate door 3H that enables a user to step in or out of the cargo bed area 5 without hitting the rear portion of the bumper 4. Some embodiments may include a single step cavity 603, and other embodiments may include a plurality of step cavities within the multifunctional tailgate door 3H.

Figure 22E:
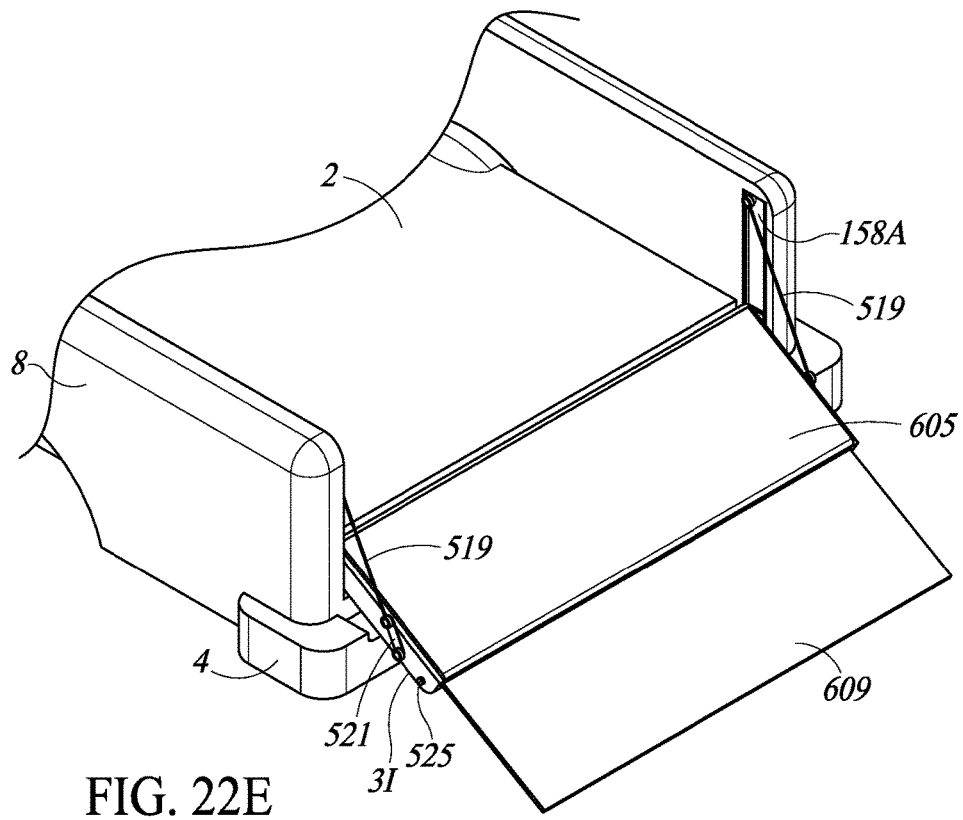
FIG. 22E is a perspective view of the vehicle and an example embodiment of a multifunctional tailgate door having a flip-out panel.
Figure 22F:
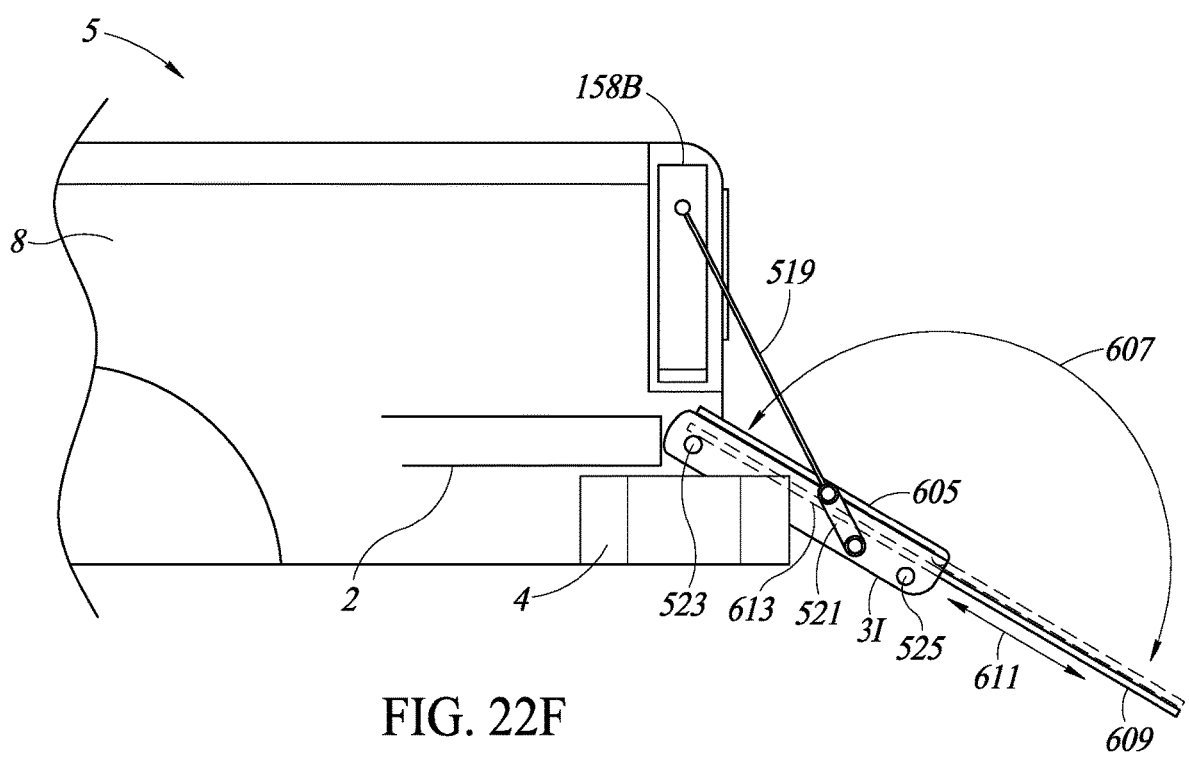
FIG. 22F is a partial driver side view of the vehicle and the example embodiment of the multifunctional tailgate door of FIG. 22E having the flip-out panel.

FIGS. 22E and 22F show an embodiment of a multifunctional tailgate door 3I. This embodiment of the multifunctional tailgate door 3I includes the quick connect 519, as shown in FIGS. 21A and 21B. In this embodiment, the multifunctional tailgate door 3I includes a flip-out panel 609 that rotates out and over in a flipping movement 607. This flipping movement 607 of the flip-out panel 609 extends the active capabilities of the multifunctional tailgate door 3I. The flip-out panel 609 may be the size of the inside plate of the multifunctional tailgate door 3I, or any size within the width of the inside panel of the multifunctional tailgate door 3I. This embodiment would allow motorcycles, ATVs, or any other similar vehicle, a ramp to drive equipment up and into the cargo bed area 5.

Additionally, a slide-out panel 613 is positioned within the multifunctional tailgate door 3I. The slide-out panel 613 is operable by using a slide out movement 611 that drops out of the multifunctional tailgate door 3I and helps create a sturdy support for the flip-out panel 609. Using this system lowers the top edge of the multifunctional tailgate door 3I and becomes an aligned friction surface that provides more stability as the multifunctional tailgate door 3I is on the same angle as the ramp or flip-out panel 609.

Figure 22G:
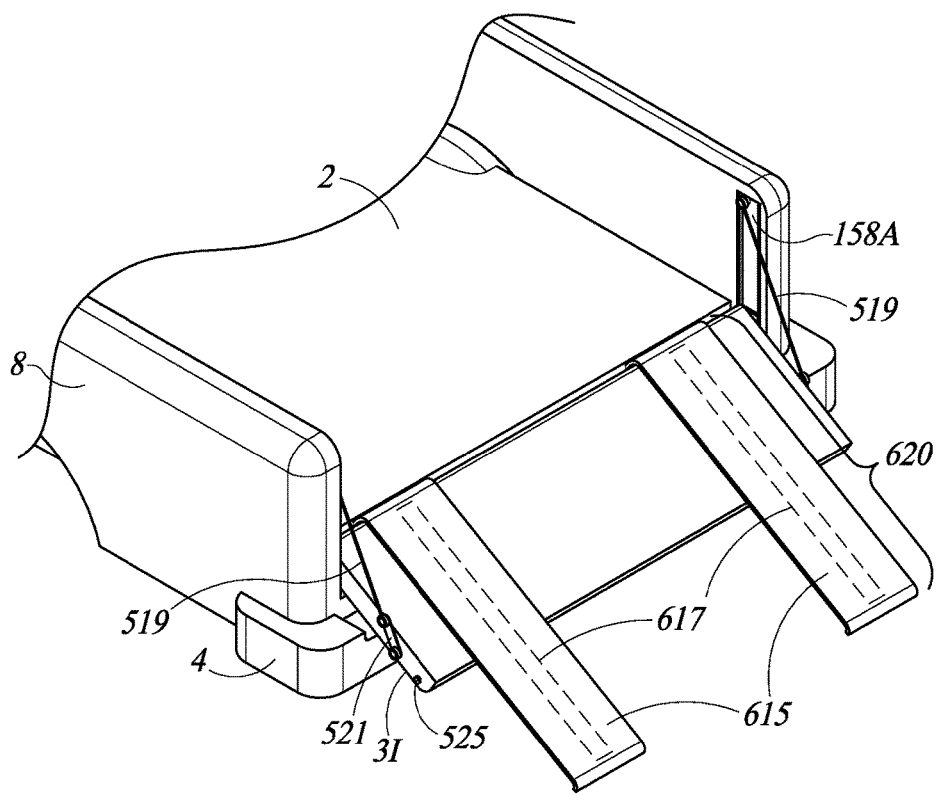
FIG. 22G is a perspective view of the vehicle and the example embodiment of the multifunctional tailgate door of FIG. 22E having a pair of detachable ramps with telescoping support beams.
Figure 22H:
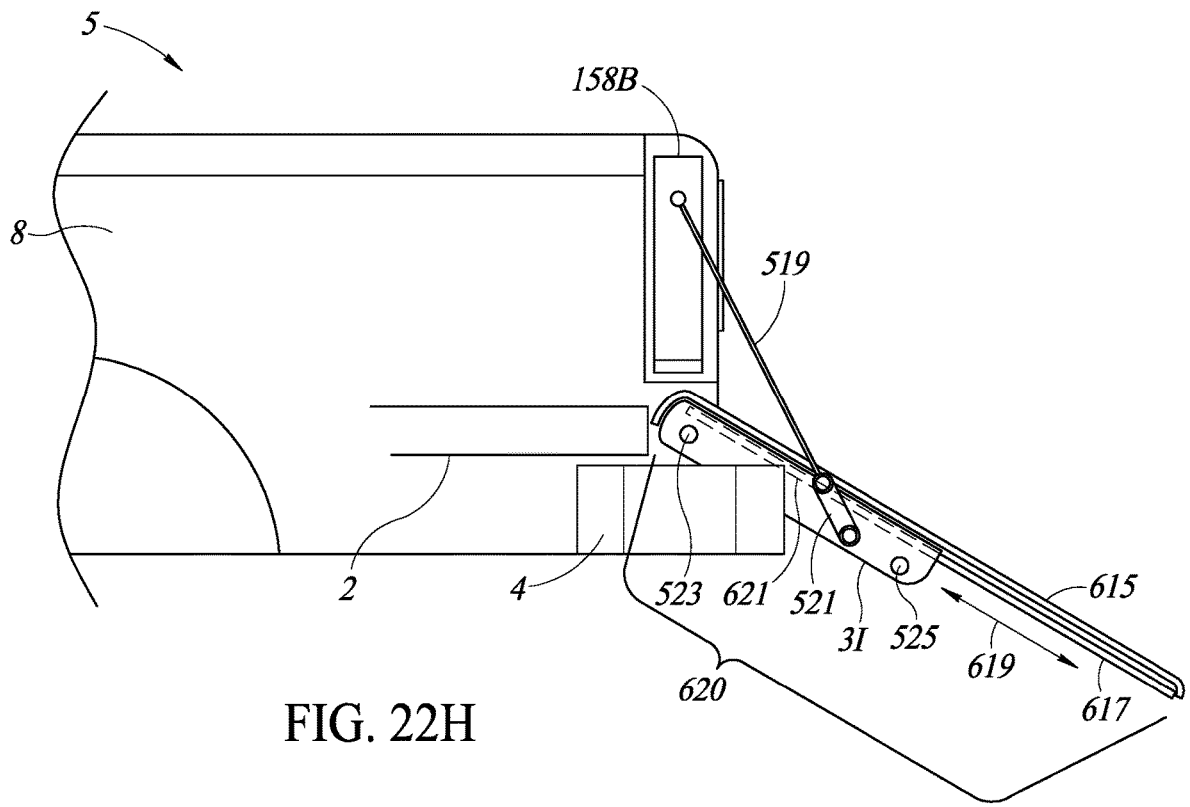
FIG. 22H is a partial driver side view of the vehicle and the example embodiment of the multifunctional tailgate door of FIG. 22E having the pair of detachable ramps.

FIGS. 22G and 22H show an attachable accessory ramp system 620 having a plurality of accessory ramps 615 and a plurality of telescoping support beams 617. The plurality of accessory ramps 615 are attachable/detachable inline separate tracks or ramps that connect to a bracket (not shown) near the first pivot point 523 on the multidirectional tailgate door 3I. The plurality of accessory ramps 615 are configured parallel to each other and positioned on the multifunctional tailgate door 3I, which may provide additional stability for movement of large loads, such as ATVs, or other equipment needing transportation. The lowered slope of the multifunctional tailgate door 3I and telescoping support beams 617 may help reduce the potential for rollovers and various mishaps that may occur when a loading ramp is at an inappropriate height when connected to the cargo bed area 5.

The plurality of telescoping support beams 617 extend out of the multifunctional tailgate door 3I in an extendable/retractable movement 619. The extendable/retractable movement 619 of the telescoping support beams 617 functions in a telescoping manner from an internal multifunctional tailgate cavity 621. The telescoping support beams 617 may be composed of aluminum or other appropriate material. The telescoping support beams 617 span the entirety of the accessory ramps 615, and may be positioned in any location within the multifunctional tailgate door 3I.

The telescoping support beams 617 extend and/or retract from the internal multifunctional tailgate cavity 621 of the multifunctional tailgate door 3I in support of loads in various adjustable lengths for ground/terrain elevation differences. The telescoping support beams 617 operate in a telescoping manner to help stabilize loads by absorbing the weight of the item being loaded onto the vehicle. The telescoping support beams 617 may also provide support to the cables 519 by reducing the load onto the cable 519 and rear corner sidewalls 7, 9. The telescoping support beams 617 also help keep the accessory ramps 615 remain stationary while loading or unloading the truck.

The plurality of telescoping support beams 617 may be used to support the drop down multifunctional tailgate door 3I without the use of ramps used for driving up load, such as wheeled vehicles, e.g., ATVs. For example, in some cases, when loading a refrigerator by way of lowering the multifunctional tailgate door 3I angle to change the pivot point, extra support may be important to support the cables 519 that are holding the entire load of the multifunctional tailgate door 3I. These telescoping support beams 617 may also help support the weight being loaded or added onto the multifunctional tailgate door 3I in the angled down position. By extending the telescoping support beams 617, the additional ground load support will increase stability and load control for the lowered multifunctional tailgate door 3I, including protecting the multifunctional tailgate door 3I from damage by possible attempts of overloading the multifunctional tailgate door 3I.

Additionally, because of the telescoping configuration of the telescoping support beams 617, various ground elevations are also easily adjusted between both uneven sides by adjusting the telescoping support beams 617 as needed. The telescoping support beams 617 may be narrow in design and cargo, for example a refrigerator, may fit between the telescoping support beams 617 because each telescoping support beam 617 may be positioned near opposite sides of the lowered multifunctional tailgate door 3I. When the multifunctional tailgate door 3I is positioned parallel to the ground, the telescoping support beams 617 may provide support for truck-to-truck transfers. This may be accomplished even if the two trucks are of varying heights and/or elevations. If the multifunctional tailgate door 3I is used to secure debris or other cargo, the telescoping support beams 617, in some embodiments, may rotate up and over into the cargo bed area 5 and secure the load, or cover the stowed load with downward pressure of the telescoping support beams 617.

Additionally, the telescoping support beams 617 may be utilized in other multifunctional tailgate door embodiments. For example, in an embodiment of the multifunctional tailgate door 3B shown in FIG. 10C, the telescoping support beams 617 telescoping configuration could also be used to rest on the top of a cargo 52, such as a debris pile, to further help compact debris, or to help secure the cargo load in a more efficient manner.

Figure 22I:
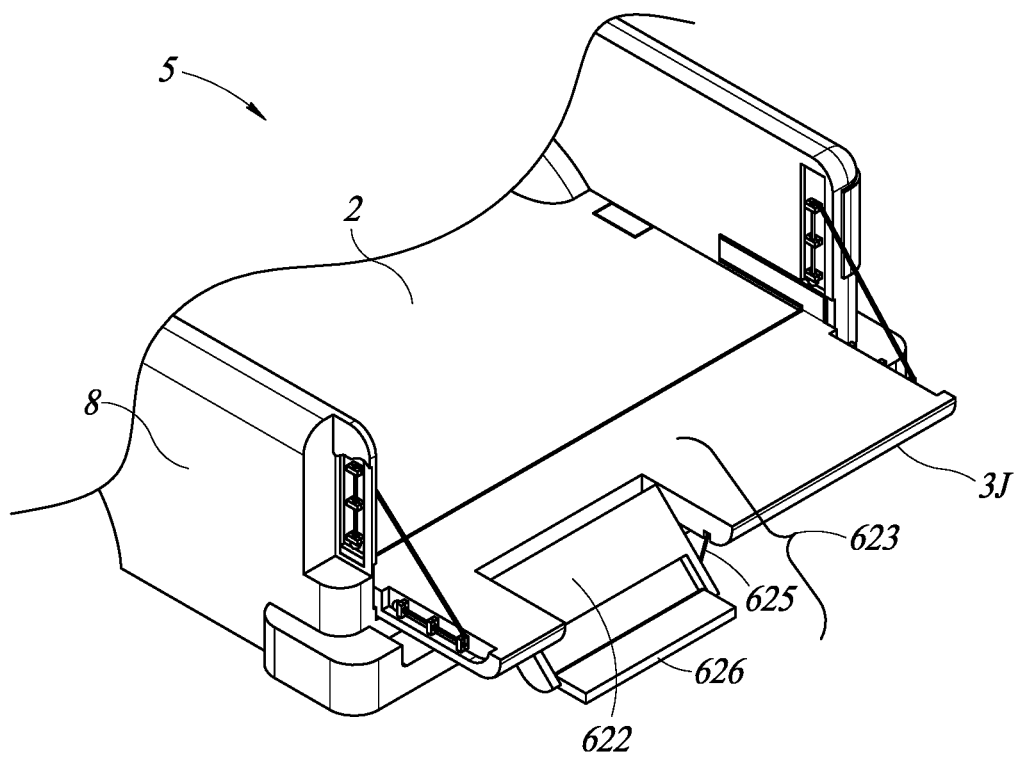
FIG. 22I is a perspective view of the vehicle and an example embodiment of a multifunctional tailgate door having an adjustable flip-out seating step system.

FIG. 22I shows an embodiment of a multifunctional tailgate door 3J in the cargo bed area 5 of the vehicle 1 having an adjustable flip-out seat system 623. The adjustable flip-out seat system 623 includes an adjustable flip-out backrest 622, an adjustable flip-out quick connect cable 625, and an adjustable flip-out seating step 626. The adjustable flip-out seat system 623 can operate in conjunction with the multifunctional tailgate door 3J, or can operate independently of the multifunctional tailgate door 3J. For example, the adjustable flip-out seat system 623 provides a further lowering capability for the tipping point of the multifunctional tailgate door 3J in a fully lowered position, allowing for further assistance while loading cargo.

The adjustable flip-out backrest 622 extends downward and/or upward from any position of the multifunctional tailgate door 3J, for example, if the multifunctional tailgate door 3J is in an upright or closed position, the adjustable flip-out backrest 622 can extend inward or outward. The adjustable flip-out backrest 622 may encompass any width of the multifunctional tailgate door 3J. The adjustable flip-out backrest 622 includes the adjustable flip-out seating step 626 that enables a user to either step into the cargo bed area 5 or sit on a portion of the adjustable flip-out seating step 626. The adjustable flip-out backrest 622 and adjustable flip-out seating step 626 may also be used while the multifunctional tailgate door 3J is in a lowered position, such as in a position extending below the rear bumper 4.

The adjustable flip-out quick connect cable 625 functions in a similar manner to the quick connect 521, described in detail above. The adjustable flip-out quick connect cable 625 may operate manually, or may operate via a motorized or pneumatic operation (now shown for clarity). There may be one adjustable flip-out quick connect cable 625, or a plurality of adjustable flip-out quick connect cables 625. The adjustable flip-out quick connect cable 625 has an adjustable cable length, permitting a user to adjust the length of the cable that is suitable or preferable for the height or position of the vehicle 1 and multifunctional tailgate door 3J. The adjustable flip-out seat system 623 also enables the user to step up into the cargo bed area 5 using the adjustable flip-out backrest 622 and adjustable flip-out seating step 626.

Figure 22J:
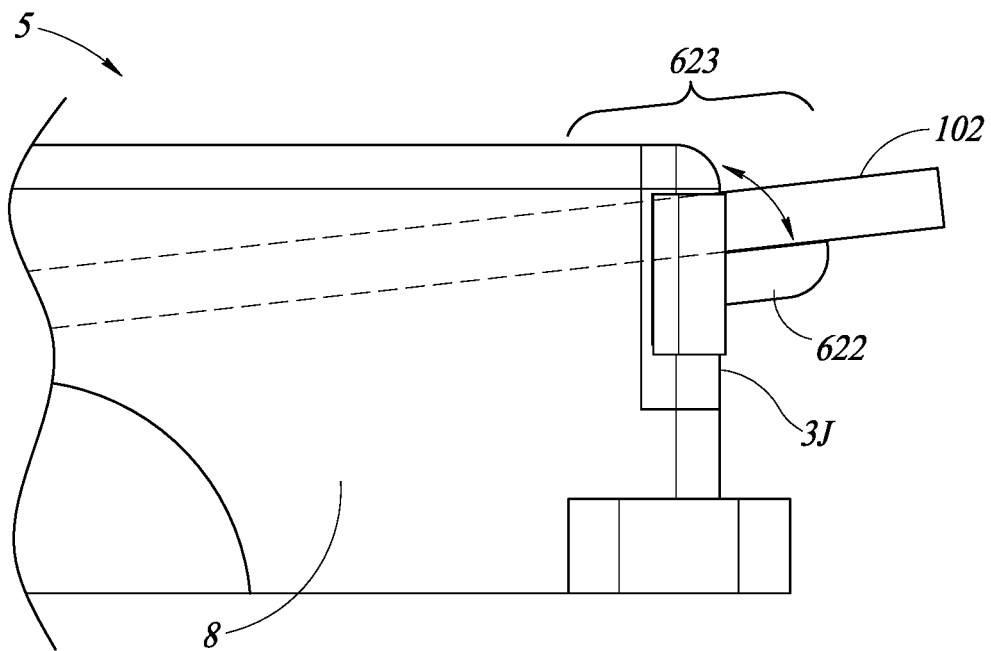
FIG. 22J is a partial driver side view of the vehicle and the example embodiment of the multifunctional tailgate door of FIG. 22I with the largo cargo on the adjustable flip-out seating step system.
Figure 22K:
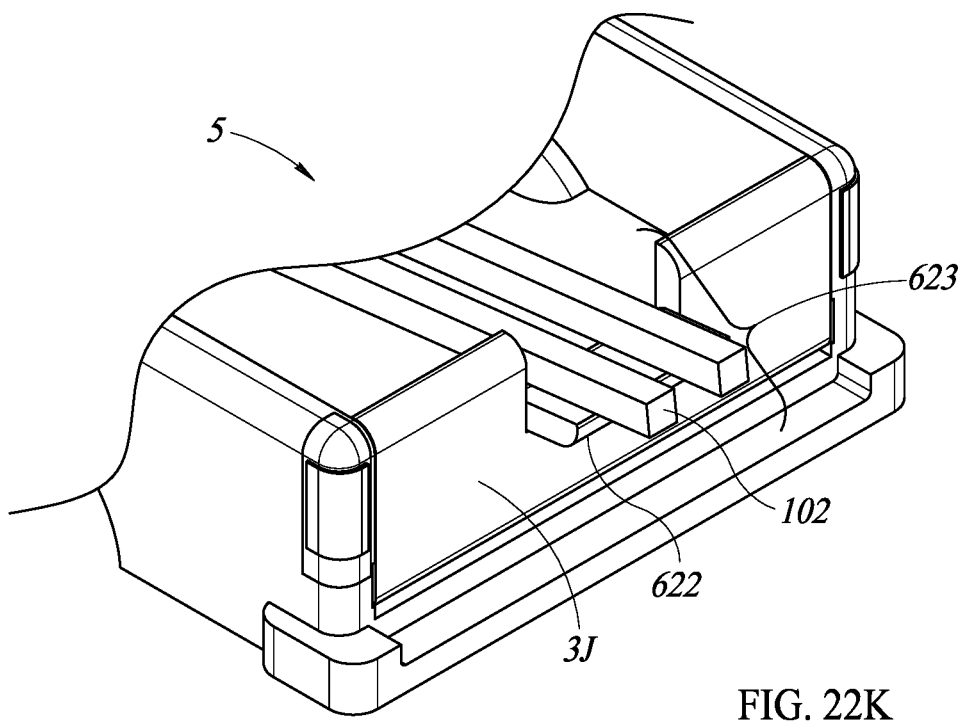
FIG. 22K is a perspective view of the vehicle and the example embodiment of the multifunctional tailgate door of FIG. 22I with the largo cargo on the adjustable flip-out seating step system.

FIGS. 22J and 22K show the adjustable flip-out seat system 623 of FIG. 22I in a partial driver side and perspective view having a large cargo 102, such as lumber. The adjustable flip-out seat system 623 is configured to allow a user to place largo cargo 102 into the cargo bed area 5 without having to open the multifunctional tailgate door 3J. This can enable the user to implement the adjustable flip-out seat system 623 as a loading tool, in addition to a seating system, such as placing lumber or other similar load within the adjustable flip-out seat system 623 to correspond with the angle of the load on the multifunctional tailgate door 3J. The adjustable flip-out seat system 623 utilizes the entire surface to create friction with the largo cargo 102 and helps prevent the large cargo 102 from sliding around.

Figure 22L:
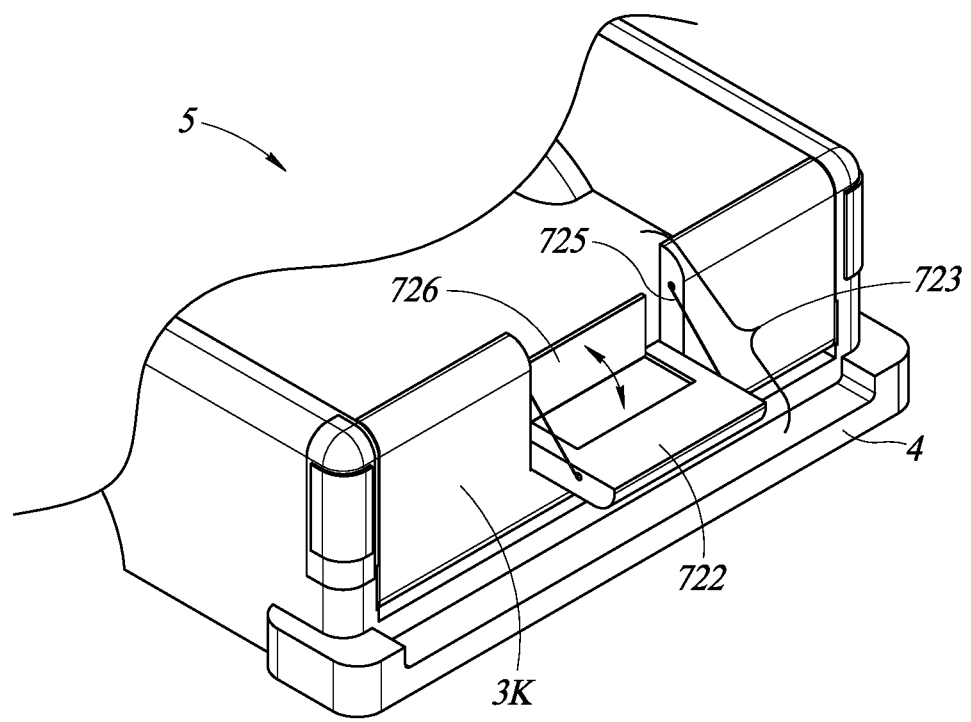
FIG. 22L is a perspective view of the vehicle and an example embodiment of a multifunctional tailgate door having an adjustable flip-out seating step system.

FIG. 22L shows an embodiment of a multifunctional tailgate door 3K having an example embodiment of an adjustable flip-out seat system 723. The adjustable flip-out seat system 723 includes an adjustable flip-out portion 722, an adjustable flip-out backrest 726, and an adjustable flip-out quick connect cable 725. The adjustable flip-out portion 722 extends downward and/or upward from a position of the multifunctional tailgate door 3k, for example, if the multifunctional tailgate door 3K is in an upright or closed position. The adjustable flip-out portion 722 may encompass any width of the multifunctional tailgate door 3K.

The adjustable flip-out seat system 723 includes the adjustable flip-out backrest 726 that enables a user to sit on the adjustable flip-out portion 722 while having back support. The adjustable flip-out quick connect cable 725 has an adjustable cable length, for example, enabling a user to positon the adjustable flip-out portion 722 at varying heights relative to the cargo bed area 5 and the rear bumper 4. The adjustable flip-out seat system 723 may also be used while the multifunctional tailgate door 3K is in a lowered position, such as in a position extending below the rear bumper 4. While the multifunctional tailgate door 3K is in the open/dropped position, the adjustable flip-out portion 722 may also function as a seat, workbench, table, etc. Because of the increased weight of the adjustable flip-out portion 722, the adjustable flip-out quick connect cable 725 may be composed of steel, metal, or other similar material. If the adjustable flip-out portion 722 is extended in a downward position, the adjustable flip-out portion 722 may function as a step or as an open access for reaching into the cargo bed area 5.

Figure 22M:
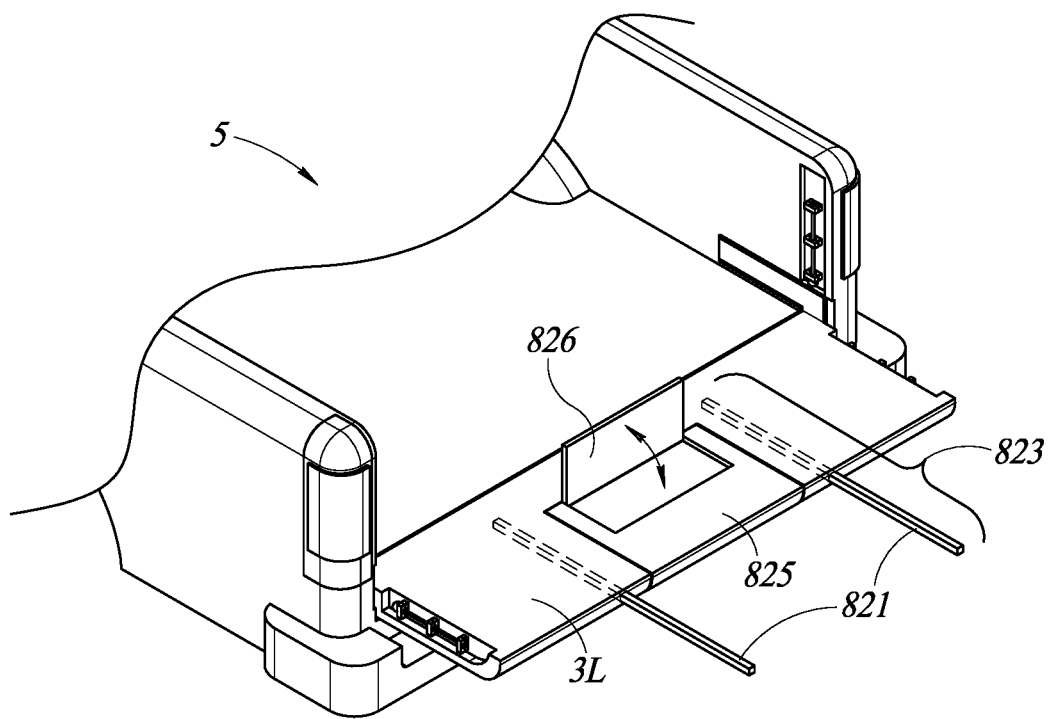
FIG. 22M is a perspective view of the vehicle and an example embodiment of a multifunctional tailgate door having an adjustable flip-out seating step system.

FIG. 22M shows an embodiment of a multifunctional tailgate door 3L having an example embodiment of an adjustable flip-out seat system 823. The adjustable flip-out seat system 823 includes an adjustable flip-out portion 825, an adjustable flip-out backrest 826, and a plurality of telescoping support beams 821. The adjustable flip-out seat system 823 can operate in conjunction with the multifunctional tailgate door 3L, or can operate independently of the multifunctional tailgate door 3L. The adjustable flip-out backrest 826 may be composed of fabric or a flexible material. Additionally, the adjustable flip-out backrest 826 has multi-positional functionality, enabling the user to adjust the position of the adjustable flip-out backrest 826 based varying statures.

The telescoping support beams 821 are operable as a handrail, hammock, and leg or foot support, and can extend out from the multifunctional tailgate door 3L. The telescoping support beams 617 may further include a type of cross-fabric, rope, etc. that allows the user to place their feet or legs on, if needed. Such implementations may be incorporated in one or more embodiments of the various apparatuses, multifunctional tailgates, systems, etc. described herein.

Figure 23A:
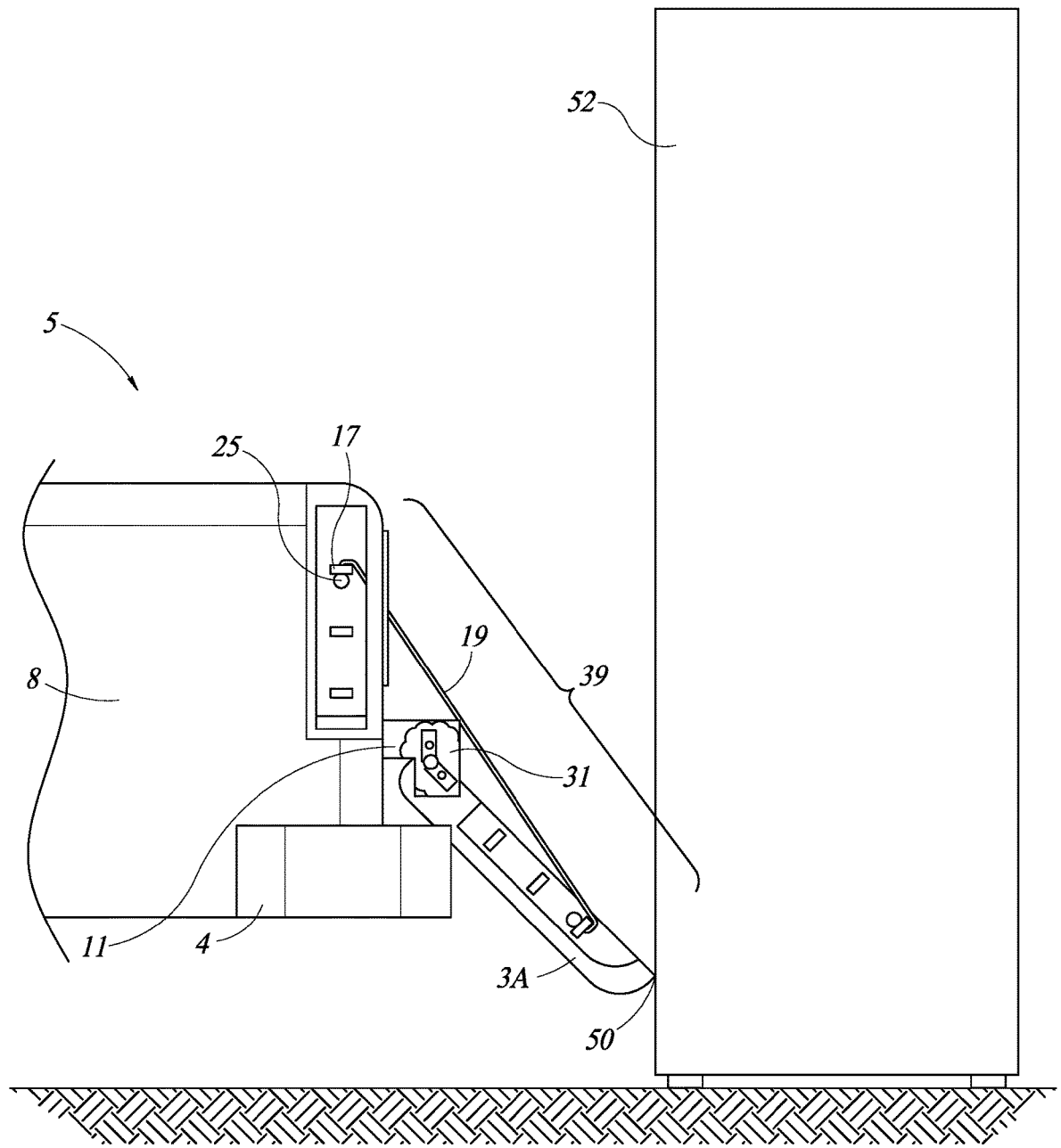
FIG. 23A is a partial driver side view of the vehicle and an example embodiment of the multifunctional tailgate door with a large cargo in a pre-loading position.
Figure 23B:
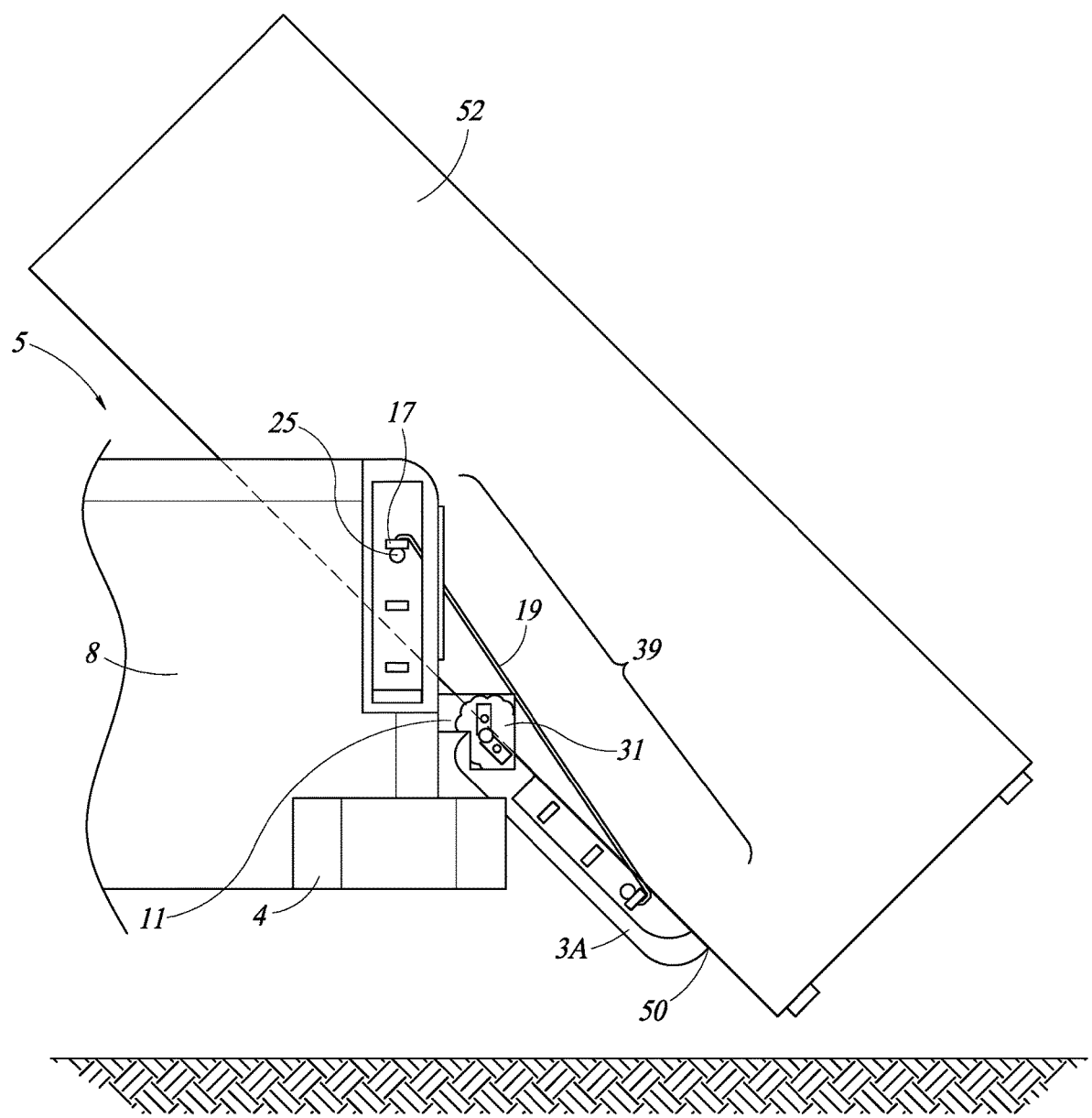
FIG. 23B is a partial driver side view of the vehicle and the example embodiment of the multifunctional tailgate door of FIG. 23A with the large cargo in the loading position.

FIGS. 23A and 23B show an embodiment of the multifunctional tailgate door 3A, as described in detail above in FIGS. 2A-4E, having a lowered tipping point 50 about which the cargo 52 pivots onto the multifunctional tailgate door 3A. In FIG. 23A, a large cargo 52 is shown in a pre-loaded position. The large cargo 52 may be a refrigerator, door, sheetrock, or any cargo. By utilizing the multifunctional tailgate door 3A in lowered position, the lowered tipping point 50 is capable of reducing the load on the multifunctional tailgate door 3A. As demonstrated in FIG. 23B, the lowered tipping point 50 lowers the center of gravity of a large object being loaded into or out of the cargo bed area 5, such as a refrigerator. The lowered tipping point 50 also makes it possible to lift large cargo with a single individual. Additionally, using a motorized or pneumatic embodiment of the multifunctional tailgate door 3A, the associated cargo load system previously mentioned may lift and tilt the large cargo 52 back up and into the cargo bed area 5.

As mentioned above, the lowered tipping point 50 is easier to control or maneuver when moving a taller or larger object. Lowering the center of gravity or changing/controlling stability points in the direction of the tipping point, momentum of an object helps the user in loading onto the multifunctional tailgate door 3A. Lowering a pivot point, as shown in FIGS. 23A and 23B, also helps control an object's descending direction and reduces the effort needed to move the associated cargo onto the multifunctional tailgate door 3A and into the cargo bed area 5.

Figure 24A:
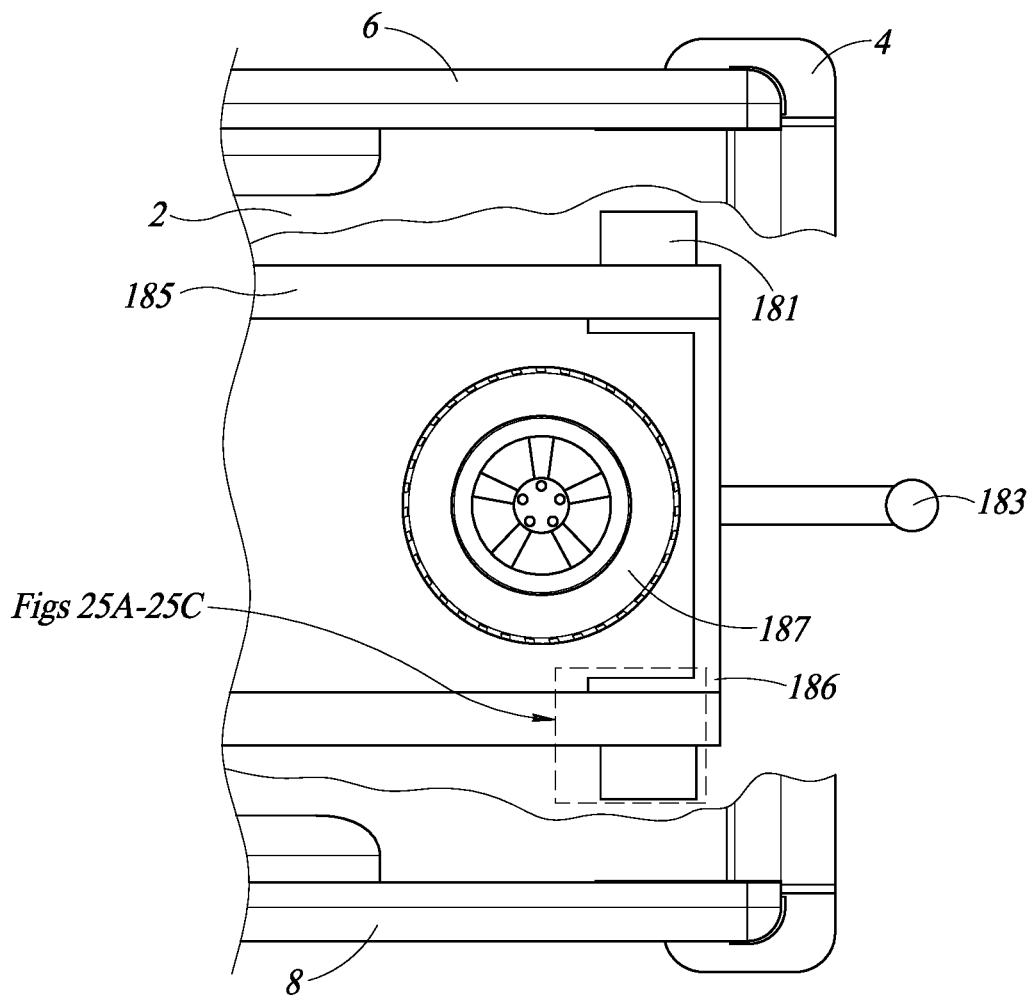
FIG. 24A is a top view of a bumper lowering platform according to an example embodiment with a tow hitch beneath the cargo bed area of the vehicle.
Figure 24B:
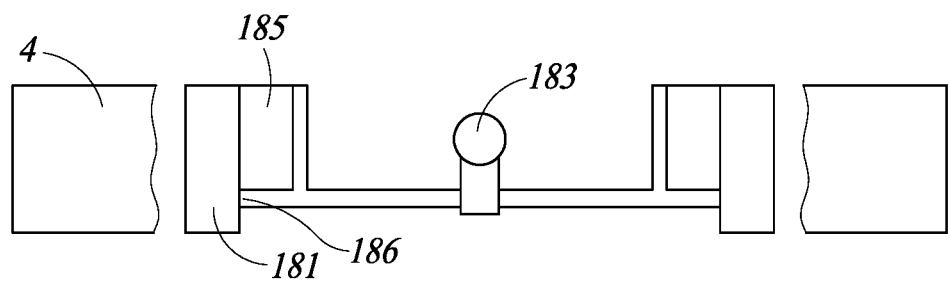
FIG. 24B is a partial rear view of the bumper lowering platform of FIG. 24A with the tow hitch beneath the cargo bed area of the vehicle.

FIGS. 24A and 24B show an example embodiment of a bumper lowering platform 181, which is positioned underneath the rear cargo floor 2 and between the first and second rear cargo sides 6, 8. In this embodiment, the vehicle 1 includes a spare tire 187 which is located between a pair of frames 185 of the vehicle 1. The pair of frames 185 may extend throughout the entire length of the vehicle 1. The pair of frames 185 are generally provided for support and stability of the vehicle, from the front bumper (not shown) to the rear bumper 4. The pair of frames 185 are coupled to a tow hitch receiver frame 183. The tow hitch receiver frame 183 extends beyond the rear bumper 4 of the vehicle 1. The tow hitch receiver frame 183 may be a single ball, two-ball, three-ball, or other configuration typically installed on vehicles.

FIGS. 24A and 24B shows a number of equipment, (e.g., tow hitch receiver frame 183, spare tire 187, pair of frames 185, rear bumper 4) that are located on or near the cargo bed area 5 and/or underneath the rear cargo floor 2. As shown in FIG. 24A, certain portions of rear cargo floor 2 are removed for clarity to demonstrate how the equipment is coupled to other various pieces of equipment, bolted onto other pieces of equipment, and demonstrate the configuration of equipment around the sides of the vehicle and of the main pair of frames 185.

Figure 25A:
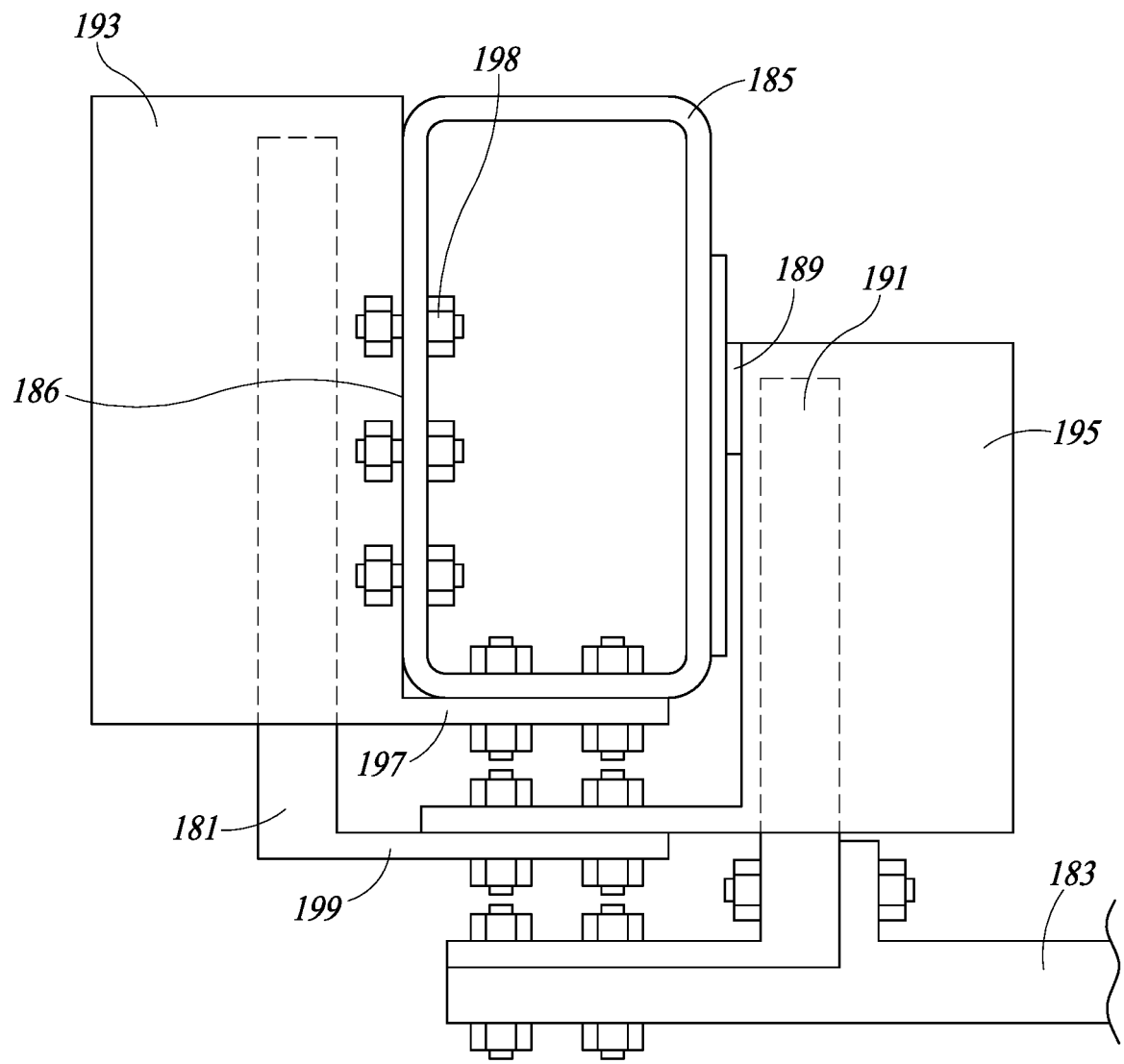
FIG. 25A is a partial rear view of the bumper lowering platform of FIG. 24B in a first bumper lowering position.
Figure 25B:
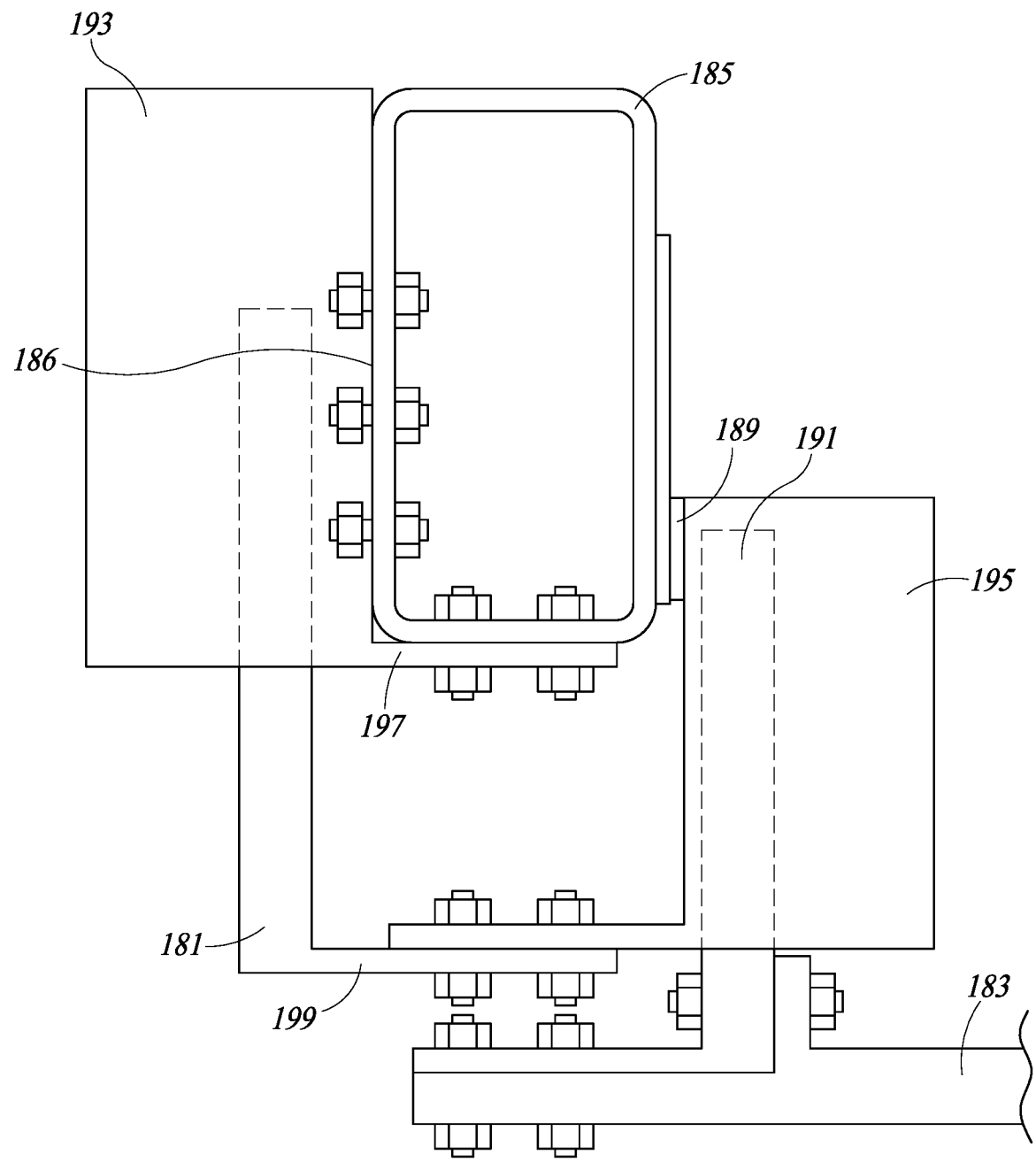
FIG. 25B is a partial rear view of the bumper lowering platform of FIG. 24B in a second bumper lowering position.
Figure 25C:
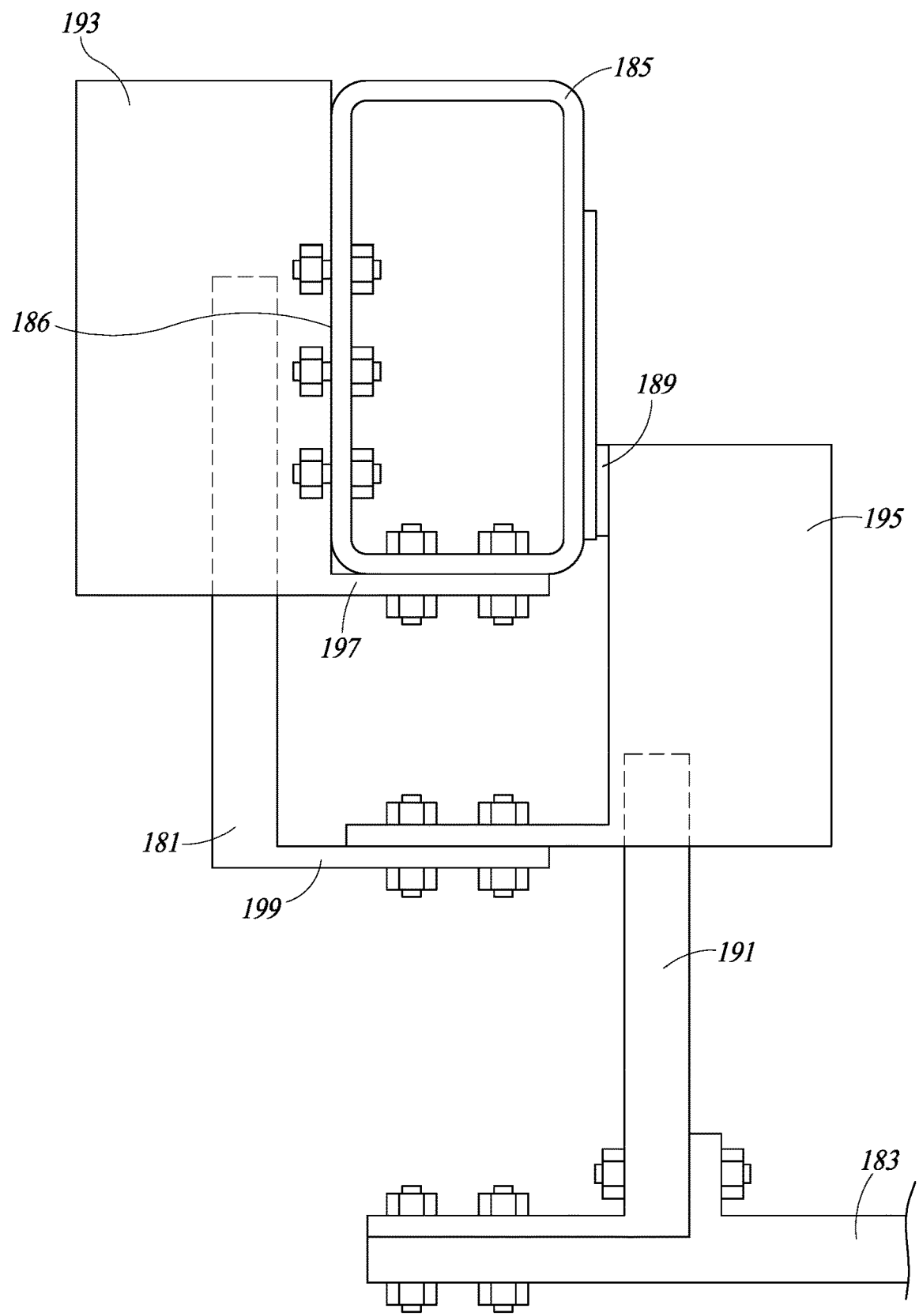
FIG. 25C is a partial rear view of the bumper lowering platform of FIG. 24B in a third bumper lowering position.

FIGS. 25A-25C show a detailed illustration of the bumper lowering platform 181 and the tow hitch receiver frame 183. In particular, FIGS. 25A-25C are partial rear views taken from the perspective view of FIG. 24A. The pair of frames 185 are coupled to the bumper lowering platform 181 via a plurality of bolts 198. The bumper lowering platform 181 in some embodiments may be motorized, or may operate via hydraulic or pneumatic systems. The bumper lowering platform 181 may be placed at a distance from or on the outside pair of frames 185, which are positioned in front of the rear portion of the bumper 4. The bumper lowering platform 181 controls the up and/or down movement of the rear bumper 4. Because the tow hitch receiver frame 183 is coupled to the bottom of the bumper lowering platform 181, the bumper lowering platform 181 may also control the up and/or down movement of the tow hitch receiver frame 183.

Both the bumper lowering platform 181 and tow hitch receiver frame 183 synchronously move with the pair of frames 185 of the vehicle 1. Such ensures that the tow hitch receive frame 183 and the bumper lowering platform 181 do not travel at different speed or intervals and get jammed. The bumper lowering platform 181 and tow hitch receiver frame 183 may operate via the same motorized, hydraulic, or pneumatic system or each may operate via a respective system. In embodiments in which the bumper lowering platform 181 and the tow hitch receiver frame 183 operate via a hydraulic system, they may be connected to the same hydraulic system within both the bumper lowering platform 181 and the tow hitch receiver frame 183. Therefore, there is no crossover from the rear bumper 4 to the tow hitch receiver frame 183 hydraulics or vice versa. Each closed hydraulic system remains separated and within each specific platform or system.

The tow hitch receiver frame 183 moves with the up and/or down movements of the bumper lowering platform 181, in particular, the pair of frames 185. Additionally, the tow hitch receiver frame 183 may also be capable of lowering below and away from the bumper lowering platform 181 with a separate set of plates. The entire tow hitch receiver frame 183 coupled between the pair of frames 185 may be coupled to the moveable parts that extend from and are controlled by the bumper lowering platform 181.

The tow hitch receiver frame 183 is coupled to the bumper lowering platform 181 via a primary connection region 186. The primary connection region 186 may be provided via two plates, e.g., an upper plate 197 that is coupled to the frame 185, and a lower plate 199 which is coupled to a second control box housing 195. In this manner, the primary connection region 186 is also generally located under a bottom portion of the frame 185. The tow hitch receiver frame 183 is coupled onto the bumper lowering platform 181 that is mounted to the upper portion of the lower plate 199 while the upper plate 197 of the bumper lowering platform 181 is coupled directly to the frame 185. Specifically, the frame 185 is coupled to the upper plate 197 and the tow hitch receiver frame 183 is coupled to the lower plate 199.

The tow hitch receiver frame 183 controller is also provided and which is connected to upper and lower plates 197, 199. The bumper lowering platform 181 is housed in a first control box 193 which includes L-shaped connection structures located on the outside of the frames 185 and at the bottom of the frames 185. The second control box housing 195 includes a tow hitch receiver extension system 191 via which a vertical track arm or guide 189 vertically moves to support the up and/or down movements of both the bumper lowering platform 181 and the tow hitch receiver extension system 191, and is mounted onto the control box housing 195.

The vertical track arm or guide 189 can take a number of forms. In one embodiment, the vertical track arm 189 may include a linear bearing slide rail to allow for vertical movement of the frame 185 and the rear bumper 4 coupled thereto and the tow hitch receiver frame 183. The bumper lowering platform 181 may also include a locking system (not shown), which may lock and secure the rear bumper 4, frame 185, and the tow hitch receiver frame 183 in a selected position or configuration. In some embodiments, the bumper lowering platform 181 may also include a four-link suspension (not shown), which may be arranged or configured to support the tow hitch receiver frame 183 that is either above the spare tire 187 or designed to function in the space occupied by the spare tire 187, for example, if the spare tire 187 is located in an alternative location for various makes and models of vehicles. Additionally, the bumper lowering platform 181 provides flexibility to add better functionality by absorbing various support loads or equalizing tow hitch loads.

Specifically, FIG. 25A shows the bumper lowering platform system 181 in the up position, and the tow hitch receiver frame 183 and tow hitch receiver extension system 191 in the up position. In these positions, the rear bumper 4 is at a nominal position in which the rear bumper 4 has not been moved in any direction. FIG. 25B shows the bumper lowering platform 181 in a down or extended position, and the tow hitch receiver frame 183 and tow hitch receiver extension system 191 in the up position. In these positions, the rear bumper 4 has been lowered and the tow hitch receiver frame 183 has remained in its nominal position in which the two hitch receiver frame 183 has not moved relative to the rear bumper 4. FIG. 25C shows the bumper lowering platform 181 in a down or extended position, and the tow hitch receiver frame 183 and tow hitch receiver extension system 191 in a down or extended position. In some embodiments, a tube or plate is provided that couples opposing sides of the tow hitch receiver frame 183 from the inside of both frames 185.

Figure 26A:
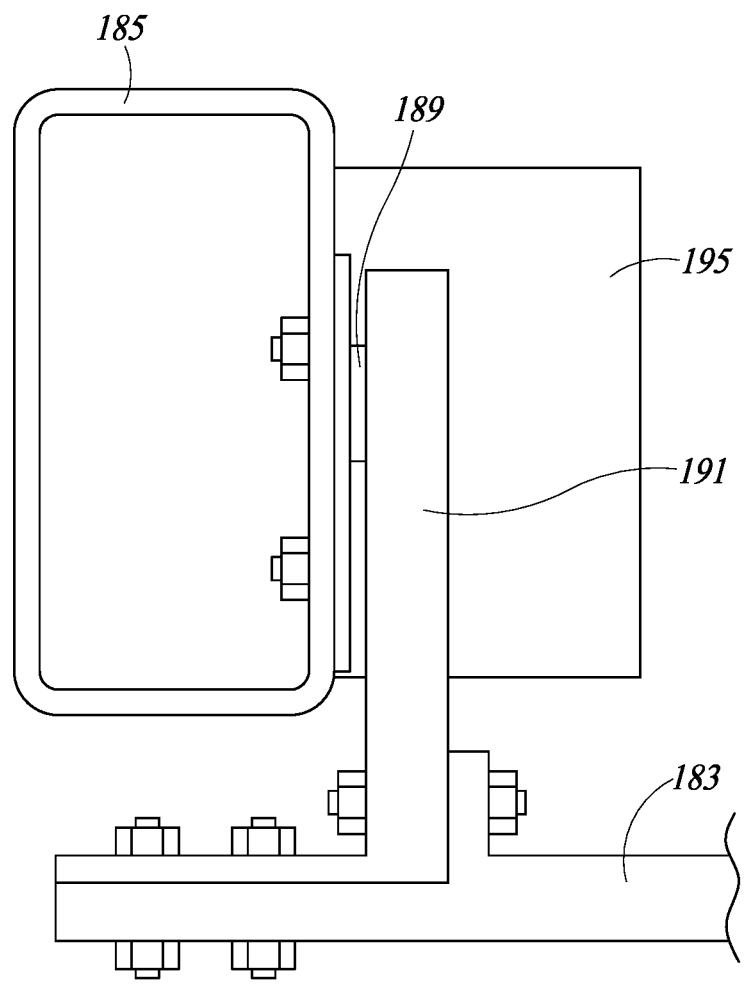
FIG. 26A is a partial rear view of the bumper lowering platform of FIG. 24B with a sliding track connection in a disengaged position.
Figure 26B:
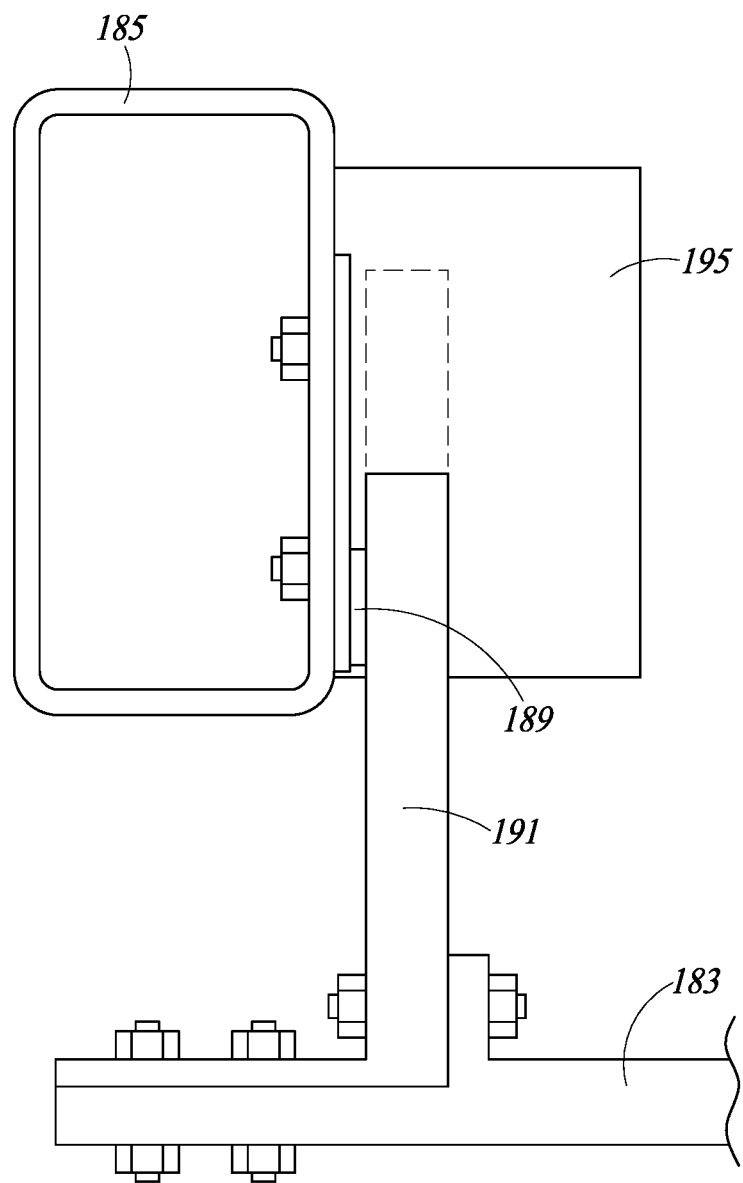
FIG. 26B is a partial rear view of the bumper lowering platform of FIG. 24B with the sliding track connection in an engaged position.

FIGS. 26A and 26B show how the separate tow hitch receiver extension system 191 and control box housing 195 for the tow hitch receiver frame 183 that is housed inside of the pair of frames 185 may operate independently from the bumper lowering platform 181, as described in detail above, and as shown in FIGS. 25A-25C. The tow hitch receiver extension system 191 and control box housing 195 are located near the back corner of the rear bumper 4 location. The tow hitch receiver extension system 191 is a separate and independent system providing vertical (up/down) movement.

The tow hitch receiver extension system 191 providing vertical (up/down) movement allows the tow hitch receiver frame 183 to drop and rise independently, below the rear bumper 4 without any association with the rear bumper 4. The lowering or extending parts are only 4"-6" wide when the tow hitch receiver extension system 191 drops out the bumper lowering platform 181 or the tow hitch receiver frame 183. The lowered tow hitch receiver extension system 191 provides an added benefit of controlling the vertical elevation and altitude of a trailer or load (not shown for clarity of illustrations) being pulled by the tow hitch receiver frame 183. By adjusting the tow hitch receiver extension system 191 to allow proper height alignment of the tow hitch receiver frame 183, the tow hitch receiver extension system 191 helps reduce the drag coefficient of ram air of the vehicle 1 by having less wind resistance and increasing fuel efficiency.

The tow hitch receiver extension system 191 is able to operate manually, pneumatically, or by other similar motorized methods. Specifically, FIG. 26A shows the tow hitch receiver extension system 191 and tow hitch receiver frame 183 in a default or up position. The tow hitch receiver extension system 191 in FIG. 26B shows the tow hitch receiver extension system 191 and tow hitch receiver frame 183 in a down or extended position by utilizing the vertical track arm or guide.

Figure 27A:
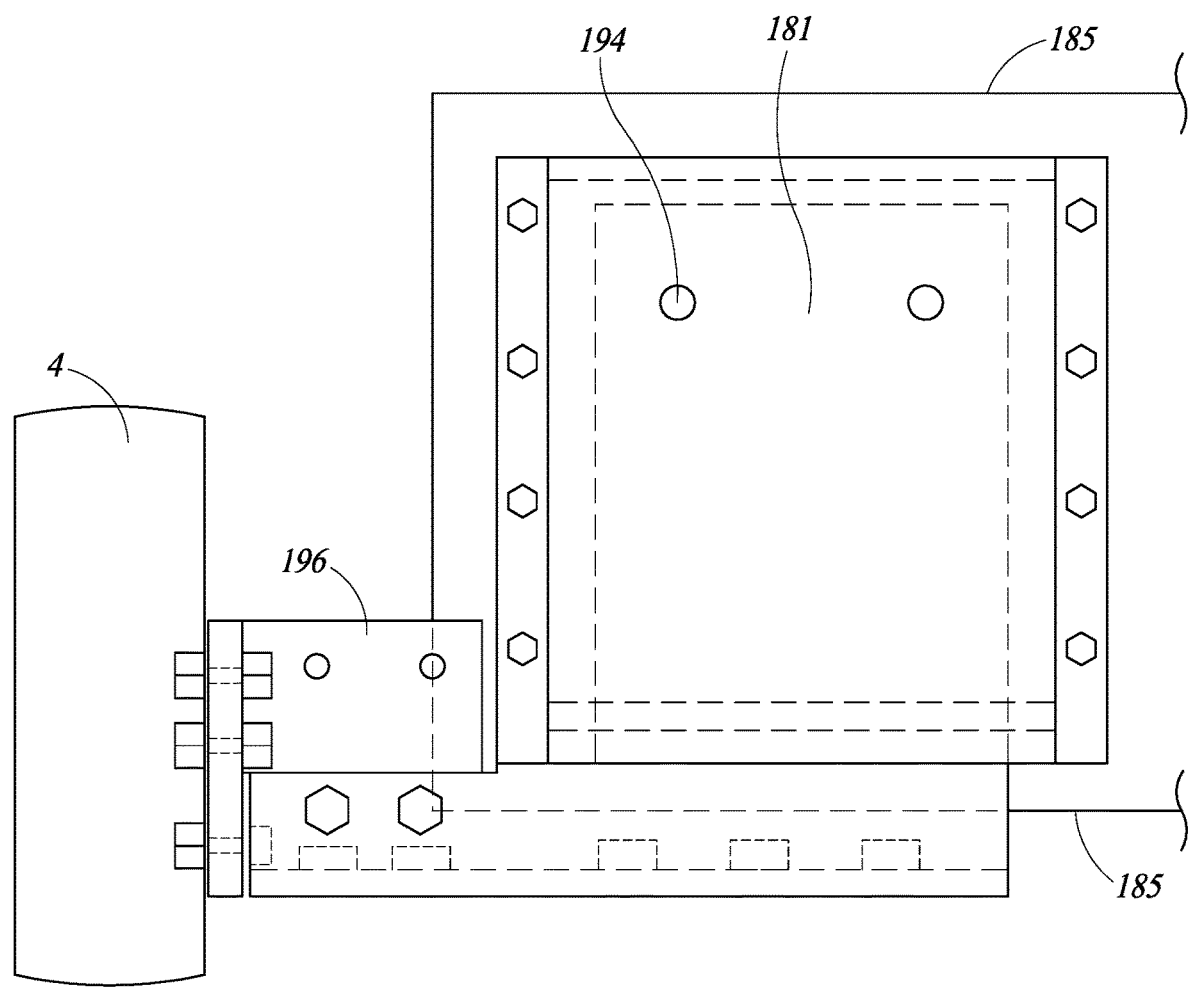
FIG. 27A is a partial cross-sectional view of the bumper lowering platform of FIG. 24B.
Figure 27B:
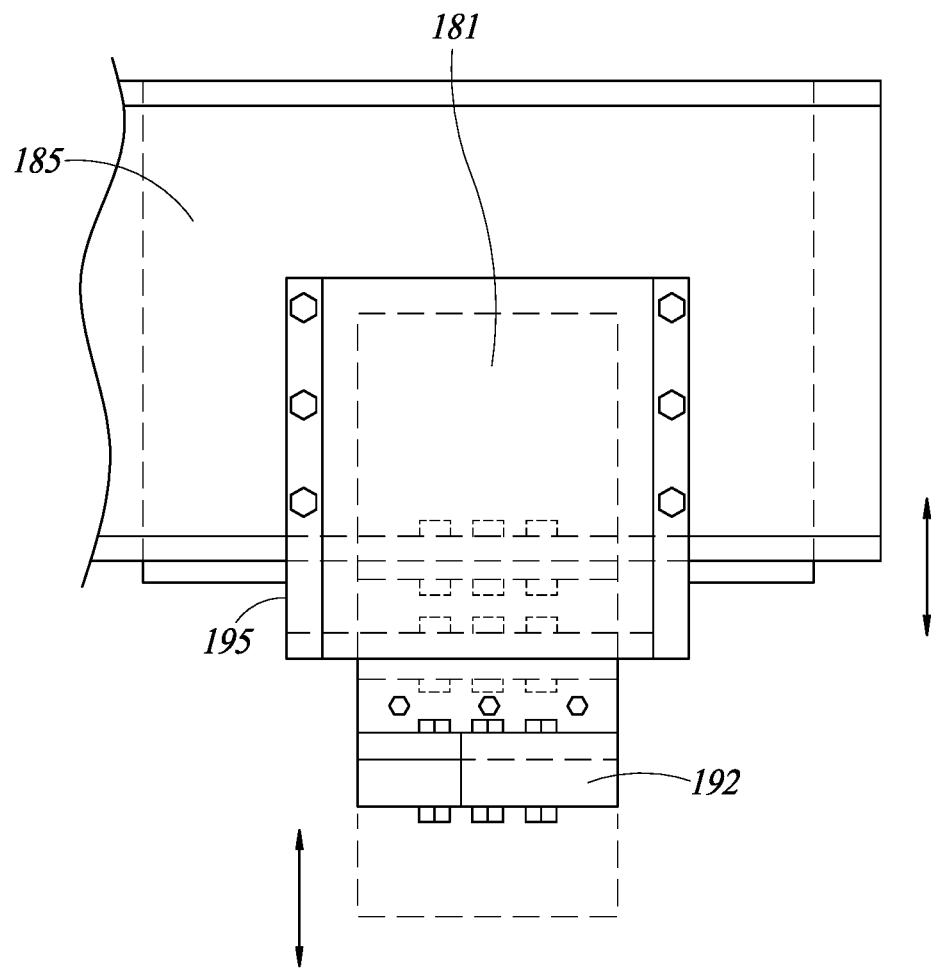
FIG. 27B is a partial cross-sectional view of the bumper lowering platform of FIG. 24B.

FIGS. 27A and 27B show a driver side cut-out view of the pair of frames 185, the rear bumper 4, and the bumper lowering platform 181. The bumper lowering platform 181 is coupled to a bumper bracket 196. The bumper bracket 196 is positioned between the bumper lowering platform 181 and couples the rear bumper 4 to the bumper lowering platform 181. The bumper lowering platform 181 may take a wide variety of shapes and sizes, for example, an "L" shaped bracket configuration that pneumatically moves in an up or down direction.

A plurality of shear pins 194 are positioned in the bumper lowering/raising system 181. The plurality of shear pins 194 helps lock the bumper lowering/raising system 181 into position within the pair of frames 185. The shear pins 194 are extended through a plurality of apertures in the bumper lowering platform 181 and coupled to the pair of frames 185 via aligned apertures. In some embodiments, the pair of frames 185 may be provided with additional structure in an area where the housing for the bumper and tow hitch receiver frame 183 assembly is attached to the pair of frames 185. A bolt-on bar 192 is positioned between the pair of frames 185, which is the only portion of the tow hitch receiver extension system 191 that moves. The plurality of shear pins 194 is mounted on and moves with the bumper lowering platform 181 and the tow hitch receiver extension system 191.

Electric controllers may automatically engage and disengage the plurality of shear pins 194, depending on predetermined settings. In a nominal setting, the automatic engaged setting is utilized when the bumper lowering platform 181 is in the "up" position, and while the rear bumper 4 is up and locked into a secured movement position.

Figure 27C:
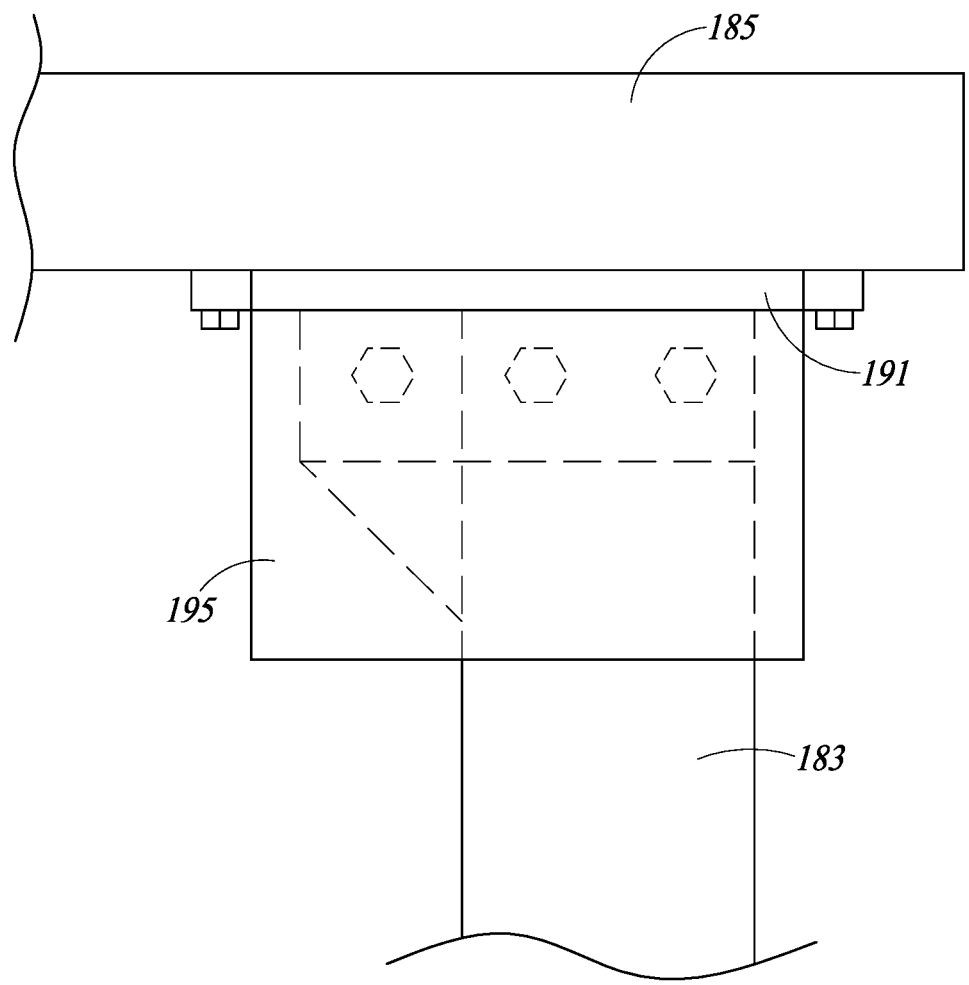
FIG. 27C is a partial cross-sectional view of the bumper lowering platform of FIG. 24B.

FIG. 27C is a top view of the tow hitch receiver extension system 191. Surrounding the tow hitch receiver extension system 191 is the control box housing 195. The control box housing 195 helps support the tow hitch receiver frame 183. The control box housing 195 also helps protect all of the hydraulics, motors, or other mechanisms from being damaged. An additional benefit of the bumper lowering platform 181 and the tow hitch receiver extension system 191 is that it allows the tow hitch receiver frame 183 to remain hidden up and out of the way, or inside and between an SUV's or a truck's main support frames, such as the pair of frames 185 on the vehicle 1. This also allows manufacturers to design a proper rear bumper without being encumbered or having to integrate a tow hitch receiver cover implemented within the bumper design.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle, comprising:
   a cargo bed area having:
   a rear cargo floor;
   a first rear corner sidewall;
   a second rear corner sidewall; and
   a first rear cargo side and a second rear cargo side;
   a multifunctional tailgate door having a first sidewall and a second sidewall, the multifunctional tailgate door rotatable in a first direction and a second direction;
   a rail system coupled to the first and second sidewalls of the multifunctional tailgate door, the rail system operable to extend and retract the multifunctional tailgate door; and
   a tailgate support apparatus operable to allow the multifunctional tailgate door to move between at least three positions, the multifunctional tailgate door in one of the at least three positions oriented at an angle which is less than 90 degrees with respect to the rear cargo floor,
   wherein the tailgate support apparatus includes at least one tailgate support cable, and
   a plurality of clamps which are disposed on at least one of the first rear corner sidewall, the second rear corner sidewall, the first rear corner sidewall, or the second rear corner sidewall.

2. The vehicle of claim 1 wherein the rail system includes a bracket and a track, the bracket coupled to the multifunctional tailgate door and moveable in a longitudinal direction via the track.

3. The vehicle of claim 1 wherein the tailgate support apparatus includes at least one pin member, which couples to the tailgate support cable to secure the multifunctional tailgate door in one of the at least three positions.

4. The vehicle of claim 1 wherein at least some of the plurality of clamps are arranged on the first rear corner sidewall and at least some of the plurality of clamps are arranged on the first sidewall.

5. The vehicle of claim 1 further comprising an internal support device positioned in the rear cargo floor and the multifunctional tailgate door, the internal support device having a rotary joint or union.

6. The vehicle of claim 1 further comprising a pair of channels positioned in the rear cargo floor and the multifunctional tailgate door.

7. The vehicle of claim 6 wherein the pair of channels are operable in a first setting and in a second setting.

* * * * *